(12) United States Patent
Zhu

(10) Patent No.: US 12,214,684 B2
(45) Date of Patent: Feb. 4, 2025

(54) SYSTEM AND METHOD FOR CHARGING ELECTRIC VEHICLES

(71) Applicant: ZHEJIANG HANMINGBO NEW ENERGY CO., LTD., Zhejiang (CN)

(72) Inventor: Zhengmao Zhu, Fremont, CA (US)

(73) Assignee: ZHEJIANG HANMINGBO NEW ENERGY CO., LTD., Zhejiang (CN)

( * ) Notice: Subject to any disclaimer, the term of this patent is extended or adjusted under 35 U.S.C. 154(b) by 0 days.

(21) Appl. No.: 17/601,762

(22) PCT Filed: Mar. 8, 2021

(86) PCT No.: PCT/IB2021/051920
§ 371 (c)(1),
(2) Date: Oct. 6, 2021

(87) PCT Pub. No.: WO2021/176431
PCT Pub. Date: Sep. 10, 2021

(65) Prior Publication Data
US 2022/0194239 A1     Jun. 23, 2022

Related U.S. Application Data

(60) Provisional application No. 62/986,232, filed on Mar. 6, 2020.

(51) Int. Cl.
*B60L 53/24*     (2019.01)
*H02J 7/00*      (2006.01)
(Continued)

(52) U.S. Cl.
CPC ............ *B60L 53/24* (2019.02); *H02J 7/0063* (2013.01); *H02J 7/0068* (2013.01); *H02J 7/02* (2013.01);
(Continued)

(58) Field of Classification Search
None
See application file for complete search history.

(56) References Cited

U.S. PATENT DOCUMENTS

| 4,348,619 A | 9/1982 | Ray et al. |
| 5,341,075 A | 8/1994 | Cocconi |

(Continued)

FOREIGN PATENT DOCUMENTS

| CN | 107985083 A | 5/2018 |
| CN | 108539833 A | 9/2018 |

(Continued)

OTHER PUBLICATIONS

International Search Report and Written Opinion mailed May 3, 2021 in International Application PCT/IB2021/051920.

(Continued)

*Primary Examiner* — Daniel Cavallari
*Assistant Examiner* — Terrence R Willoughby
(74) *Attorney, Agent, or Firm* — Venable LLP

(57) ABSTRACT

The present teaching relates to method and system for charging a rechargeable battery deployed in an electric apparatus. The system resides in the electric apparatus. The system comprises a motor, an inverter, an output rectifier, a configurator, and a controller. The motor comprises a stator having a plurality of stator teeth and a plurality of stator windings wounded on the plurality of stator teeth. The inverter comprises a plurality of power switch devices. The configurator comprises a plurality of contactors coupled with the plurality of stator windings and the plurality of power switch devices. The controller controls the plurality of power switch devices and the plurality of contactors, so as to configure the system to operate in one of a traction mode and a charging mode.

16 Claims, 44 Drawing Sheets

(51) Int. Cl.
  *H02J 7/02* (2016.01)
  *H02K 3/28* (2006.01)
  *H02K 11/049* (2016.01)
  *H02K 11/33* (2016.01)
  *H02M 1/42* (2007.01)
  *H02M 3/335* (2006.01)
  *H02P 27/08* (2006.01)

(52) U.S. Cl.
  CPC ............ *H02K 3/28* (2013.01); *H02K 11/049* (2016.01); *H02K 11/33* (2016.01); *H02M 1/4225* (2013.01); *H02M 3/33573* (2021.05); *H02P 27/08* (2013.01); *B60L 2210/14* (2013.01); *H02J 2207/20* (2020.01)

(56) References Cited

U.S. PATENT DOCUMENTS

| | | | |
|---|---|---|---|
| 6,037,740 A | 3/2000 | Pollock et al. | |
| 6,211,593 B1* | 4/2001 | Nashiki | H02K 1/278 310/156.33 |
| 6,630,764 B1* | 10/2003 | Dube | H02K 21/22 310/156.01 |
| 11,201,548 B2* | 12/2021 | Choi | H02M 1/4258 |
| 2004/0104637 A1* | 6/2004 | Dube | H02K 3/28 310/177 |
| 2018/0115181 A1 | 4/2018 | Shin et al. | |
| 2018/0254732 A1 | 9/2018 | Smolenaers | |
| 2019/0061537 A1 | 2/2019 | Ge et al. | |
| 2020/0298722 A1* | 9/2020 | Smolenaers | H02J 7/345 |
| 2020/0406769 A1 | 12/2020 | Danner | |
| 2023/0253818 A1 | 8/2023 | Bin et al. | |
| 2024/0297516 A1 | 9/2024 | Lee et al. | |

FOREIGN PATENT DOCUMENTS

| | | |
|---|---|---|
| EP | 0836763 B | 6/2001 |
| EP | 3057197 A1 | 8/2016 |
| JP | 2019004363 A | 1/2019 |
| KR | 20160099259 A | 8/2016 |
| KR | 20180070447 A | 6/2018 |
| WO | 9702649 A1 | 1/1997 |
| WO | 2018095868 A1 | 5/2018 |

OTHER PUBLICATIONS

Office Action mailed Oct. 19, 2022 in Japanese Patent Application No. 2022-512489.

First Office Action issued Sep. 15, 2023 in Chinese Patent Application No. 202180003354.X.

Preliminary Rejection mailed Dec. 27, 2023 in Korean Patent Application No. 10-2022-7019684.

Notice of Allowance mailed Oct. 24, 2024 in U.S. Appl. No. 18/617,017.

* cited by examiner

Charger-Inverter system 1

Charger-Inverter system 2

Charger-Inverter system 1

Charger-Inverter system 2

Charger-Inverter system 1

Charger-Inverter system 2

Charger-Inverter system X

Charger-Inverter system 1

Charger-Inverter system 2

SYSTEM AND METHOD FOR CHARGING ELECTRIC VEHICLES

CROSS-REFERENCE TO RELATED APPLICATIONS

The present application is a national stage of International Application No. PCT/IB2021/051920, filed on Mar. 8, 2021, which claims priority to U.S. Patent Provisional Application 62/986,232 filed Mar. 6, 2020, which is incorporated herein by reference in its entirety their entireties.

BACKGROUND

1. Technical Field

The present teaching generally relates to electric apparatuses. More particularly, the present teaching relates to methods and systems for charging batteries deployed in electric apparatuses.

2. Technical Background

Electric vehicles have increasingly becoming prevalent, accounting for a growing market share of vehicles on the road. However, ubiquitous use of electric vehicles still faces some challenges. Particularly, an electrical vehicle relies on batteries as its sole power supply so that batteries have to be recharged. Charging batteries for electrical vehicles traditionally requires special external equipment which is known as Electric Vehicle Supply Equipment (EVSE, sometimes called conductive charging systems, or electric vehicle charging stations).

There are two main types of EVSEs. One type provides alternating-current (AC) electricity to the vehicle, with the vehicle's onboard charger converting AC power to direct current (DC) power needed to charge the batteries. An AC-based EVSE operates as an intermediary between an electric vehicle and an AC outlet, generally using household AC power as input. The actual charger is provided inside the vehicle and usually has a limited power capacity. As such, electric vehicles are generally equipped with only onboard chargers at a capacity of no more than 10 kW (for example, 6 or 7 kW). If a user desires to utilize a higher power level, the user will need to charge the vehicles through the other type of EVSEs, i.e., Direct Current output EVSEs or DC-based EVSEs.

DC-based EVSEs are also known as "fast chargers." A DC EVSE can transform alternating current power to direct current power, and thus can bypass the onboard charger on the electric vehicle to charge DC power directly to the battery. As such a charging operation is not constrained by the capacity limitation of the onboard charger, batteries can be charged at a significantly faster speed. Due to the fact that DC EVSEs are technologically much more complex and expensive as compared with AC EVSEs and require high powered electric supply points, it is therefore found much fewer applications than AC EVSEs. Such issues related to the charging speed in combination with the limited available charging stations for vehicles have so far been a barrier to more widespread adoption of electric vehicles.

Thus, there is a need to develop more effective means and methods to charge batteries of electrical vehicles that address such deficiencies.

SUMMARY

The teaching disclosed herein relates to methods and systems for charging batteries deployed in electric apparatuses. More particularly, the present teaching relates to methods and systems for operating reconfigurably under one of traction and charging operating modes.

In an example, a reconfigurable traction-charging system residing in an electric apparatus having a rechargeable battery is disclosed. The system comprises a motor, an inverter, an output rectifier, a configurator, and a controller. The motor comprises a stator which has a plurality of stator teeth and a plurality of stator windings wounded on the plurality of stator teeth. The inverter comprises a plurality of power switch devices. The configurator comprises a plurality of contactors coupled with the plurality of stator windings and the plurality of power switch devices. The controller controls the plurality of power switch devices and the plurality of contactors, so as to configure the system to operate in one of a traction mode and a charging mode.

In another example, a method of implementing a reconfigurable traction-charging system residing in an electric apparatus having a rechargeable battery is disclosed. The system is configured, via a configurator, under the control of a controller, to operate in a traction mode. Upon receiving a request to charge the rechargeable battery, the system is configured via the configurator to operate in a charging mode. When it is determined that a criterion associated the rechargeable battery is met, the system is configured via the configurator to operate in the traction mode. Besides the configurator and the controller, the system comprises a motor, an inverter, and an output rectifier. The motor comprises a stator having a plurality of stator teeth and a plurality of stator windings wound on the plurality of stator teeth. The inverter comprises a plurality of power switch devices. The configurator comprises a plurality of contactors coupled with the plurality of stator windings and the plurality of power switch devices.

Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF THE DRAWINGS

The systems and methods disclosed herein are further described in terms of exemplary embodiments. These exemplary embodiments are described in detail with reference to the drawings. The embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, circuitry, topological structures and/or control strategies have been described at a relatively high-level, without much detail, in order to avoid unnecessarily obscuring aspects of the present teachings.

The present teaching aims to improve the current state of the art in charging of rechargeable batteries. Particularly, the present teaching discloses a combined, reconfigurable, onboard traction and charging solution which can find application in electric apparatuses (including, e.g., electric vehicles, special purpose electric vehicles, etc).

An onboard traction-charging system revealed in the present teaching includes a combination of reconfigurable motor phase windings and inverters. When operating in a traction mode, the system works as a traction mechanism which is capable of delivering mechanical power to a load, and under a charging mode, it works as an onboard charger which is capable of charging the battery or batteries included in the vehicle with high power. On the one hand, it is possible to perform recharging rapidly with a high power switched power supply; on the other hand, the costs of establishing EVSEs (or charging stations) that supply AC electric power to the onboard traction-charging system can be reduced significantly.

The onboard traction-charging system according to the present teaching takes full advantage of two pre-existing components in the electric vehicles: an electric motor with stator windings, and a multiphase inverter with switch power devices. A switching mechanism, called a configurator herein, changes connections of the motor windings and of the power switch devices included in the inventor to allow switching between the two operating modes. When the onboard traction-charging system is working under the traction mode, the power switch devices constitute an inverter which converts the DC power outputted from the battery to corresponding AC voltage so as to drives the motor to provide a torque (positive or negative) to drive the vehicle. This torque can either transfer energy from the battery or recover energy in a dynamic braking mode. When the onboard traction-charging system is working under the charging mode, the configurator reconfigures the connection of the inverter and of the motor windings to form one or more front end (with or without a rectification function, a boost function, and/or a power factor correction (PFC) function), and one or more fully isolated DC/DC converter rear end, so as to achieve a fully isolated onboard charger.

Figure 1:
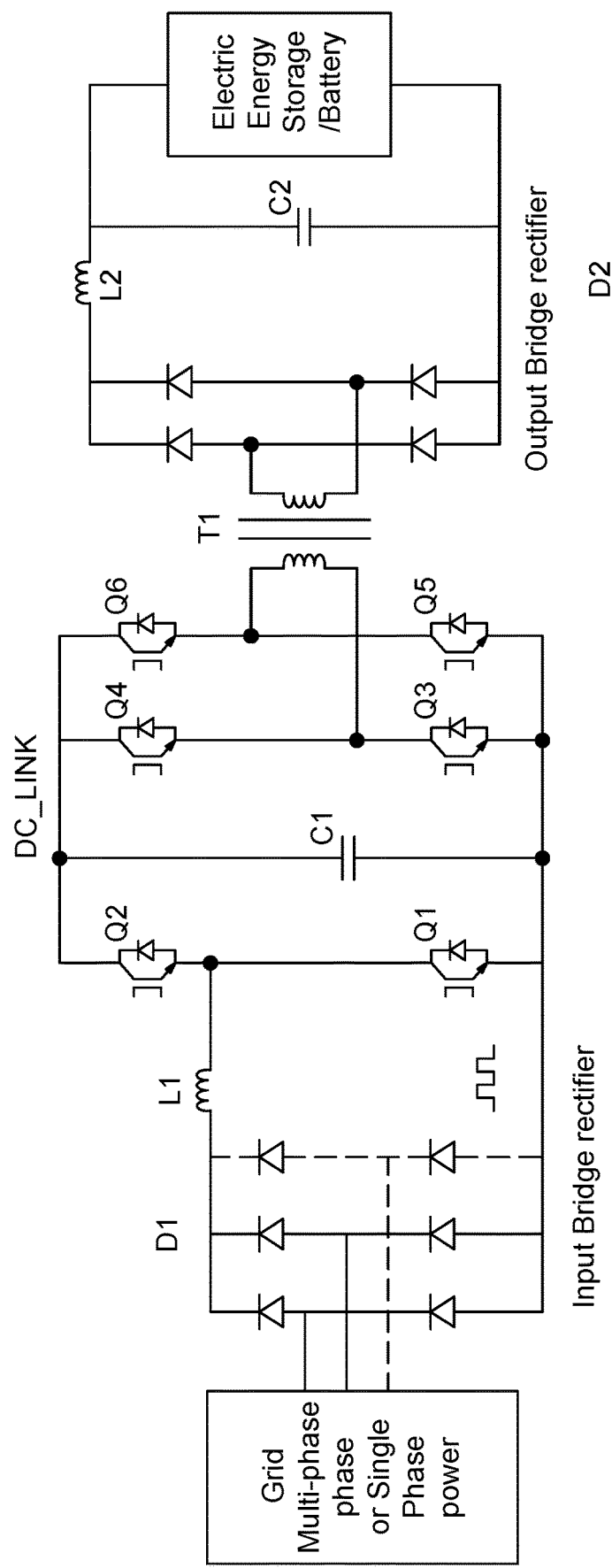
FIG. 1 shows an exemplary simplified circuit diagram related to a conceptual charging power path, in accordance with an exemplary embodiment of the present teaching.

FIG. 1 shows, in a simplified form, a conceptual charging power path in accordance with an example of the present teaching. To facilitate understanding, the specifics pertaining to the shared components associated with the charging and traction modes are not shown in the simplified circuit diagram of FIG. 1.

As shown in FIG. 1, the charging power path comprises an input bridge rectifier or passive rectifier front end D1, which is electrically coupled to a single-phase AC power input or a multi-phase AC power input. A boost converter serves to boost a DC voltage outputted from the input bridge rectifier or passive rectifier front end D1 to a regulated DC link voltage. The boost converter comprises a boost inductor L1, a power switch device Q1 and a power switch device Q2. The regulated DC link voltage DC_LINK outputted from the boost converter is applied to a bridge converter comprising two half bridges (Q3 and Q4; Q5 and Q6). The output of the bridge converter drives a transformer T1 and in turn an output bridge rectifier D2 to produce isolated DC power for charging the battery. An inductor L2 and a capacitor C2 are used to filter and smooth the DC power outputted from the output bridge rectifier D2.

As discussed in the above, although not shown in FIG. 1, the charging power path can share a plurality of components with the traction power path. The concept of sharing the components will be described in detail at the below with reference to the appended drawings. The degree of components sharing between the charging and traction modes may vary depending on the details of the design. The accompanying drawings illustrate various ways to implement the inventive ideas and concepts revealed in the present teaching.

First Embodiment

Figure 2A:
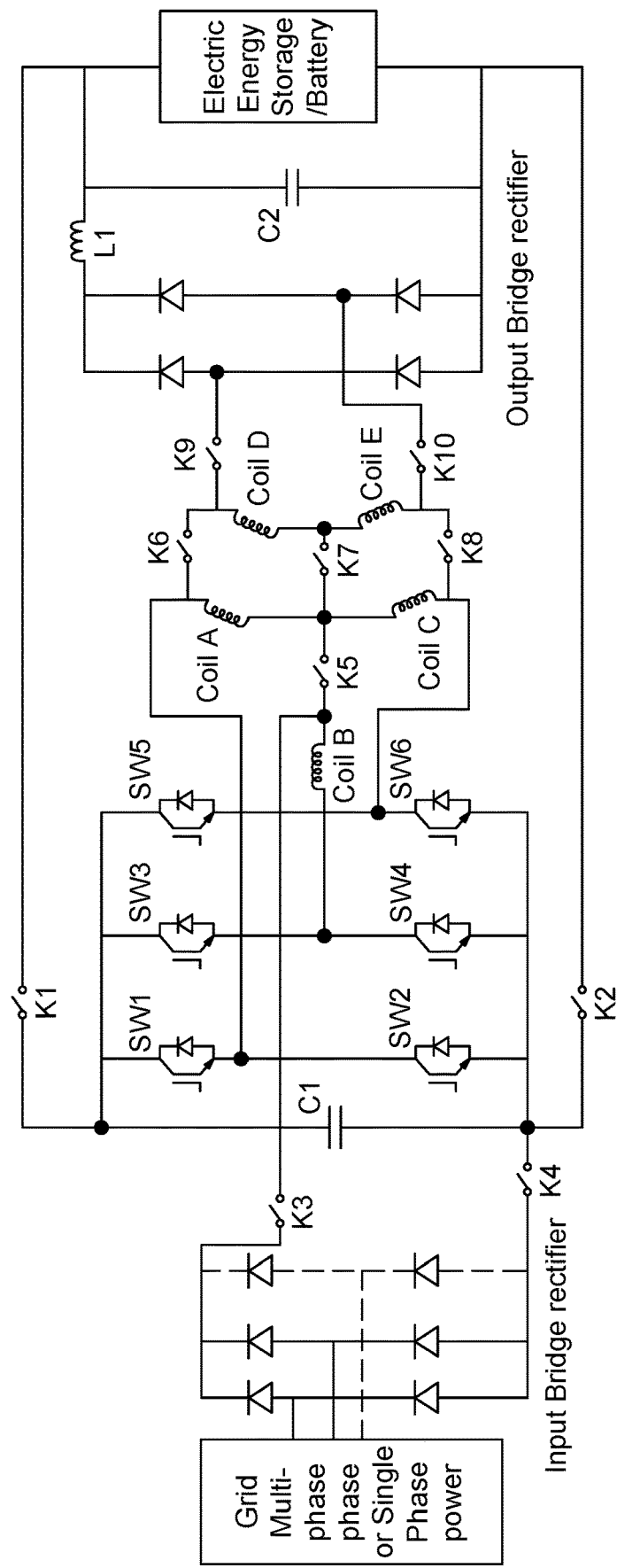
FIG. 2A shows an exemplary schematic drawing related to an onboard charging-traction system, in accordance with an exemplary embodiment of the present teaching.
Figure 2B:
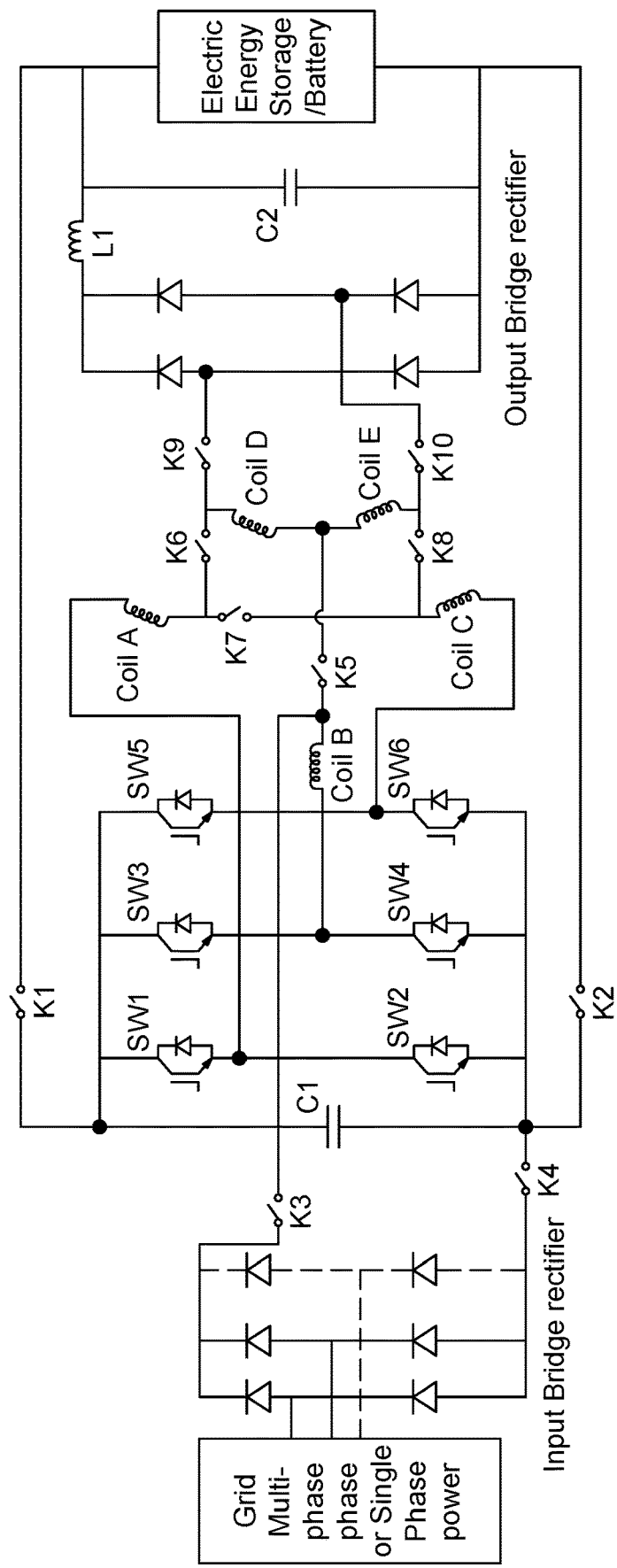
FIG. 2B shows an exemplary schematic drawing related to an onboard charging-traction system, in accordance with an exemplary embodiment of the present teaching.

FIG. 2A shows a schematic drawing related to an onboard charging-traction system in accordance with the first embodiment. In FIG. 2A, certain coils used to construct the transformer under the charging mode are connected in parallel when the system is working under the traction mode. FIG. 2B shows another schematic drawing related to an onboard charging-traction system in accordance with the first embodiment. In FIG. 2B, certain coils used to construct the transformer under the charging mode are connected in series when the system is working under the traction mode.

Except for the difference in connection of the coils (in parallel or in series under the traction mode), the onboard charging-traction systems shown in FIGS. 2A and 2B both comprise a polyphase motor, a rechargeable battery, an inverter, an input rectifier, an output rectifier, a configurator and sets of contactors. The polyphase motor may comprise three or more phases of stator windings. In certain applications, alternatively, the motor may be a two-phase motor driven by two sets of half bridges. The inverter comprises a plurality of power switch devices SW1, SW2, SW3, SW4, SW5 and SW6, and serves to drive the polyphase motor. The power switch devices may have different current capacities. For example, depending on the output power level and/or the input voltage condition, the power switch devices SW3 and SW4, which are used to form a Boost converter in the charging mode, may have higher current capacity than that of SW1, SW2, SW5 and SW6. Depending on the input power is fed from a single phase or a multiple phase power supply, the input rectifier may be a single phase or a multiple phase bridge rectifier. When a DC power source is used to supply the charging power, the input rectifier may be omitted. The configurator comprises a plurality of contactors K1, K2, K3, K4, K5, K6, K7, K8, K9 and K10. Under proper control, the configurator serves to re-configure connections of various components, in particular the connections among the windings and/or the power switch devices SW1, SW2, SW3, SW4, SW5 and SW6, so as to switch the system between different operation modes. The set of contactors K1 and K2 may be used to connect and disconnect the positive and negative terminals of the rechargeable battery. More specifically, the contactors K1 and K2 are open under the charging mode, and closed under the traction mode. The set of contactors K3 and K4 may be used to connect and disconnect the DC power rectified from the input AC power. The contactors K3 and K4 are closed under the charging mode, and open under the traction mode.

In addition, the systems shown in FIGS. 2A and 2B may further comprise an input filter and/or an output filter, which may be used to reduce noise and voltage or current ripple. These input and output filters may include, but not limited to, inductors and/or capacitors. A capacitor C1 may be linked to the input side of the inverter. Although the capacitor C1 is shown as a single one, it also can be multiple capacitors or a module with multiple capacitors packaged together. As an example of the output filter, an inductor L1 and a capacitor C2 are shown in FIGS. 2A and 2B. Although the output capacitor C2 is shown as a single one, it also can be multiple capacitors or a module with multiple capacitors packaged together. Although the output capacitor C2 is shown as a single one, it also can be multiple capacitors or a module with multiple capacitors packaged together. Alternatively, if the battery is capable to tolerate the ripple current at the output side of the output bridge rectifier, the capacitor C2 can be omitted.

Although not shown in FIGS. 2A and 2B, other circuit protection components may be included in the system, including but not limited to pre-charge circuits, discharge circuits, inrush current protection circuits, etc.

As discussed in the above, both onboard charging-traction systems illustrated in FIGS. 2A and 2B may be configured to operate under either one of two working modes, i.e., the charging mode and the traction mode. The details related to the configuration will be described at the below with reference to FIGS. 4A-F.

Figure 3:
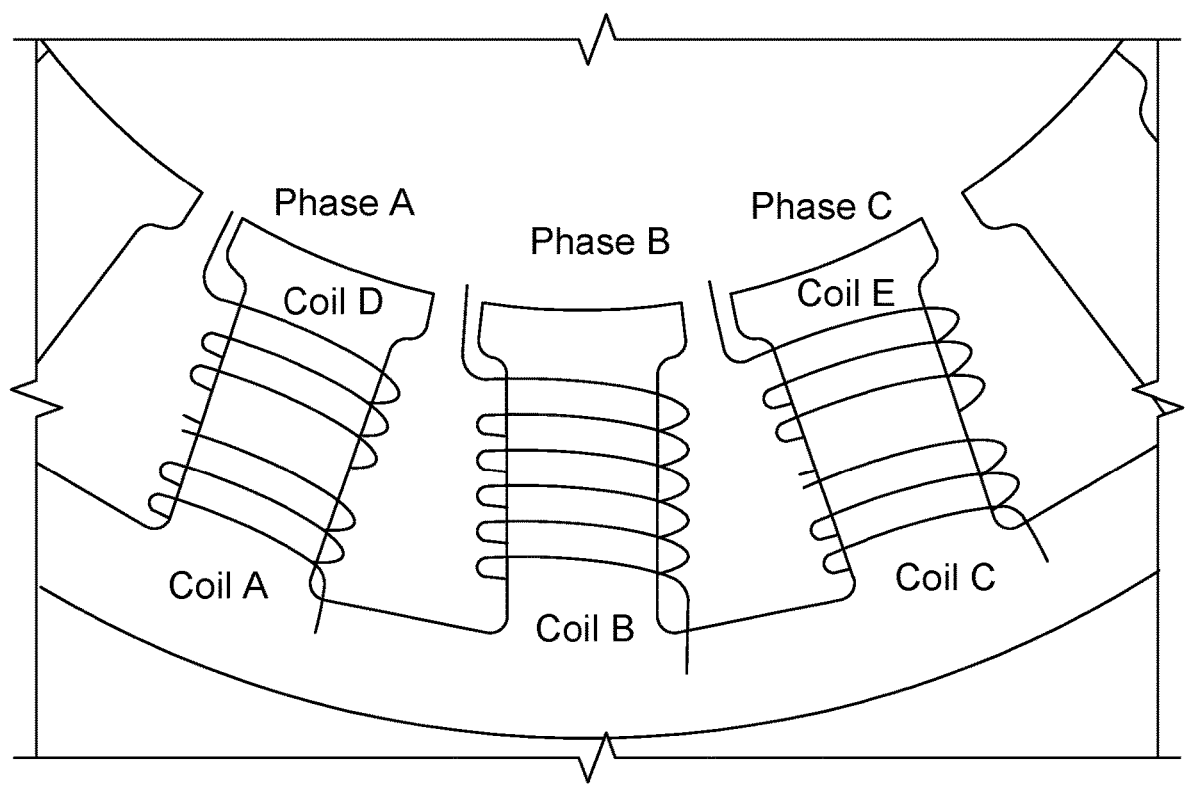
FIG. 3 shows an exemplary structure of windings wound on teeth of a motor stator, in accordance with an exemplary embodiment of the present teaching.

Now refer to FIG. 3, which shows an exemplary structure of the windings wound on the motor stator teeth in accordance with an example of the present teaching. For an instance, the motor may be an 18 teeth, 6 pole pair, 3 phase Permanent Magnet Synchronous Motor (PMSM), in which the winding on at least one tooth of the motor stator is split into two or more coils. As exemplarily illustrated in FIG. 3, two sets of windings reside on each of a phase A and phase C teeth, while one set of windings reside on a phase B tooth. The split windings have separate terminals to be reconfigured into different connections. As such, the magnetics components in the concept charging path illustrated in FIG. 1 and the charging systems illustrated associated with FIGS. 2A and 2B can be implemented with the windings wound on the stator teeth of the motor. For example, as shown in FIG. 3, the winding on the phase A tooth is split into a Coil A and a Coil D, and the winding on the phase C tooth is split into a Coil C and a Coil E. Coils A, C, D and E form the transformer when the onboard charging-traction system is operating under the charging mode. A separate winding, Coil B, can be used for the boost inductor in the charging mode with the contactor K5 open, and as a phase winding in the traction mode with the contactor K5 closed. Alternatively, the boost function can be implemented by a separate inductor instead of Coil B, with modification in the circuit connections (for example, the contactor K5 is no longer necessary in this situation).

Figure 4A:
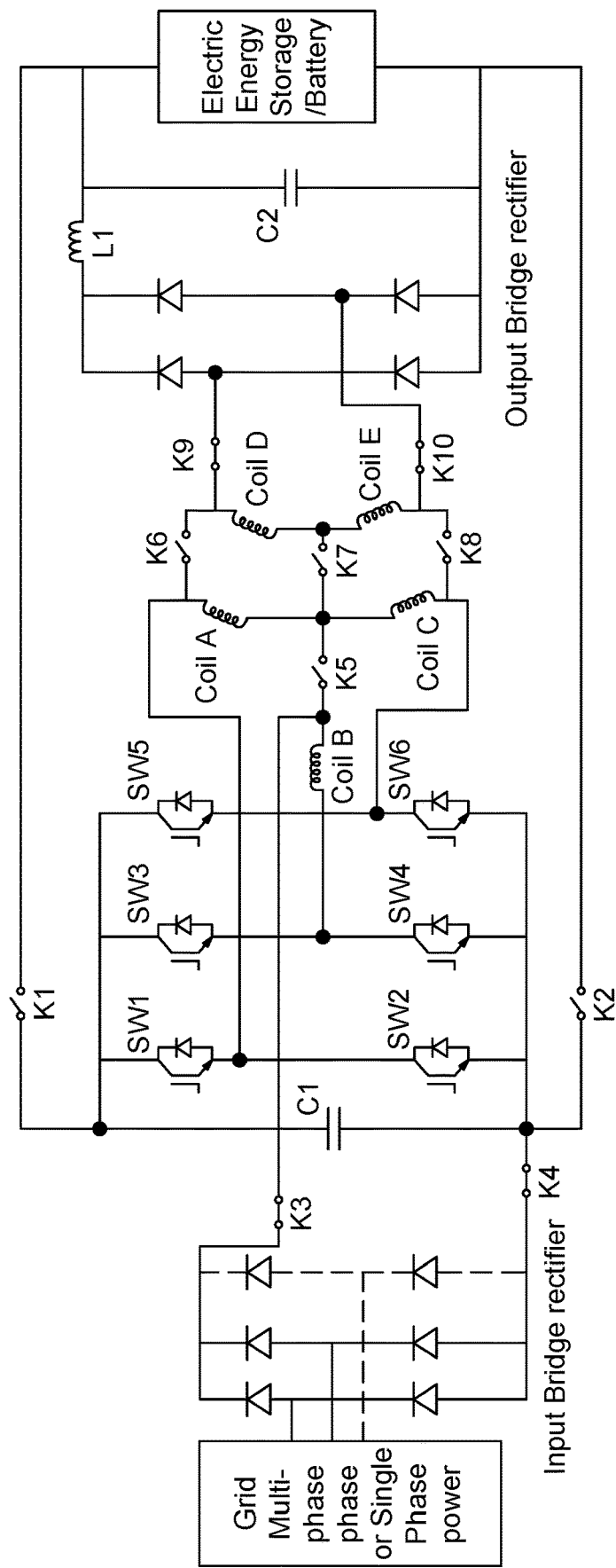
FIG. 4A shows an exemplary schematic drawing related to an onboard charging-traction system, in accordance with an exemplary embodiment of the present teaching.
Figure 4B:
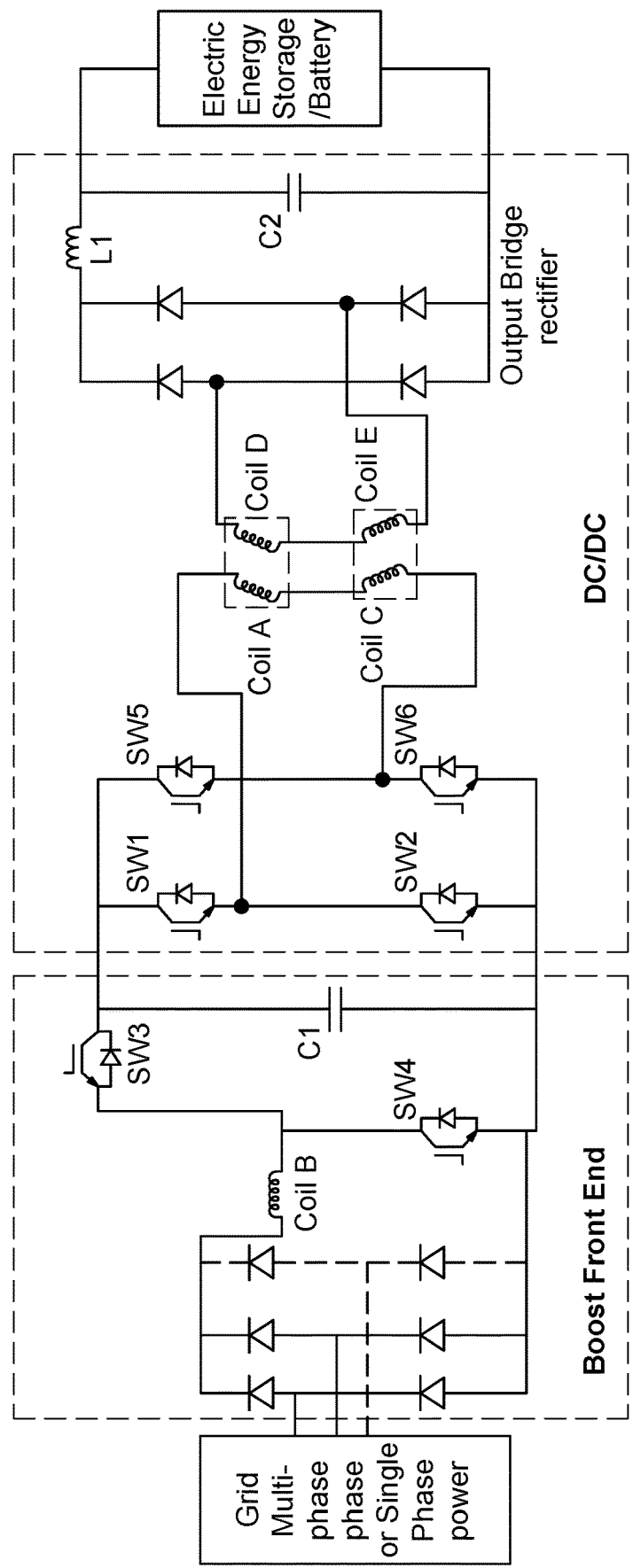
FIG. 4B shows an exemplary simplified circuit diagram related to a charging power path of an onboard charging-traction system, in accordance with an exemplary embodiment of the present teaching.

FIG. 4A shows a schematic drawing related to the onboard charging-traction system as illustrated in FIG. 2A, wherein the open/closed status of the contactors are controlled, such that the system is operating under the charging mode. In FIG. 4A, the contactors K3, K4, K9 and K10 are closed, and K1, K2, K5, K6, K7 and K8 are open. Accordingly, a charging power path is constructed as shown in FIG. 4B. In order to avoid unnecessarily obscuring aspects of the present teaching, no contactors are shown in the simplified circuit diagram of FIG. 4B.

Figure 4C:
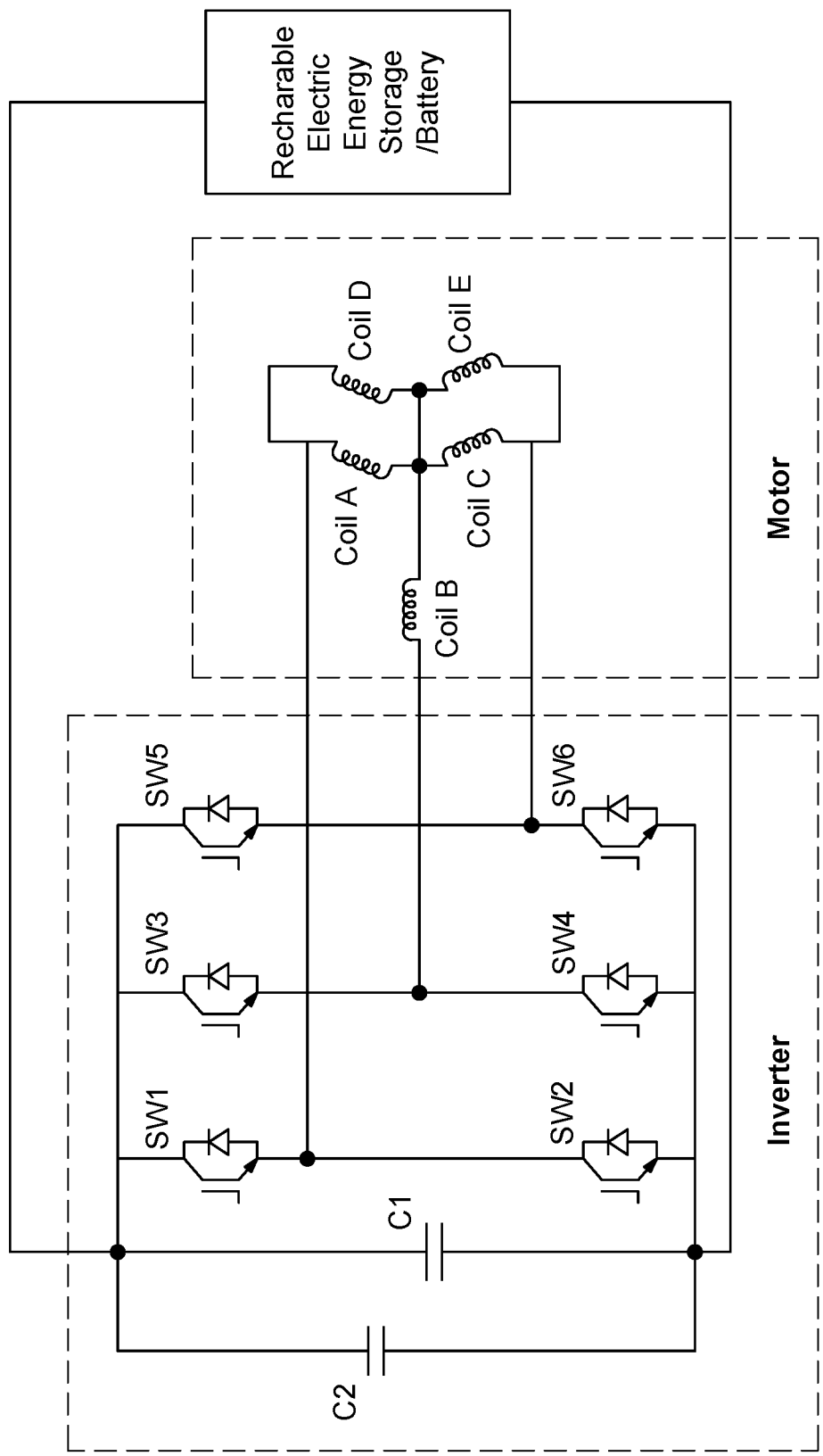
FIG. 4C shows an exemplary simplified circuit diagram related to a traction power path of an onboard charging-traction system, in accordance with an exemplary embodiment of the present teaching.

To configure the onboard charging-traction system as illustrated in FIG. 2A to the traction mode, the contactors K1, K2, K5, K6, K7 and K8 are closed, and K3, K4, K9 and K10 are open. Accordingly, a traction power path is constructed as shown in FIG. 4C. In the working mode shown in FIG. 4C, all of the windings that sit on the same tooth are connected in parallel. As such, Coil A and Coil D together form Phase A, Coil C and Coil E together form Phase C, and Coil B forms Phase B by itself. In order to avoid unnecessarily obscuring aspects of the present teaching, no contactors are shown in the simplified circuit diagram of FIG. 4C.

Figure 4D:
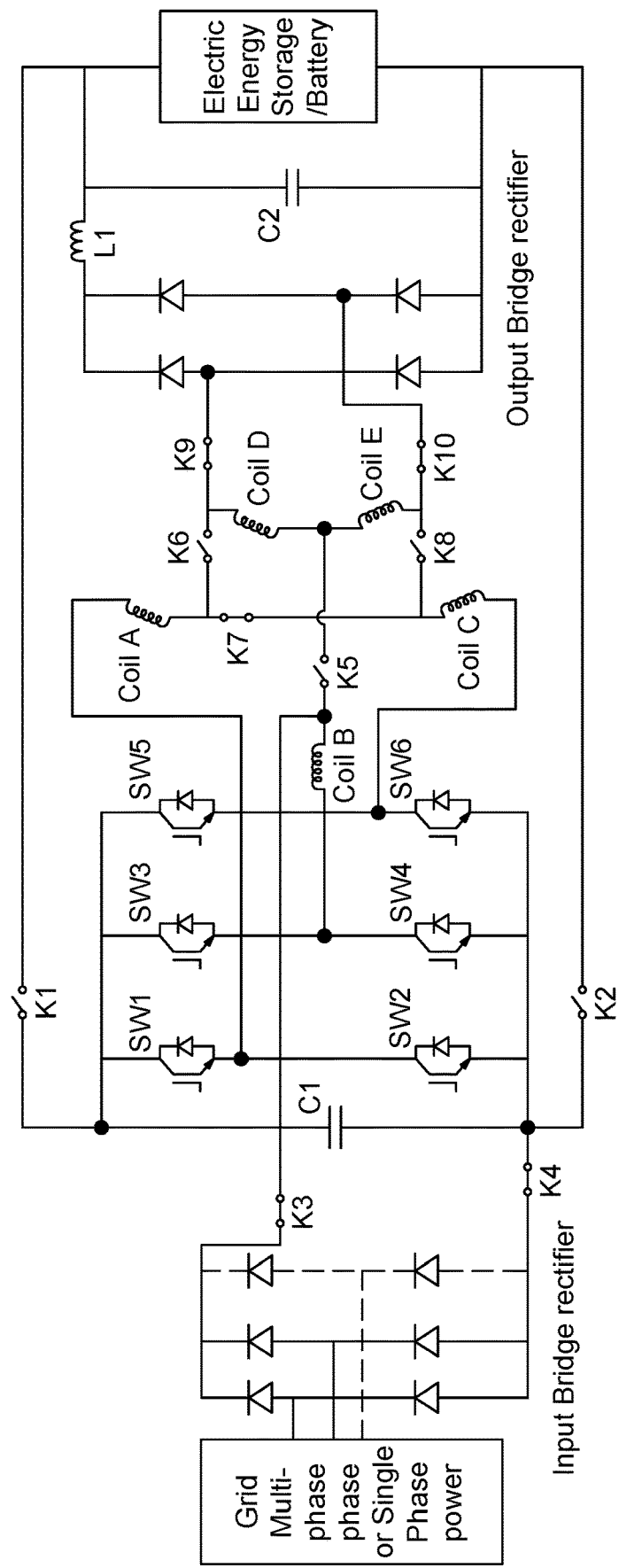
FIG. 4D shows an exemplary schematic drawing related to an onboard charging-traction system, in accordance with an exemplary embodiment of the present teaching.
Figure 4E:
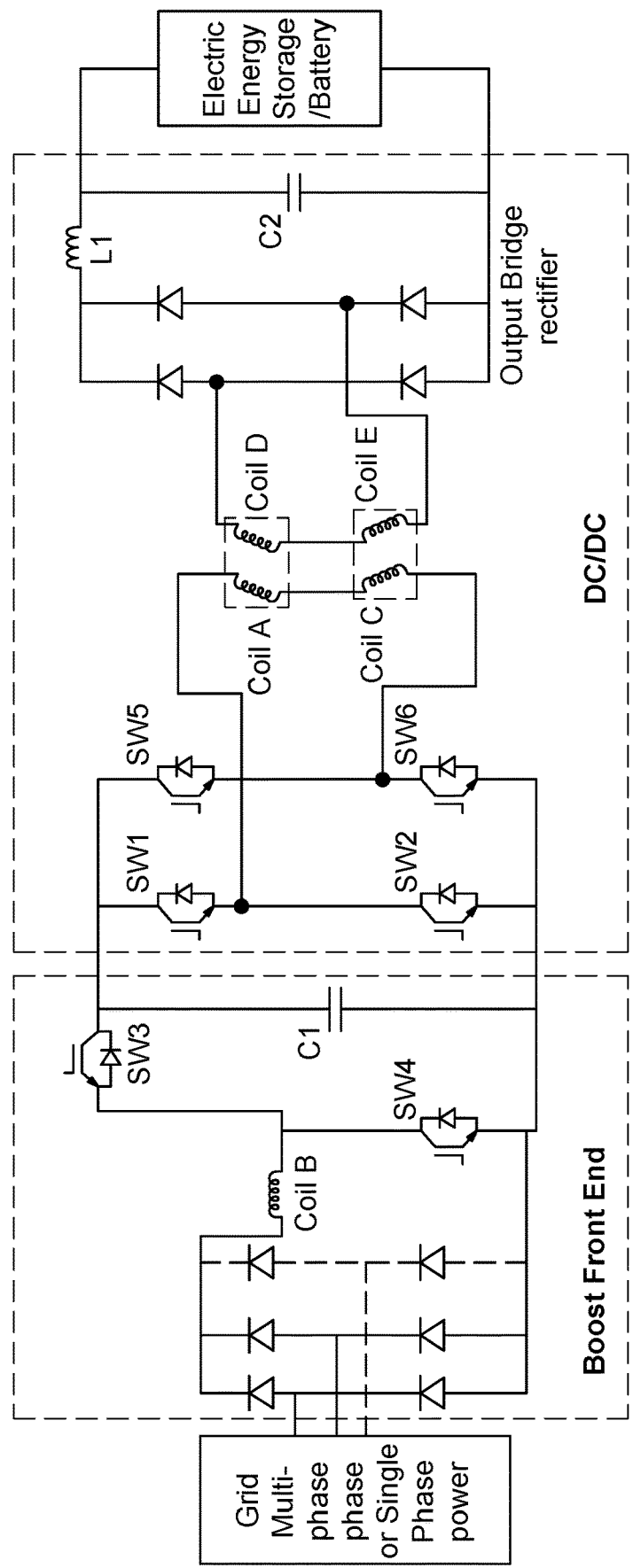
FIG. 4E shows an exemplary simplified circuit diagram related to a charging power path of onboard charging-traction system, in accordance with an exemplary embodiment of the present teaching.

FIG. 4D shows a schematic drawing related to the onboard charging-traction system as illustrated in FIG. 2B, wherein the open/closed status of the contactors are controlled, such that the system is operating under the charging mode. In FIG. 4D, the contactors K3, K4, K7, K9 and K10 are closed, and K1, K2, K5, K6 and K8 are open. Accordingly, a charging power path is constructed as shown in FIG. 4E. In order to avoid unnecessarily obscuring aspects of the present teachings, no contactors are shown in the simplified circuit diagram of FIG. 4E.

Figure 4F:
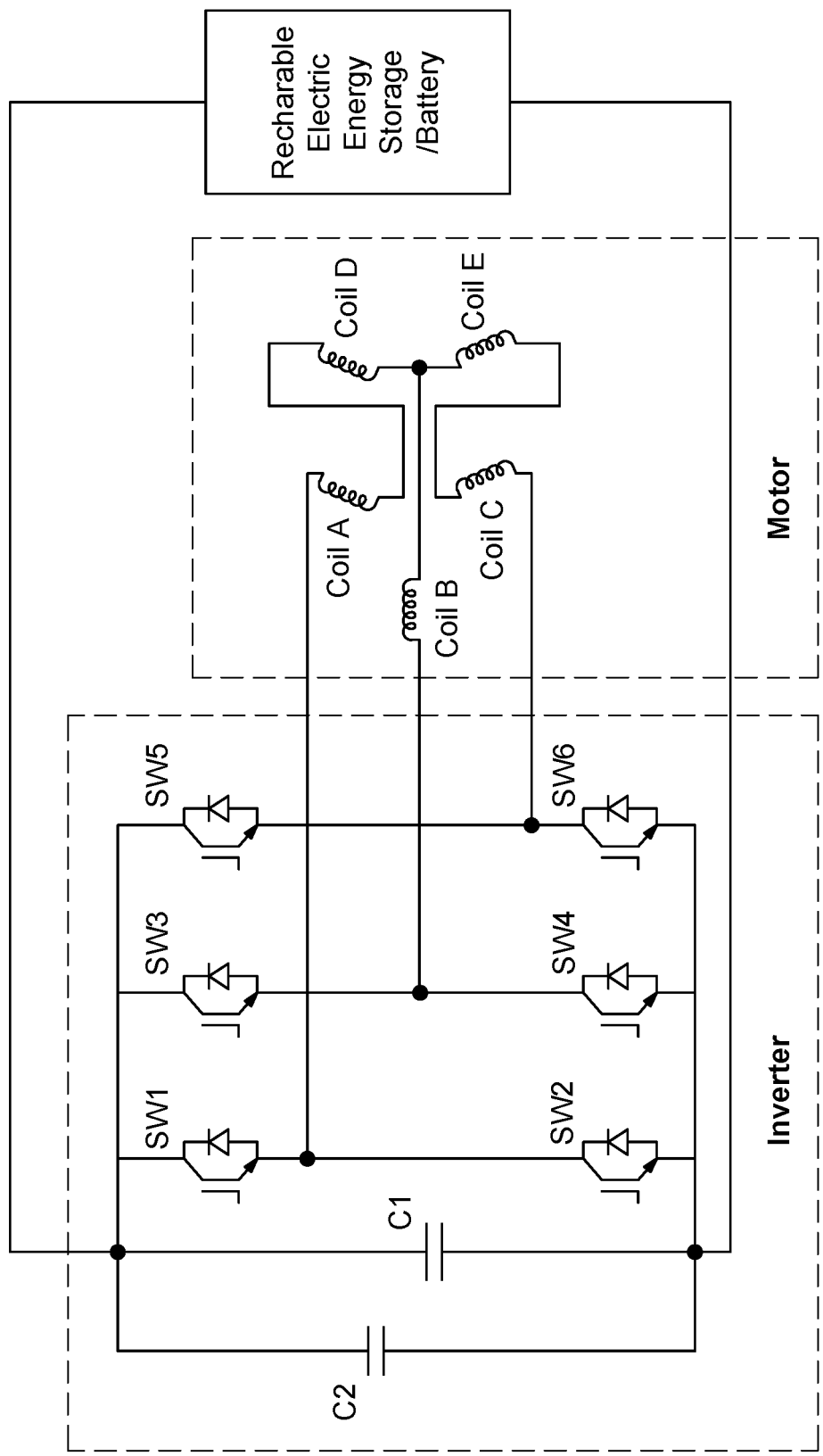
FIG. 4F shows an exemplary simplified circuit diagram related to a traction power path of an onboard charging-traction system, in accordance with an exemplary embodiment of the present teaching.

Similarly, to configure the system as shown in FIG. 2B into the traction mode, the contactors K1, K2, K5, K6 and K8 are closed, and K3, K4, K7, K9 and K10 are open. Accordingly, a traction power path is constructed as shown in FIG. 4F. All the windings that sit on the same tooth are connected in series. In this case, Coil A and Coil D together form Phase A, Coil C and Coil E together form Phase C, and Coil B forms as Phase B by itself. In order to avoid unnecessarily obscuring aspects of the present teaching, no contactors are shown in the simplified circuit diagram of FIG. 4F.

When the onboard charging-traction system is configured into the traction mode, the rechargeable battery may supply DC power to the multiphase inverter. Then, the inverter may convert the DC power into AC power and drive the polyphase motor to operate. Here a conventional three phase motor drive may be utilized. In a typical electric vehicle application where a permanent magnet motor is deployed, a sensor may be provided for measuring rotor position so as to control the motor to achieve desired performance, especially when the shaft speed is low. Normally, the power switch devices used in the inverter of the onboard charging-traction system may be IGBT or FET devices driven via vector control methods under the control of a processor (such as a DSP, a FPGA, etc). To achieve the vector control, current sensors may also be arranged with respect to at least two phases to detect phase current which is to be regulated by the processor.

When the system is configured into the charging mode, a fully isolated two stage charger is provided, which comprises a front end stage (with or without boost and/or PFC function) and a DC/DC rear end. The front end stage may be constructed with an input bridge rectifier. Further, Coil B of the motor stator may act as a boost inductor, with the power switch device SW4 as a boost switch, the body diode of the power switch device SW3 as a flyback diode, and the capacitor C1 as an output capacitor. Alternatively, if the system is operated with the power switch device SW4 always OFF, the front end is formed as a simple rectifier. The inductance of Coil B may help smooth the current in some degree; typically, it is not large enough to achieve a high power factor.

If the input grid AC voltage is fed from a single phase or a split phase power supply, the boost front end can perform the function of Power Factor Corrections (PFC) as well. In this situation, the input voltage is measured, and the input current is shaped to follow the shape of the sinusoidal input voltage. With this approach, a high power factor (e.g., larger than 0.99) can be achieved. At least one input current sensor may be provided to achieve this function. In addition, under the PFC approach, the intermediate voltage (DC Link Voltage) on the capacitor C1 may need to be above the peak input voltage to allow control of the current. For example, for a 240V RMS line, the DC Link voltage may need to be above about 400V.

As discussed at the above, the Phase B coil operates electrically as a separate input inductor. For three phase inputs, this single input inductor plus switch topology may not be able to make input currents to follow the shape of the sinusoidal input voltages. However, controlling the current in Coil B to be constant helps to obtain a power factor better than passive rectification approaches with small inductance. Typically, an improved power factor around 0.955 still can be achieved.

As can be seen from the second DC/DC stage illustrated in FIGS. 4B and 4E, the power switches SW1, SW2, SW5 and SW6 construct an H bridge drive. Note that the H Bridge is a buck converter. Coil A and Coil C act as the transformer's primary winding and Coil D and Coil E act as the transformer's secondary winding. Then, a bridge rectifier converts the AC power outputted from the transformer secondary side to a DC power pulsating at the corresponding PWM frequency, and the inductor L1 removes most of the high frequency PWM components from the charging current outputted to the rechargeable battery. The output rectifier can be implemented with multiple diodes in parallel or a single bridge rectifier.

Second Embodiment

Under this second embodiment, the charging power is fed from a single phase or single split phase AC power input, and an input bridge rectifier front end included in the charging power path has a PFC Boost converter.

Figure 5A:
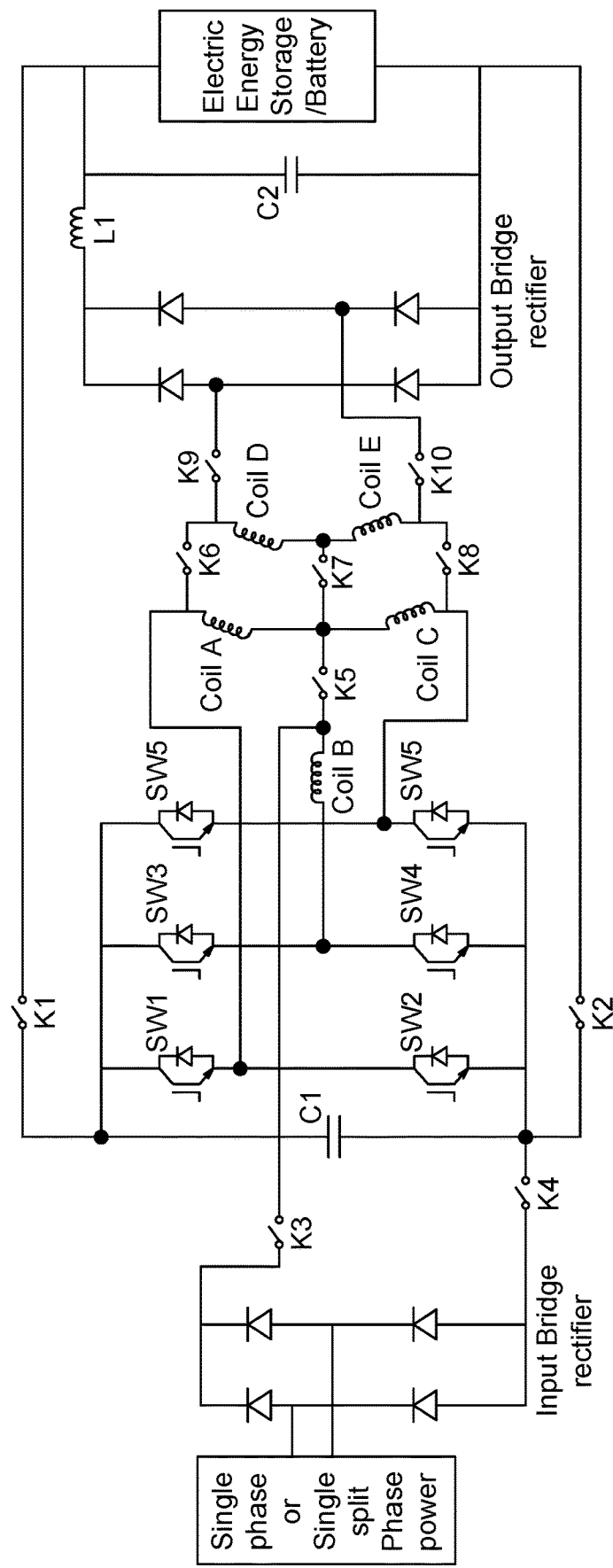
FIG. 5A shows an exemplary schematic drawing related to an onboard charging-traction system, in accordance with an exemplary embodiment of the present teaching.
Figure 5B:
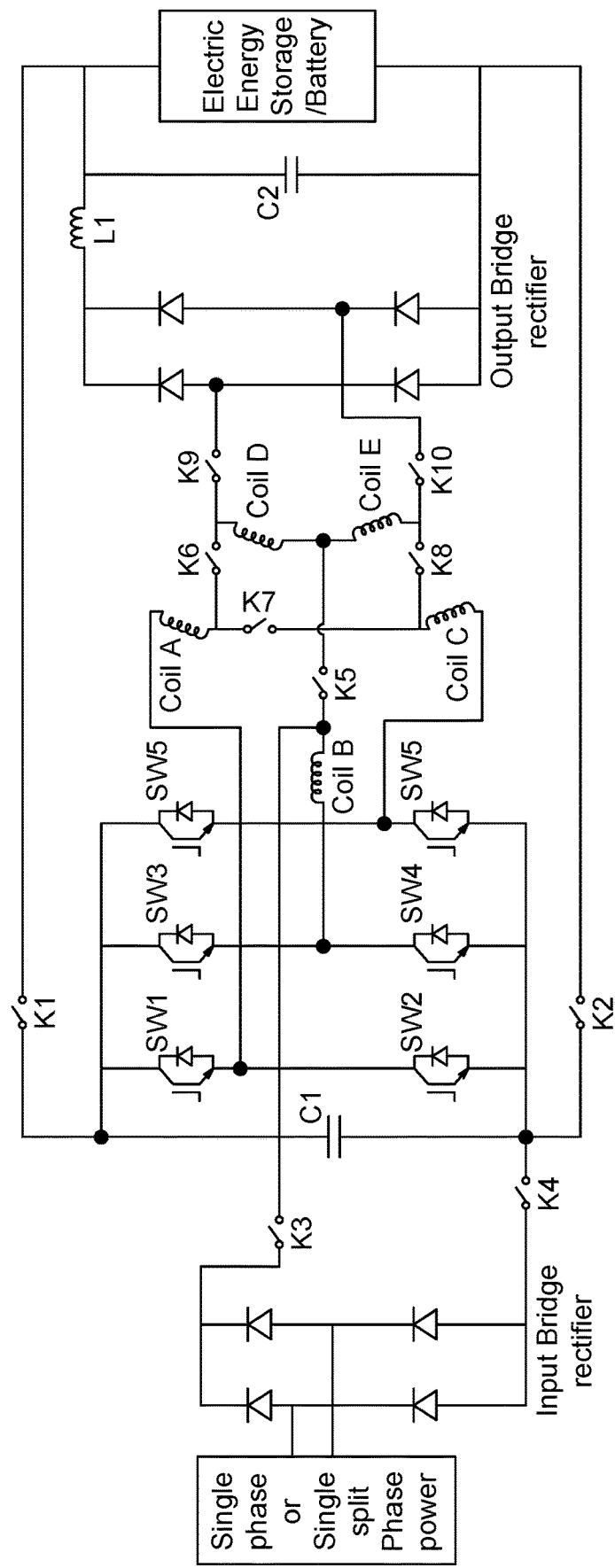
FIG. 5B shows an exemplary schematic drawing related to an onboard charging-traction system, in accordance with an exemplary embodiment of the present teaching.

FIG. 5A shows a schematic drawing related to an onboard charging-traction system in accordance with the second embodiment. In FIG. 5A, certain coils used to construct the transformer under the charging mode are connected in parallel when the system is working under the traction mode. FIG. 5B shows another schematic drawing related to an onboard charging-traction system in accordance with the second embodiment. In FIG. 5B, certain coils used to construct the transformer under the charging mode are connected in series when the system is working under the traction mode.

Except for the difference in connection of the coils (in parallel or in series under the traction mode), the onboard charging-traction systems shown in FIGS. 5A and 5B both comprise a polyphase motor, a rechargeable battery, an inverter, an input rectifier, an output rectifier, a configurator and sets of contactors. The polyphase motor may comprise three or more phases of stator windings. In certain applications, alternatively, the motor may be a two-phase motor driven by two sets of half bridges. The inverter comprises a plurality of power switch devices SW1, SW2, SW3, SW4, SW5 and SW6, and serves to drive the polyphase motor. The power switch devices may have different current capacities. The input rectifier may be a single phase bridge rectifier. The configurator comprises a plurality of contactors K1, K2, K3, K4, K5, K6, K7, K8, K9 and K10. Under proper control, the configurator serves to re-configure connections of various components, in particular the connections among the windings Coils A-E and/or the power switch devices SW1-6, so as to switch the system between different operation modes. The set of contactors K1 and K2 may be used to connect and disconnect the positive and negative terminals of the rechargeable battery. More specifically, the contactors K1 and K2 are open under the charging mode and closed under the traction mode. The set of contactors K3 and K4 may be used to connect and disconnect the DC power rectified from the input AC power. The contactors K3 and K4 are closed under the charging mode and open under the traction mode.

In addition, the systems shown in FIGS. 5A and 5B may further comprise an input filter and/or an output filter, which may be used to reduce noise and voltage or current ripple. These input and output filters may include, but not limited to, inductors and/or capacitors. A capacitor C1 may be linked to the input side of the inverter. Although here the capacitor C1 is shown as a single one, it also can be multiple capacitors or a module with multiple capacitors packaged together. As an example of output filtering components, an inductor L1 and a capacitor C2 are shown in FIGS. 5A and 5B. Although the output capacitor C2 is shown as a single one, it also can be multiple capacitors or a module with multiple capacitors packaged together. Alternatively, if the battery is capable to tolerate the ripple current at the output side of the output bridge rectifier, the capacitor C2 can be omitted.

Although not shown in FIGS. 5A and 5B, other circuit protection components may be included in the system, including but not limited to pre-charge circuits, discharge circuits, inrush current protection circuits, etc.

Figure 6A:
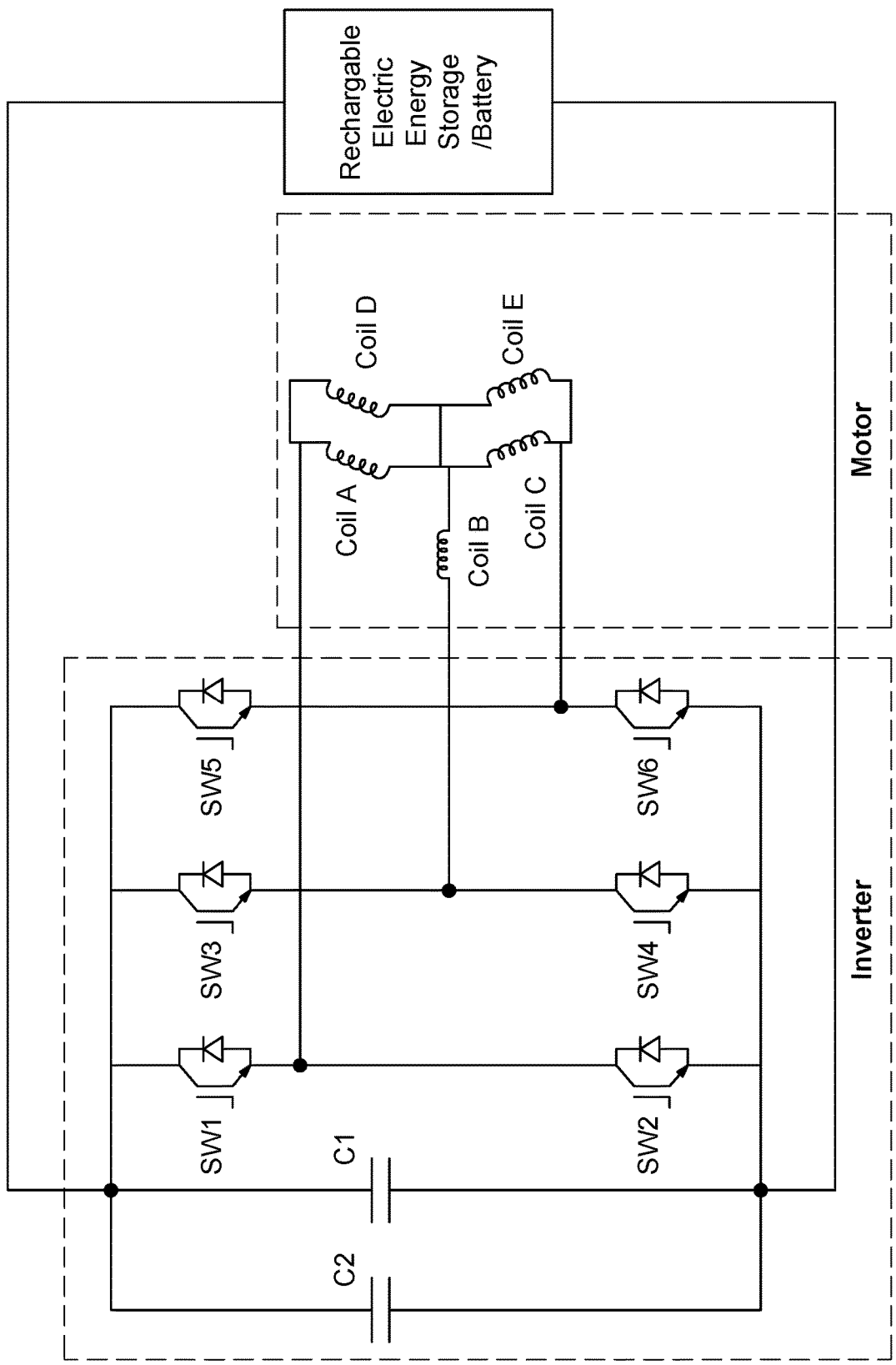
FIG. 6A shows an exemplary simplified circuit diagram related to an onboard charging-traction system, in accordance with an exemplary embodiment of the present teaching.
Figure 6B:
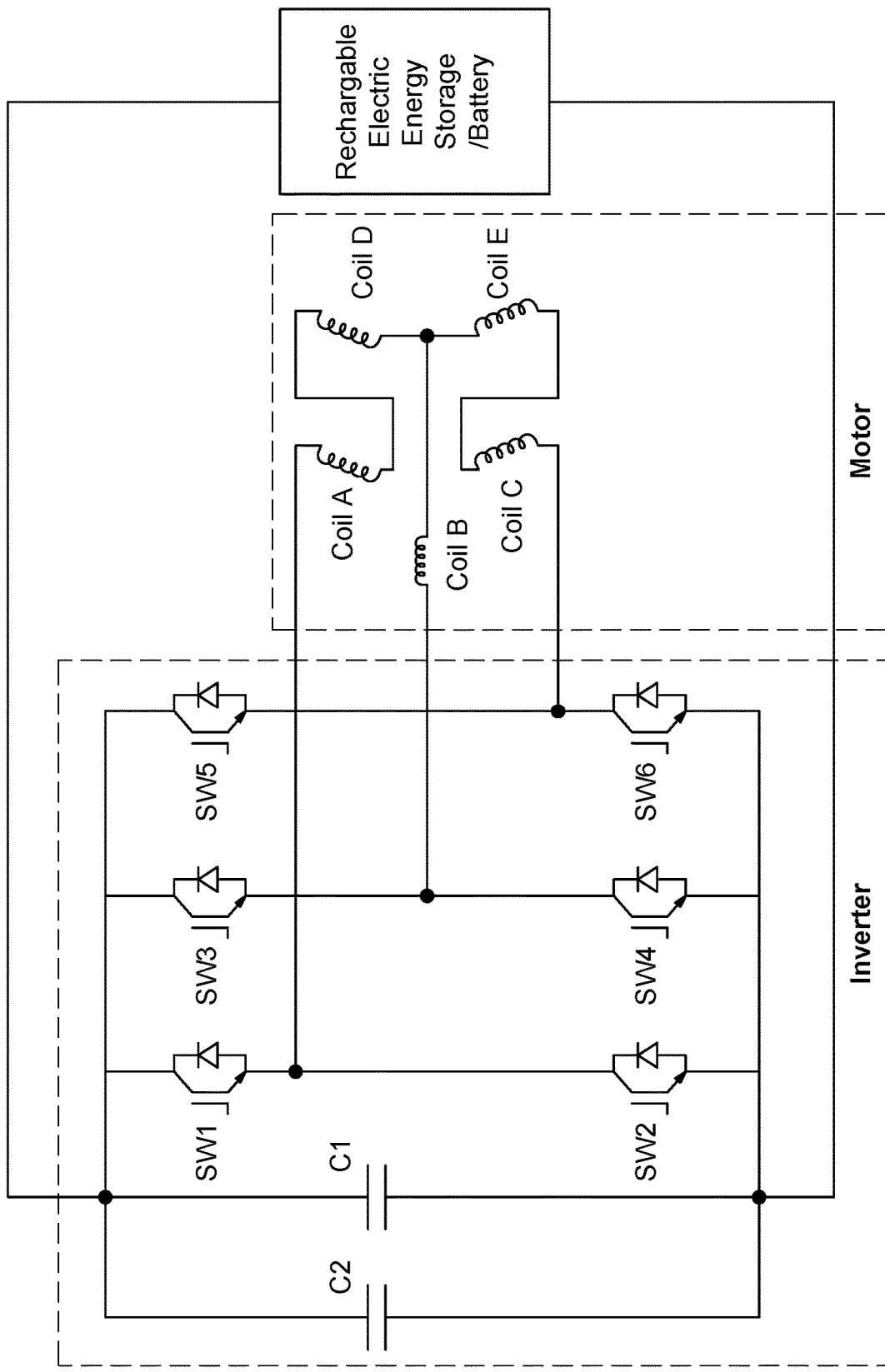
FIG. 6B shows an exemplary simplified circuit diagram related to an onboard charging-traction system, in accordance with an exemplary embodiment of the present teaching.

Refer back to FIG. 3, at least one of the windings wound on the motor stator teeth may split to two coils. The split windings have separate terminals that can be reconfigured into different connections to adapt to different operating modes, i.e., the charging mode and the traction mode. To configure the onboard charging-traction system as shown in FIG. 5A into the traction mode, the contactors K1, K2, K5, K6, K7 and K8 are closed, and K3, K4, K9 and K10 are open. As a result, a traction power path is constructed as shown in FIG. 6A. In the working mode shown in FIG. 6A, all the coils that sit on the same tooth are connected in parallel. As such, Coil A and Coil D together form Phase A, Coil C and Coil E together form Phase C, and Coil B forms Phase B by itself. Similarly, to configure the onboard charging-traction system as shown in FIG. 5B into the traction mode, the contactors K1, K2, K5, K6 and K8 are closed, and K3, K4, K7, K9 and K10 are open. Accordingly, a traction power path is constructed as shown in FIG. 6B. In the working mode shown in FIG. 6B, all the coils that sit on the same tooth are connected in series. As such, Coil A and Coil D together form Phase A, Coil C and Coil E together form Phase C, and Coil B forms as Phase B by itself.

When the onboard charging-traction system is operating under the traction mode, the rechargeable battery may supply DC power to the multiphase inverter. Then, the inverter may convert the DC power into AC power and thus drive the polyphase motor to operate.

Figure 6C:
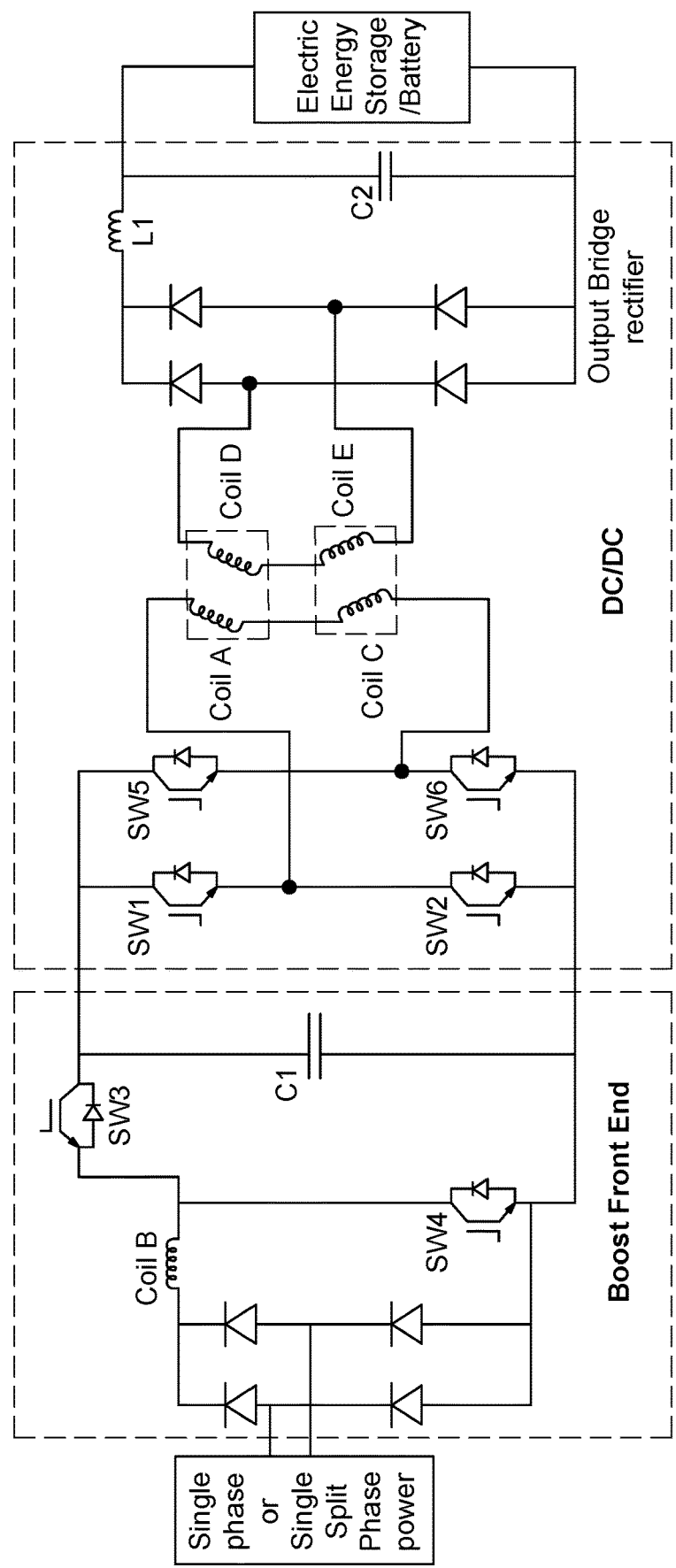
FIG. 6C shows an exemplary simplified circuit diagram related to an onboard charging-traction system, in accordance with an exemplary embodiment of the present teaching.

To configure the onboard charging-traction system as shown in FIG. 5A into the charging mode, the contactors K3, K4, K9 and K10 are closed, and K1, K2, K5, K6, K7 and K8 are open. To configure the onboard charging-traction system as shown in FIG. 5B into the charging mode, the contactors K3, K4, K7, K9 and K10 are closed, and K1, K2, K5, K6 and K8 are open. FIG. 6C shows a charging power path as constructed, which is applied to both onboard charging-traction systems shown in FIGS. 5A and 5B.

When the onboard charging-traction system is configured into the charging mode, a fully isolated two stage charger is provided, which comprises a PFC Boost front end stage and a fully isolated DC/DC rear end stage. The front end stage comprises an input bridge rectifier. Further, Coil B of the motor may act as a PFC Boost inductor, with the power switch device SW4 as a Boost switch, the body diode of the power switch device SW3 as a flyback diode, and the capacitor C1 as an output capacitor. In the DC/DC rear end stage, the power switch devices SW1, SW2, SW5 and SW6 construct an H bridge drive. In addition, Coil A and Coil C act as the transformer's primary winding and Coil D and Coil E act as the transformer's secondary winding. The output bridge rectifier converts the AC power outputted from the transformer secondary side to DC power. The inductor L1 and the output capacitor C2 are coupled at the output side of the output bridge rectifier to remove ripple components in the DC power.

In this charging mode, the PFC Boost front end stage may convert the grid AC single phase power to DC power, while performing Power Factor correction with respect to the grid. By using the input voltage as a reference for the current in the Coil B inductor, the input current can be shaped into a sinusoidal waveform. For example, a current feedback loop may control the current to follow the reference which is proportional to input voltage, and a feedback loop may regulate the DC link voltage on the capacitor C1. The control can be implemented via a separate power factor correction control IC or a control processor which will be described in the below with reference to FIG. 16. Then, the second stage H bridge may take the DC power from the front end stage as input, invert it into AC power, and pass the inverted AC power through the transformer formed by the windings of the motor, such that full isolation is achieved. The AC power outputted by the transformer is applied to the output bridge rectifier and then to the output filter to generate the DC power for charging the battery.

Third Embodiment

Under this third embodiment, the charging power is fed from a multiphase AC power input, and the charging power path comprises a full three phase PFC front end stage.

Figure 7A:
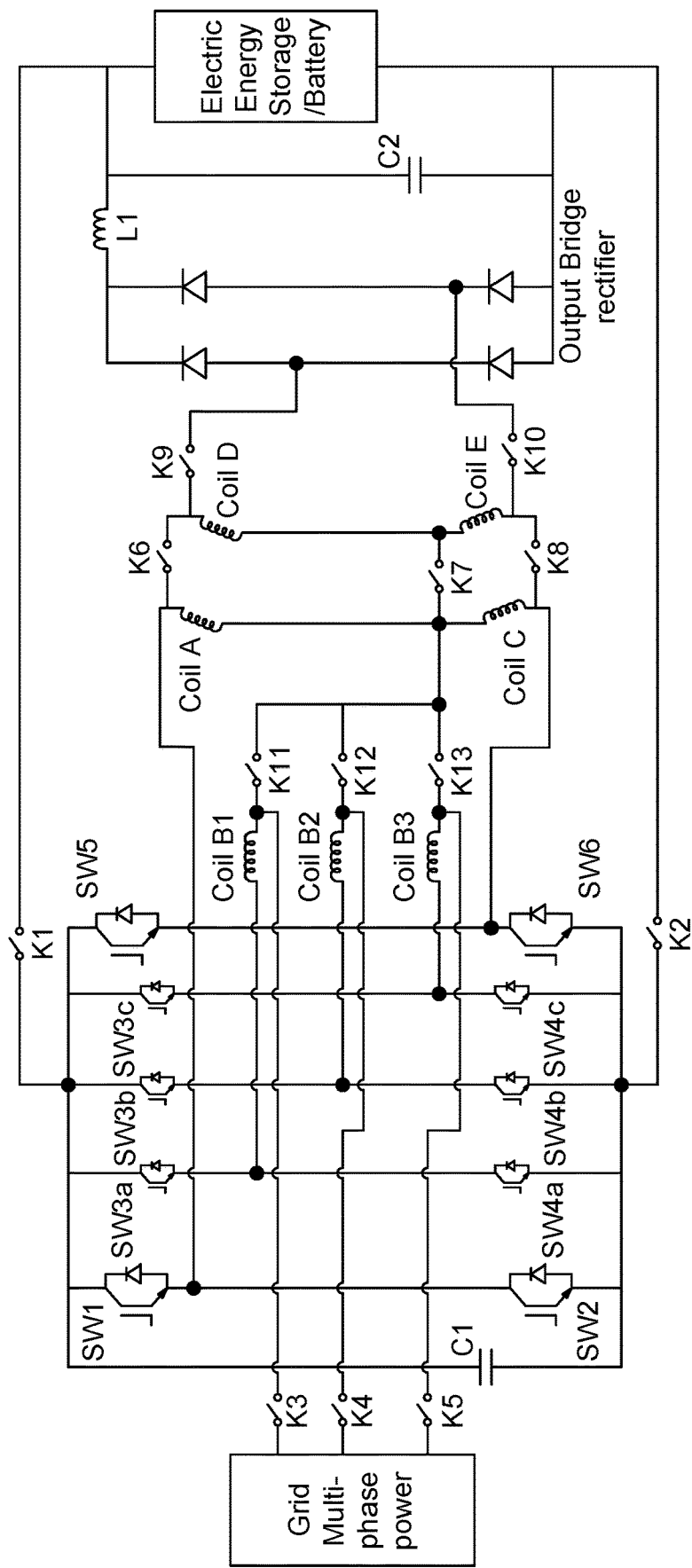
FIG. 7A shows an exemplary schematic drawing related to an onboard charging-traction system, in accordance with an exemplary embodiment of the present teaching.
Figure 7B:
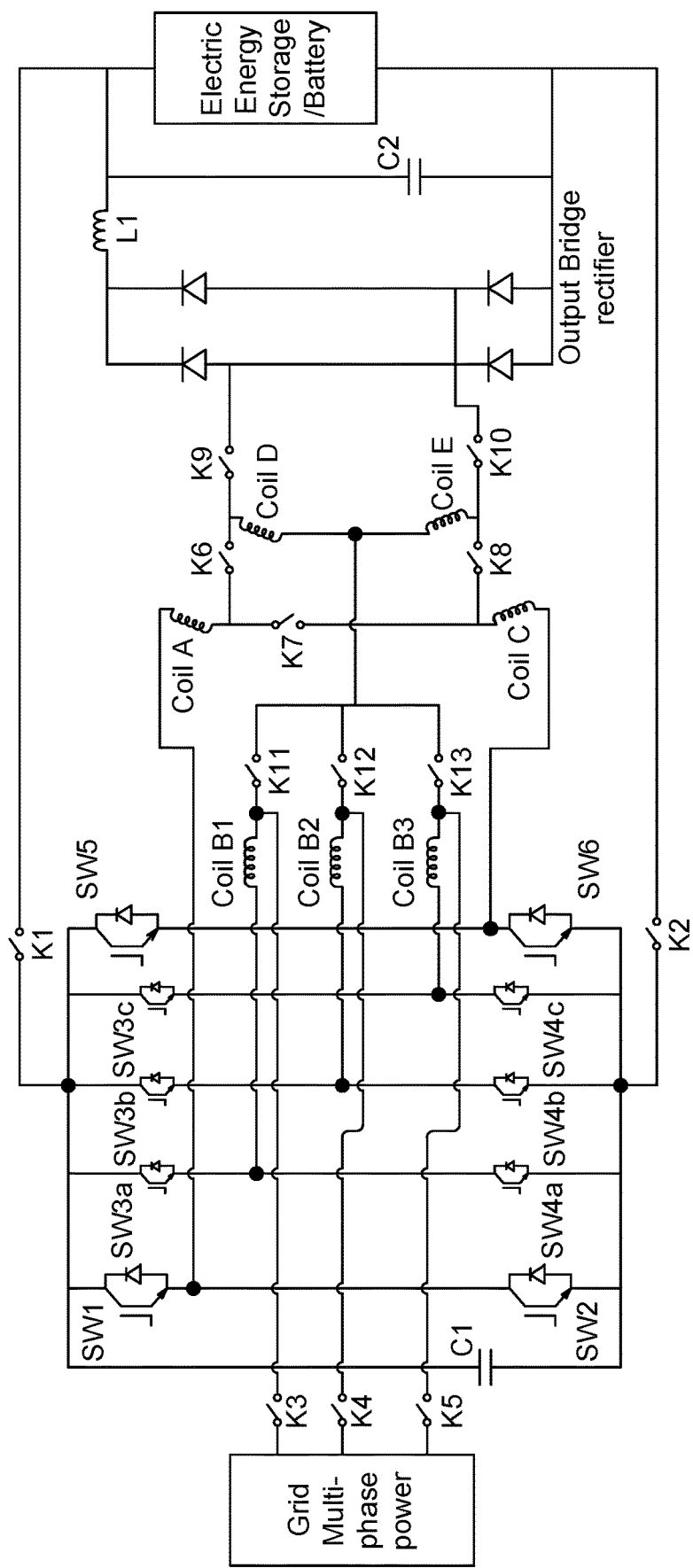
FIG. 7B shows an exemplary schematic drawing related to an onboard charging-traction system, in accordance with an exemplary embodiment of the present teaching.

FIG. 7A shows a schematic drawing related to an onboard charging-traction system in accordance with the third embodiment of the present teaching. In FIG. 7A, certain coils used to construct the transformer under the charging mode are connected in parallel when the system is working under the traction mode. FIG. 7B shows another schematic drawing related to an onboard charging-traction system in accordance with the third embodiment of the present teaching. In FIG. 7B, certain coils used to construct the transformer under the charging mode are connected in series when the system is working under the traction mode.

Except for the difference in connection of the coils (in parallel or in series) under the traction mode, the systems shown in FIGS. 7A and 7B both comprise a polyphase motor, a rechargeable battery, an inverter, an output rectifier, a configurator and sets of contactors. The polyphase motor may comprise three or more phases of stator windings. In certain applications, alternatively, the motor may be a two-phase motor driven by two sets of half bridges. In the situation that a three-phase PFC function is carried out under the charging mode, the inverter comprises a plurality of power switch devices SW1, SW2, SW3a, SW3b, SW3c, SW4a, SW4b, SW4c, SW5 and SW6, and serves to drive the polyphase motor. The power switch devices may have different current capacities. The configurator comprises a plurality of contactors K1, K2, K3, K4, K5, K6, K7, K8, K9, K10, K11, K12 and K13. Under proper control, the configurator serves to re-configure connections of various components, in particular the connections among the windings Coils A-E and/or the power switch devices SW1-6, so as to switch between different operation modes. The set of contactors K1 and K2 may be used to connect and disconnect the positive and negative terminals of the rechargeable battery. The contactors K1 and K2 are open under the charging mode and closed under the traction mode. The set of contactors K3, K4 and K5 may be used to connect and disconnect from the input AC power. The contactors K3, K4 and K5 are closed under the charging mode and open under the traction mode.

In addition, the systems shown in FIGS. 7A and 7B may further comprise an input filter and/or an output filter, which may be used to reduce noise and voltage or current ripple. A capacitor C1 may be linked to the input side of the inverter. Although here the capacitor C1 is shown as a single one, it also can be multiple capacitors or a module with multiple capacitors packaged together. The output filter may include, but not limited to, inductors and/or capacitors. As an example, a capacitor C2 and an inductor L1 are shown in FIGS. 7A and 7B, which serve to smooth the pulsating voltage on the rectifier output to charge the battery. Although the output capacitor C2 is shown as a single one, it also can be multiple capacitors or a module with multiple capacitors packaged together. Alternatively, if the battery is capable to tolerate the ripple current at the output side of the output bridge rectifier, the capacitor C2 can be omitted.

Although not shown in FIGS. 7A and 7B, other circuit protection components may be included in the system, including but not limited to pre-charge circuits, discharge circuits, inrush current protection circuits, etc.

Similar to the first and second embodiments, at least one of the windings wound on the motor stator teeth may split to two or more coils. In other words, on at least one tooth of the motor stator, the winding is formed by two or more coils. Each coil has separate terminals that can be reconfigured into different connections to adapt to the charging mode and the traction mode. Here, the winding for Phase A is split into Coil A and Coil D, the winding for Phase C is split into Coil C and Coil E. The winding for Phase B is split into Coil B1, Coil B2 and Coil B3 which reside on separate teeth of the motor. In an example, Coil B1 is wound with respect to two teeth, Coil B2 with respect to another two teeth, Coil B3 with respect to further another two teeth.

Figure 8A:
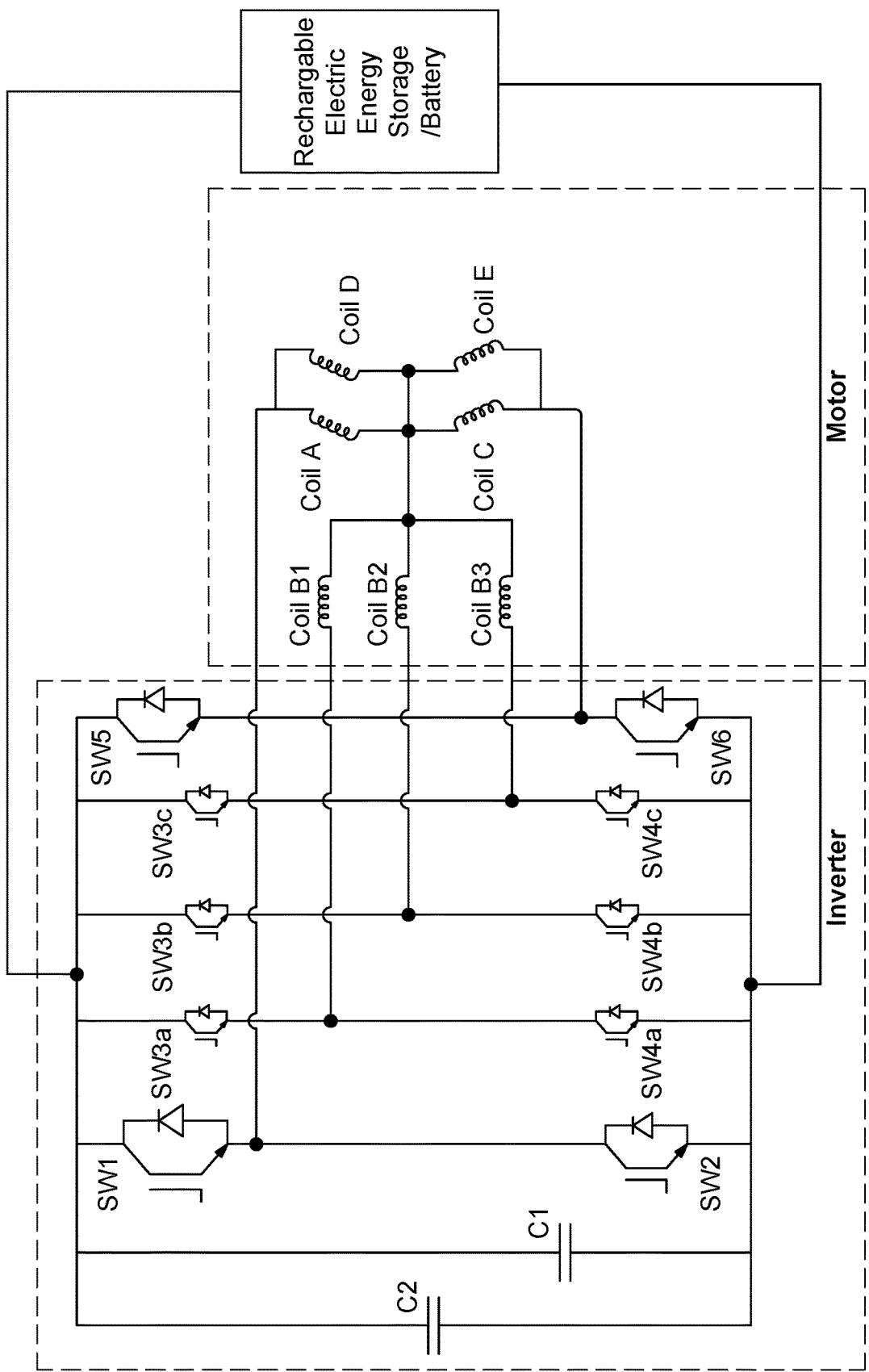
FIG. 8A shows an exemplary simplified circuit diagram related to an onboard charging-traction system, in accordance with an exemplary embodiment of the present teaching.

To configure the onboard charging-traction system as shown in FIG. 7A into the traction mode, the contactors K1, K2, K6, K7, K8, K11, K12 and K13 are closed, and K3, K4, K5, K9 and K10, are open. Accordingly, a traction power path is constructed as shown in FIG. 8A. In the working mode shown in FIG. 8A, Coil A and Coil D are connected in parallel to form Phase A; Coil C and Coil E are connected in parallel to form Phase C; and Coil B1, Coil B2 and Coil B3 form Phase B (or, each of them can be standalone phase, in a situation that the motor is a five phase motor instead of a three phase motor).

Figure 8B:
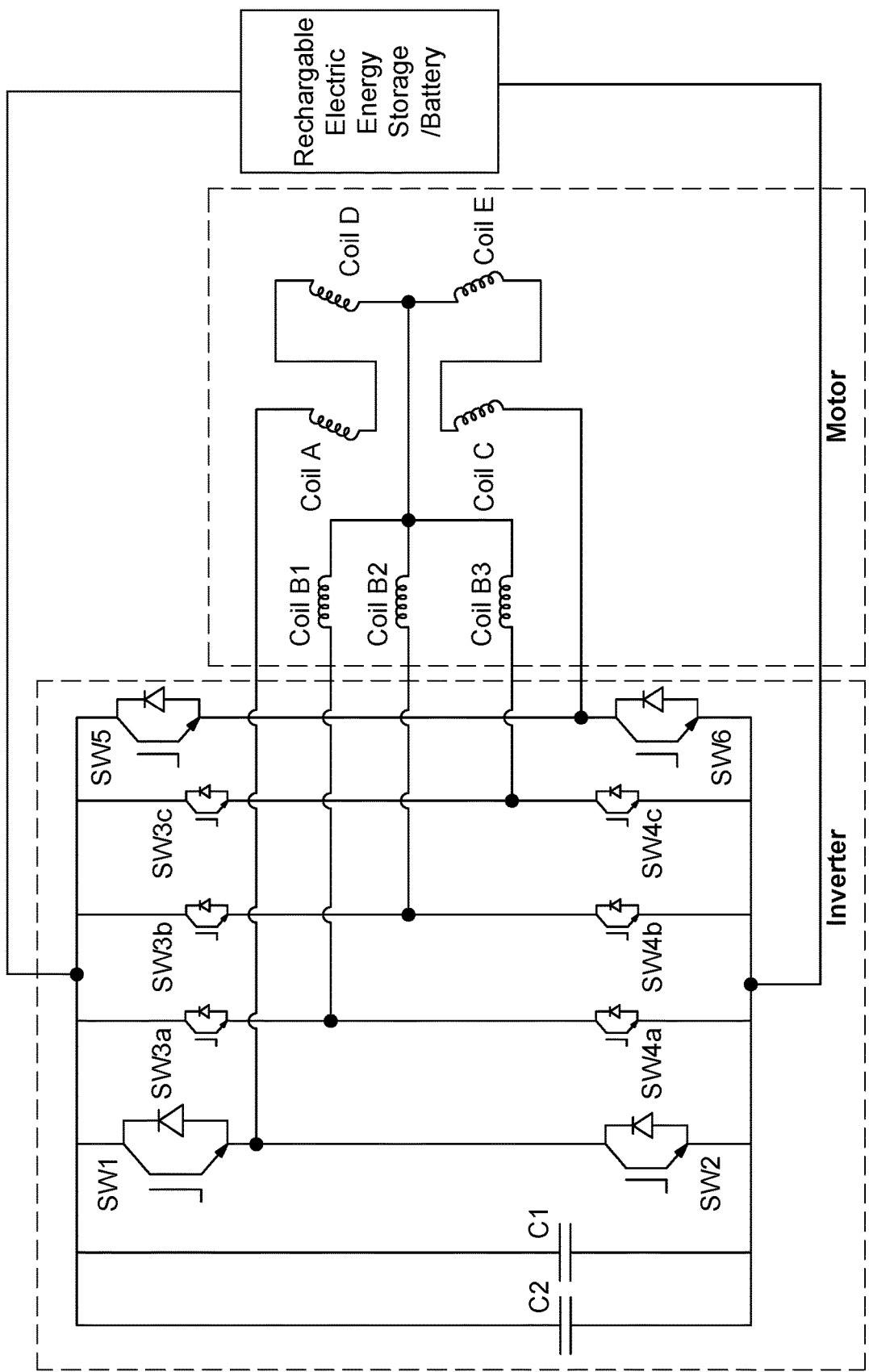
FIG. 8B shows an exemplary simplified circuit diagram related to an onboard charging-traction system, in accordance with an exemplary embodiment of the present teaching.

Similarly, to configure the system as shown in FIG. 7B into the traction mode, the contactors K1, K2, K6, K8, K11, K12 and K13 are closed, and K3, K4, K5, K7, K9 and K10 are open. Accordingly, a traction power path is constructed as shown in FIG. 8B. In the working mode shown in FIG. 8B, Coil A and Coil D are connected in series to form Phase A; Coil C and Coil E are connected in series to form Phase C. In addition, Coil B1, Coil B2 and Coil B3 form Phase B (or, each of them can be standalone phase). Because Coils B1-B3 are wound on the same phase (Phase B) teeth of the motor, currents in do not produce a rotating field that causes the motor to spin.

When the onboard charging-traction system is operating under the traction mode, the rechargeable battery may supply DC power to the multiphase inverter. Then, the inverter may convert the DC power into AC power and thus drives the polyphase motor to operate. The plurality of center power switch devices shown in FIGS. 8A and 8B are switched together to act as a single half bridge. This is, the power switch devices SW3a, SW3b and SW3c are turned ON and OFF together; the power switch devices SW4a, SW4b and SW4c are turned ON and OFF together.

Figure 8C:
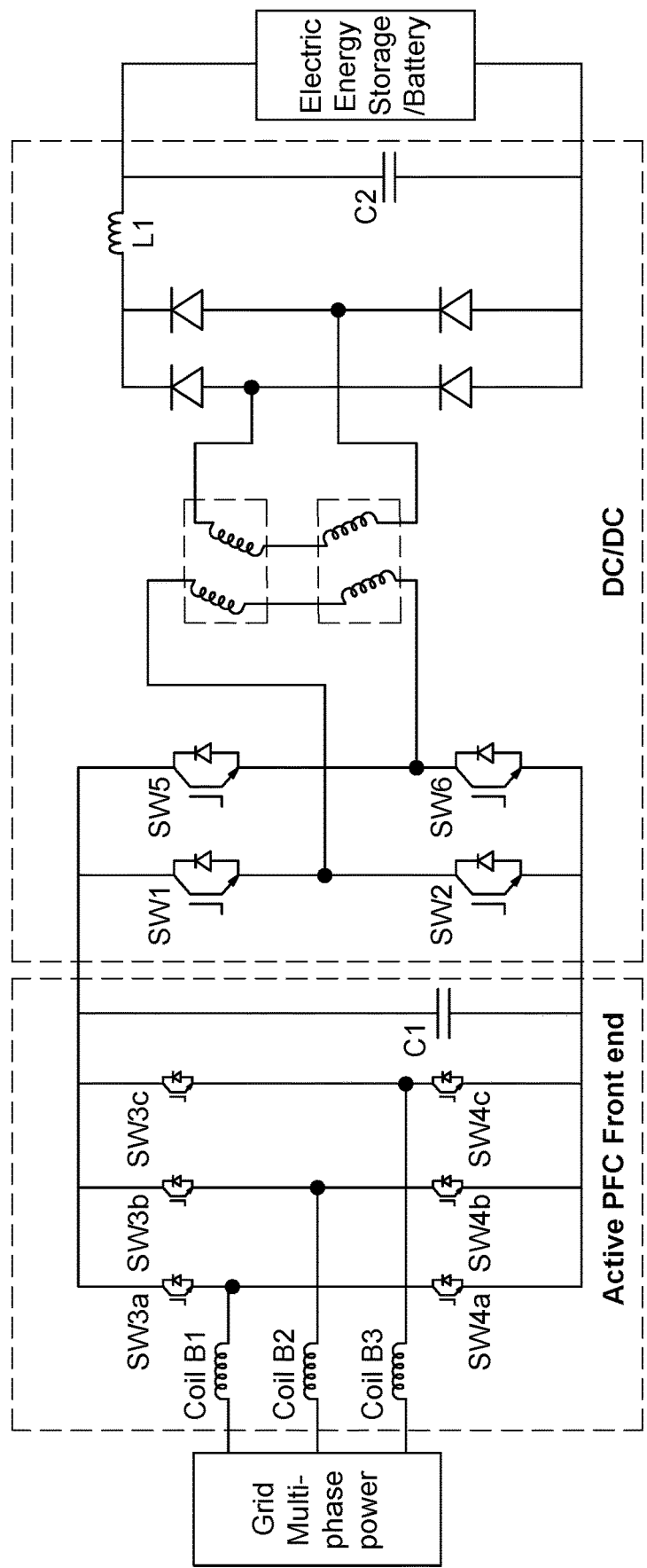
FIG. 8C shows an exemplary simplified circuit diagram related to an onboard charging-traction system, in accordance with an exemplary embodiment of the present teaching.

To configure the onboard charging-traction system as shown in FIG. 7A into the charging mode, the contactors K3, K4, K5, K9 and K10 are closed, and K1, K2, K6, K7, K8, K11, K12 and K13 are open. To configure the onboard charging-traction system as shown in FIG. 7B into the charging mode, the contactors K3, K4, K5, K7, K9 and K10 are closed, and K1, K2, K6, K8, K11, K12 and K13 are open. FIG. 8C shows a charging power path as constructed, which is applied to both onboard charging-traction systems shown in FIGS. 7A and 7B.

When the onboard charging-traction system is configured into the charging mode, a fully isolated two stage charger is provided, which comprises a full three phase Boost PFC front end stage and a fully isolated DC/DC rear end stage. In the front end stage, Coil B1, Coil B2, Coil B3 operate as Boost inductors, and the power switch devices SW3a, SW3b, SW3c, SW4a, SW4b and SW4c as Boost PFC switches. In the DC/DC rear end stage, the power switch devices SW1, SW2, SW5 and SW6 construct an H bridge drive. In addition, Coil A and Coil C act as the transformer's primary winding, and Coil D and Coil E as the transformer's secondary winding. The output bridge rectifier converts the AC power outputted from the transformer secondary side to DC power. The inductor L1 and the output capacitor C2 are coupled at the output side of the output bridge rectifier to remove ripple components in the DC power.

In this charging mode, the PFC Boost front end stage may convert the grid multi-phase power to DC power, while performing Power Factor correction to achieve a sinusoidal input current. Then, the second stage H bridge may take the first stage DC power as input, invert it into AC power, and pass the inverted AC power through the transformer formed by the windings of the motor, such that full isolation is achieved. The AC power outputted by the transformer is applied to the output bridge rectifier and then to the output capacitor to generate DC power that charges the rechargeable battery.

To form the full three phase PFC front end shown in FIG. 8C, voltage sensing is arranged at the input to determine the angle position of the AC input. A phase locked loop can be used to carry out this function. When angle information representing the phase voltage of one phase (such as Phase A) is obtained, the switch drive can be implemented via dq to ABC transformation and state vector modulation, so as to determine drive required for the power switch devices. In this scheme, one transformed axis (for example, the d axis) controls the power factor, and the other axis (for example, the q axis) controls the power flow and is used to regulate the intermediate DC Link bus voltage. Furthermore, an inner current loop is used with respect to each axis for performing the Power Factor Correction. At least two current sensors are required to measure the input current. However, as a total current is required under the traction mode, three current sensors are preferred.

Fourth Embodiment

In this fourth embodiment, the charging power is fed from a single phase power source or single split phase power source, and the charging path comprises a single phase or split phase Totem-Pole PFC front end.

Figure 9A:
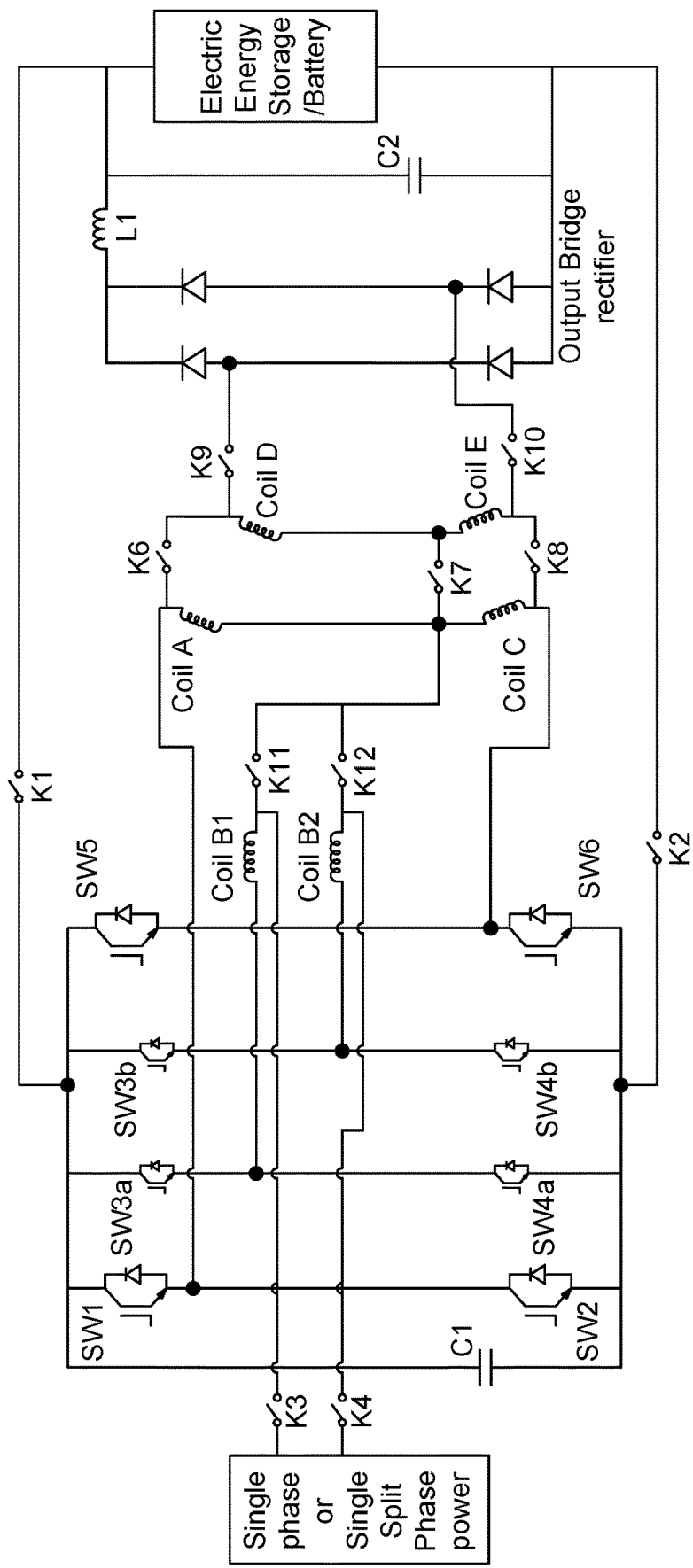
FIG. 9A shows an exemplary schematic drawing related to an onboard charging-traction system, in accordance with an exemplary embodiment of the present teaching.
Figure 9B:
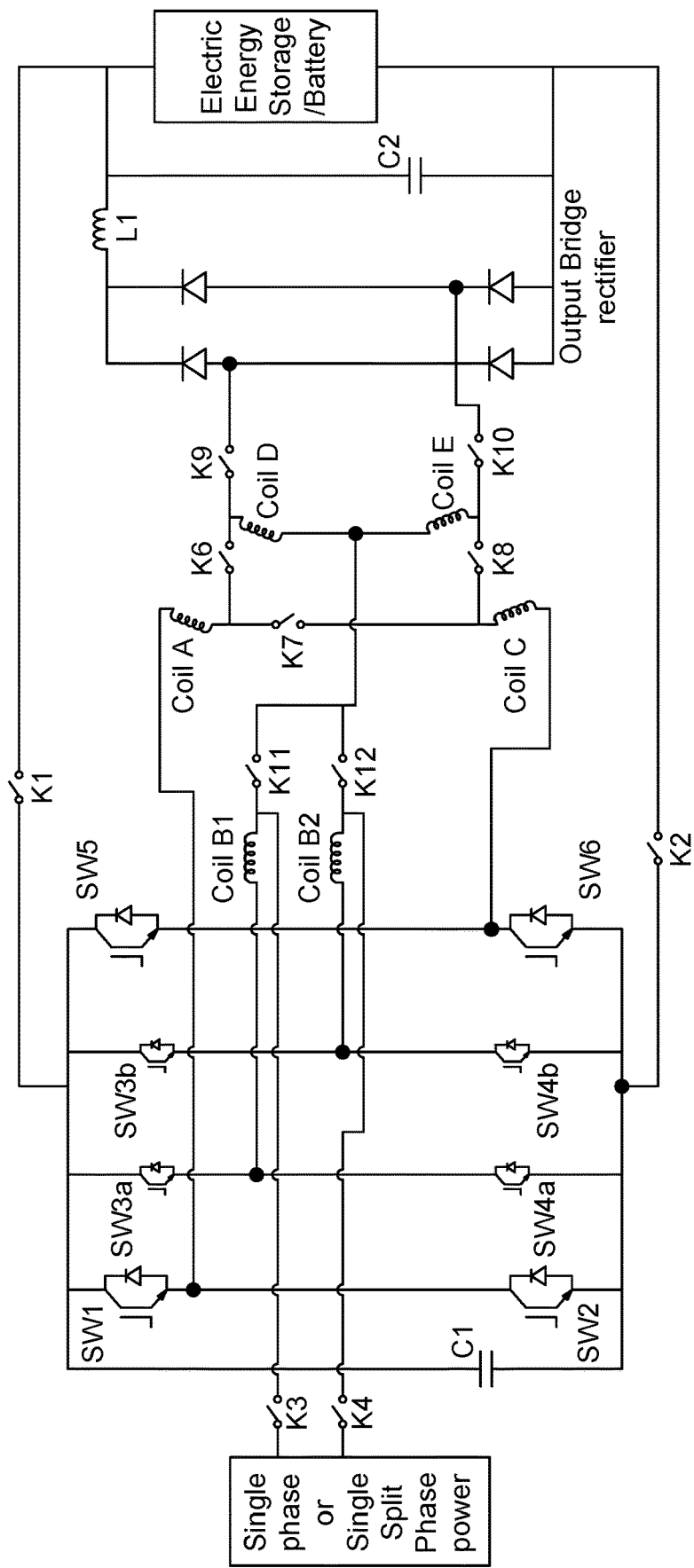
FIG. 9B shows an exemplary schematic drawing related to an onboard charging-traction system, in accordance with an exemplary embodiment of the present teaching.

FIG. 9A shows a schematic drawing related to an onboard charging-traction system in accordance with the fourth embodiment of the present teaching. In FIG. 9A, certain coils used to construct the transformer under the charging mode are connected in parallel when the system is working under the traction mode. FIG. 9B shows another schematic drawing relate to an onboard charging-traction system in accordance with the fourth embodiment of the present teaching. In FIG. 9B, certain coils used to construct the transformer under the charging mode are connected in series when the system is working under the traction mode.

Except for the difference in connection of the coils (in parallel or in series) under the traction mode, the onboard charging-traction systems shown in FIGS. 9A and 9B both comprise a polyphase motor, a rechargeable battery, an inverter, an output rectifier, a configurator and sets of contactors. The polyphase motor may comprise three or more phases of stator windings. In certain applications, alternatively, the motor may be a two-phase motor driven by two sets of half bridges. In the situation that a single phase or split phase Totem-Pole PFC is carried out under the charging mode, the inverter comprises a plurality of power switch devices SW1, SW2, SW3a, SW3b, SW4a, SW4b, SW5 and SW6, and serves to drive the polyphase motor. The power switch devices may have different current capacities. The configurator comprises a plurality of contactors K1, K2, K3, K4, K6, K7, K8, K9, K10, K11 and K12. Under proper control, the configurator serves to re-configure connections of various components, in particular the connections among the windings Coils A-E and/or the power switch devices SW1-6, so as to switch between different operation modes. The set of contactors K1 and K2 may be used to connect and disconnect the positive and negative terminals of the rechargeable battery. The contactors K1 and K2 are open under the charging mode and closed under the traction mode. The set of contactors K3 and K4 may be used to connect and disconnect from the input AC power. The contactors K3 and K4 are closed under the charging mode and open under the traction mode.

In addition, the systems shown in FIGS. 9A and 9B may further comprise an input filter and/or an output filter, which may be used to reduce noise and voltage or current ripple. A capacitor C1 may be linked to the input side of the inverter. Although here the capacitor C1 is shown as a single one, it also can be multiple capacitors or a module with multiple capacitors packaged together. The output filter may include, but not limited to, inductors and/or capacitors. As an example, a capacitor C2 and an inductor L1 are shown in FIGS. 9A and 9B, which serve to smooth the pulsating voltage on the rectifier output to feed the battery. Although the output capacitor C2 is shown as a single one, it also can be multiple capacitors or a module with multiple capacitors packaged together. Alternatively, if the battery is capable to tolerate the ripple current at the output side of the output bridge rectifier, the capacitor C2 can be omitted.

Although not shown in FIGS. 9A and 9B, other circuit protection components may be included in the system, including but not limited to pre-charge circuits, discharge circuits, inrush current protection circuits, etc.

Similar to the first to third embodiments, at least one of the windings wound on the motor stator teeth may split to two or more coils. In other words, on at least one tooth of the motor stator, the winding is formed by two or more coils. The split windings have separate terminals that can be reconfigured into different connections to adapt to the charging mode and the traction mode. For example, the winding for Phase A is split into Coil A and Coil D, the winding for Phase C is split into Coil C and Coil E, and the winding for phase B is split into Coil B1 and Coil B2.

Figure 10A:
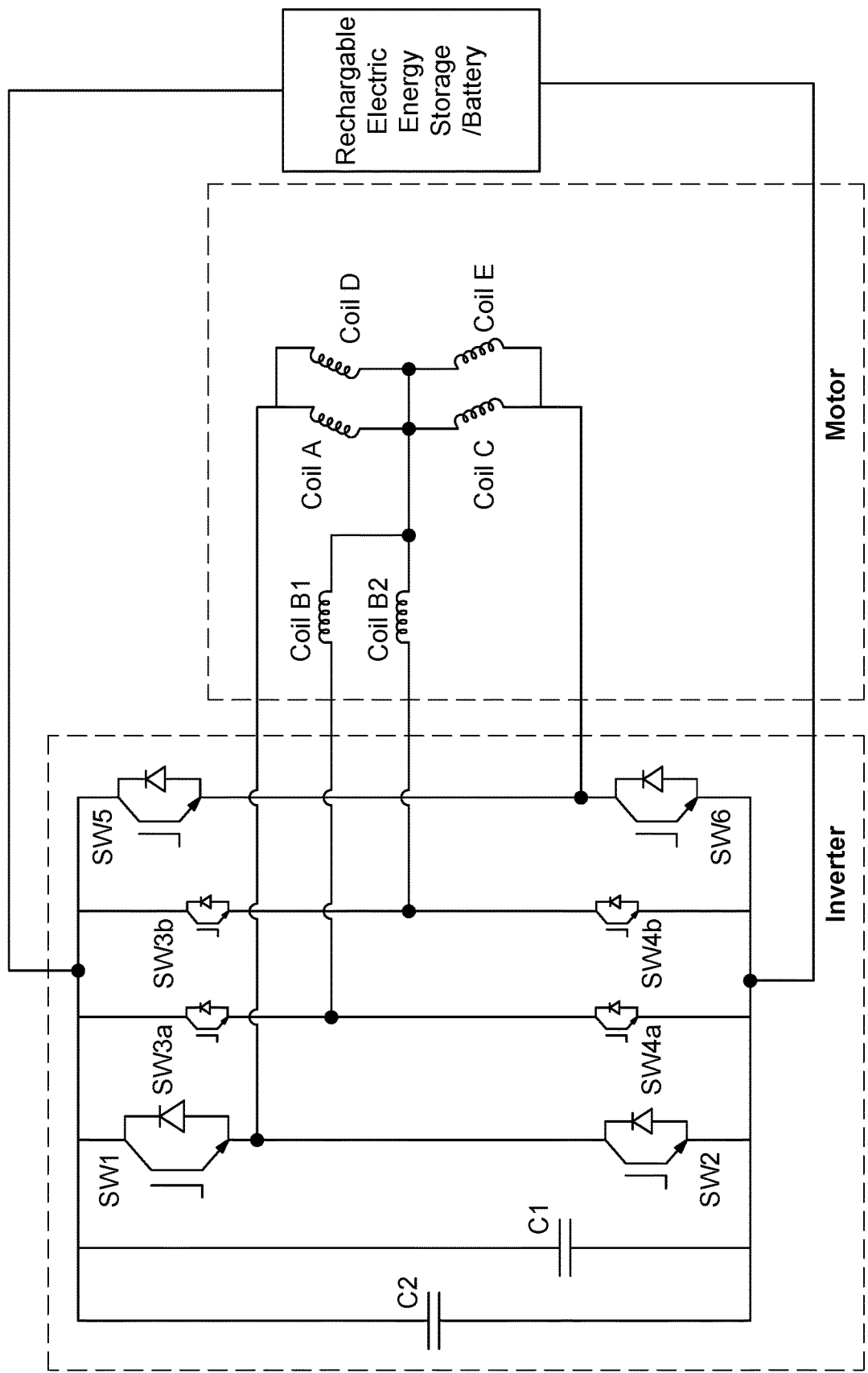
FIG. 10A shows an exemplary simplified circuit diagram related to an onboard charging-traction system, in accordance with an exemplary embodiment of the present teaching.

To configure the onboard charging-traction system as shown in FIG. 9A into the traction mode, the contactors K1, K2, K6, K7, K8, K11 and K12 are closed, and K3, K4, K9 and K10 are open. Accordingly, a traction power path is constructed as shown in FIG. 10A. In the working mode shown in FIG. 10A, Coil A and Coil D are connected in parallel to form Phase A; Coil C and Coil E are connected in parallel to form Phase C; and Coil B1 and Coil B2 form Phase B (or, each of them can be standalone phase).

Figure 10B:
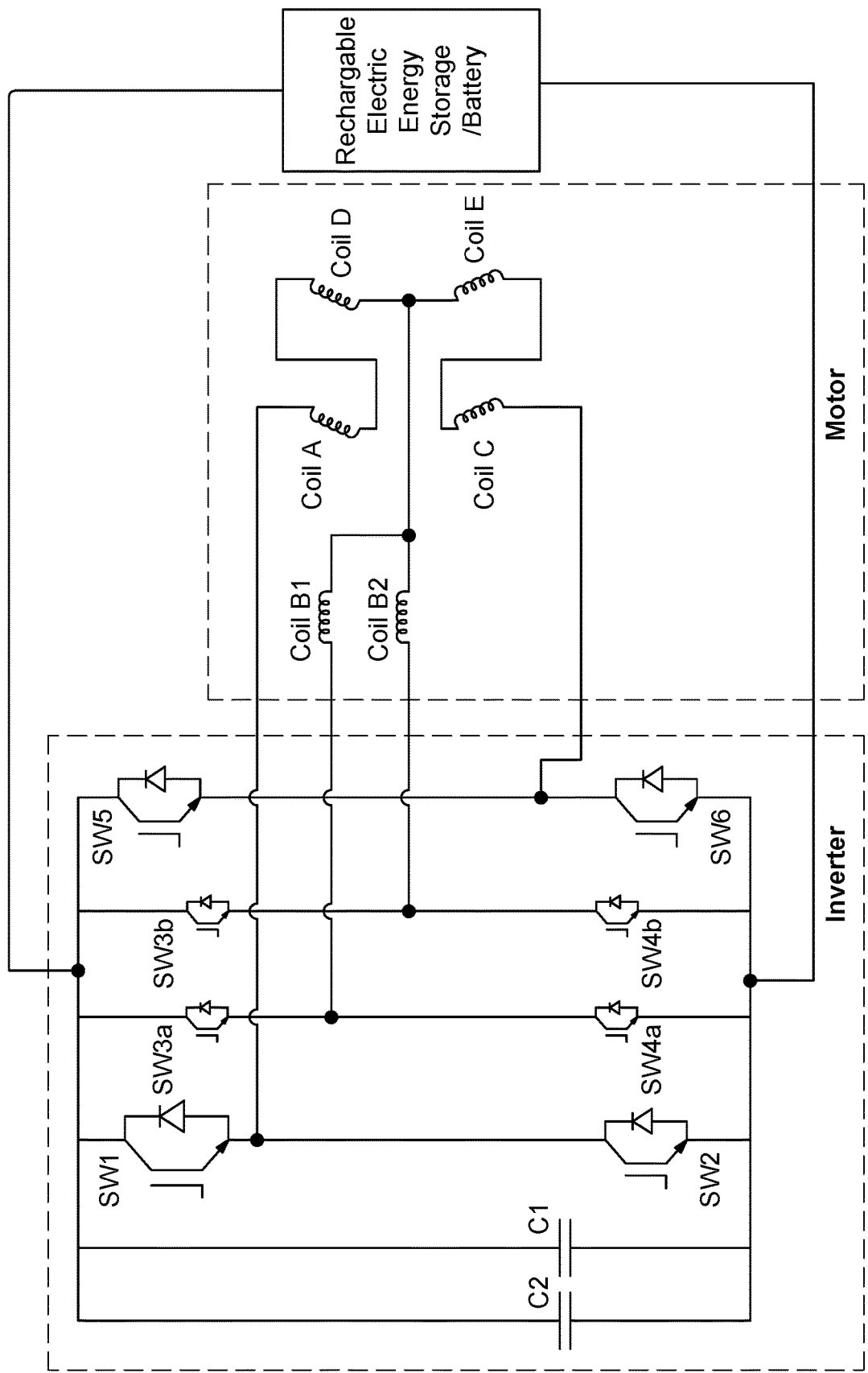
FIG. 10B shows an exemplary simplified circuit diagram related to an onboard charging-traction system, in accordance with an exemplary embodiment of the present teaching.

Similarly, to configure the system as shown in FIG. 9B into the traction mode, the contactors K1, K2, K6, K8, K11 and K12 are closed, and K3, K4, K7, K9 and K10 are open. Accordingly, a traction power path is constructed as shown in FIG. 10B. In the working mode shown in FIG. 10B, Coil A and Coil D are connected in series to form Phase A; Coil C and Coil E are connected in series to form Phase C; and Coil B1 and Coil B2 form Phase B (or, each of them can be standalone phase).

When the onboard charging-traction system is operating under the traction mode, the rechargeable battery may supply DC power to the multiphase inverter. Then, the inverter may convert the DC power into AC power and thus drive the polyphase motor to operate.

Figure 10C:
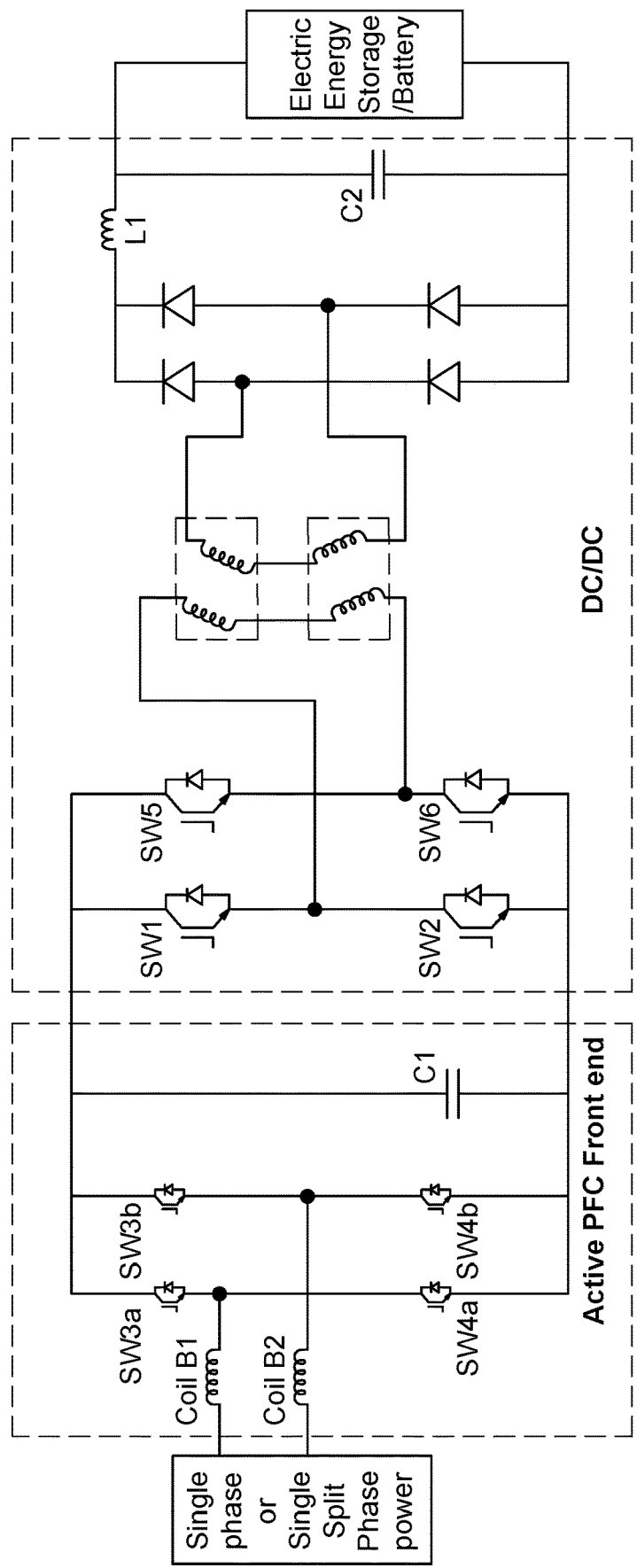
FIG. 10C shows an exemplary simplified circuit diagram related to an onboard charging-traction system, in accordance with an exemplary embodiment of the present teaching.

To configure the onboard charging-traction system as shown in FIG. 9A into the charging mode, the contactors K3, K4, K9 and K10 are closed, and K1, K2, K6, K7, K8, K11 and K12 are open. To configure the onboard charging-traction system as shown in FIG. 9B into the charging mode, the contactors K3, K4, K7, K9 and K10 are closed, and K1, K2, K6, K8, K11 and K12 are open. FIG. 10C shows a charging power path as constructed, which is applied to both onboard charging-traction systems shown in FIGS. 9A and 9B.

When the onboard charging-traction system is configured into the charging mode, a fully isolated two stage charger is provided, which comprises a single or split phase Totem-Pole PFC front end stage and a fully isolated DC/DC rear end stage. In the front end stage, Coil B1 and Coil B2 operate as Boost PFC inductors, and the power switch devices SW3$a$, SW3$b$, SW4$a$ and SW4$b$ as full bridge switches controlling the power flow and shaping the input current into a sinusoidal waveform. In the rear end stage, the power switch devices SW1, SW2, SW5 and SW6 construct an H bridge drive. In addition, Coil A and Coil C act as the transformer's primary winding, and Coil D and Coil E as the transformer's secondary winding. The output bridge rectifier converts the AC waveform on the transformer secondary side to DC power. The inductor L1 and the output capacitor C2 are coupled at the output side of the output bridge rectifier to remove ripple components.

In this mode, the PFC Boost front end stage may convert the grid AC single phase power to DC power, while performing Power Factor correction to achieve a sinusoidal input current. Then, the second stage H bridge may take the DC power from the front end stage as input, invert it into AC power, and pass the inverted AC power through the transformer formed by the windings of the motor, such that full isolation is achieved. The AC power outputted by the transformer is applied to the output bridge rectifier and then to the output filter to generate DC power that charges the rechargeable battery.

Fifth Embodiment

In this fifth embodiment, the charging power is fed from a single phase power source or single split phase power source, and the charging power path comprises a single phase or split phase Totem-Pole PFC front end stage with additional diodes.

Figure 11A:
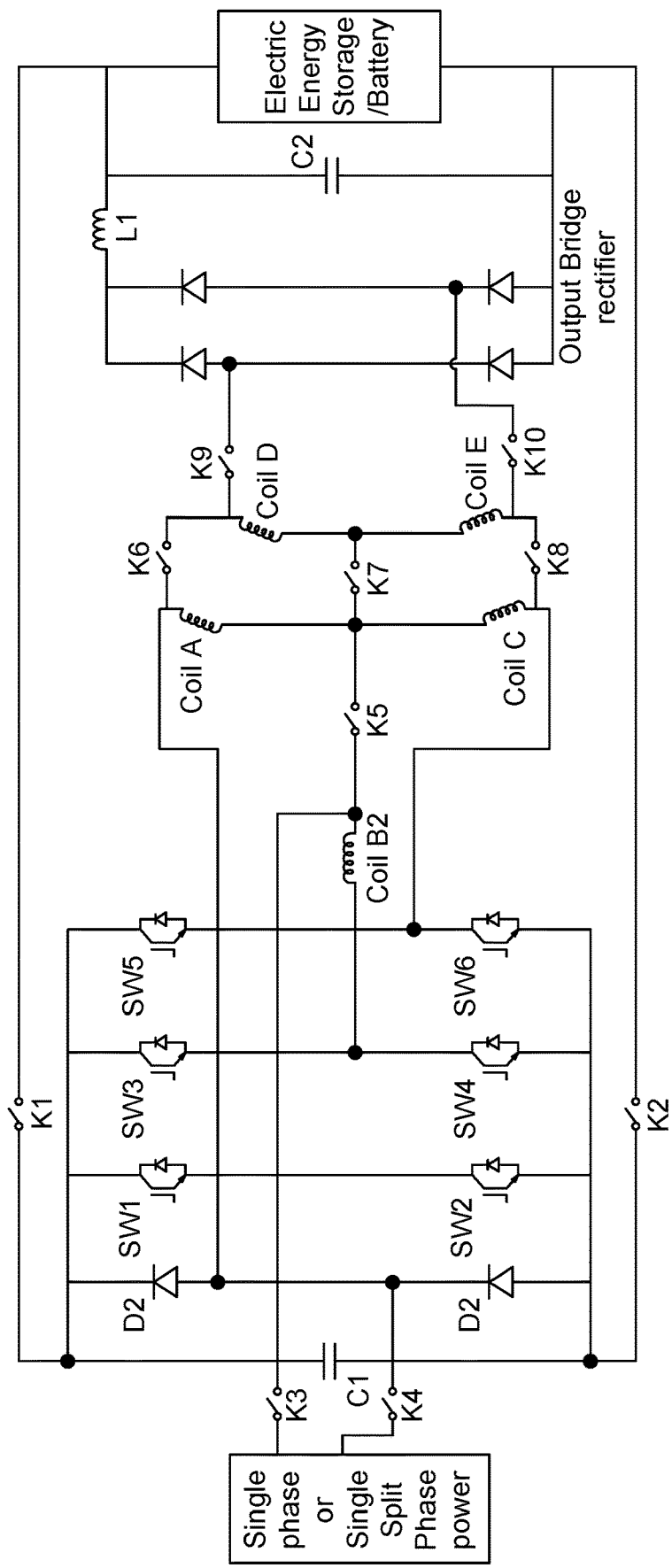
FIG. 11A shows an exemplary schematic drawing related to an onboard charging-traction system, in accordance with an exemplary embodiment of the present teaching.
Figure 11B:
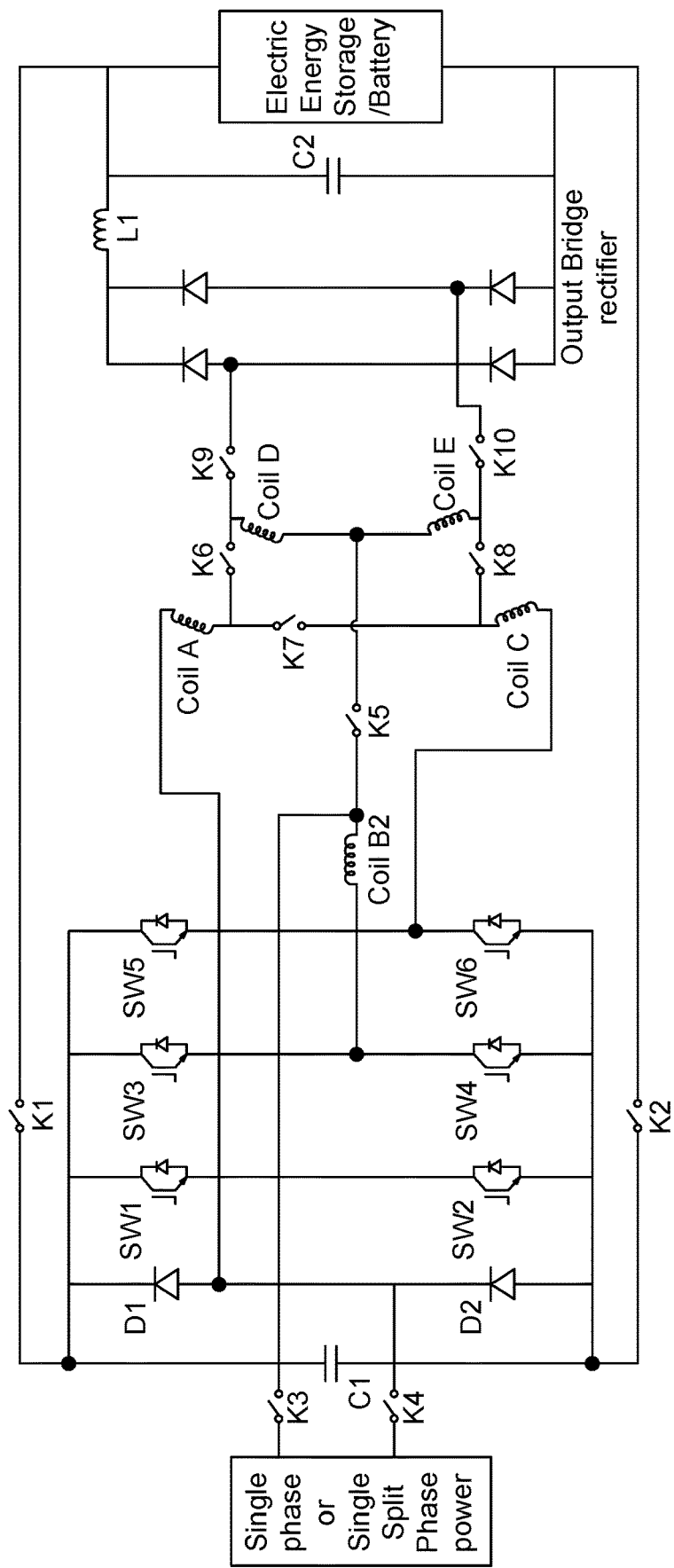
FIG. 11B shows an exemplary schematic drawing related to an onboard charging-traction system, in accordance with an exemplary embodiment of the present teaching.

FIG. 11A shows a schematic drawing related to an onboard charging-traction system in accordance with the fifth embodiment of the present teaching. In FIG. 11A, certain coils used to construct the transformer under the charging mode are connected in parallel when the system is working under the traction mode. FIG. 11B shows another schematic drawing relate to an onboard charging-traction system in accordance with the fifth embodiment of the present teaching. In FIG. 11B, certain coils used to construct the transformer under the charging mode are connected in series when the system is working under the traction mode.

Except for the difference in connection of the coils (in parallel or in series) under the traction mode, the onboard charging-traction systems shown in FIGS. 11A and 11B both comprise a polyphase motor, a rechargeable battery, an inverter, diodes D1 and D2, an output rectifier, a configurator and sets of contactors. The polyphase motor may comprise three or more phases of stator windings. In certain applications, alternatively, the motor may be a two-phase motor driven by two sets of half bridges. In the situation that a single phase or split phase Totem-Pole PFC function is carried out under the charging mode, the inverter may comprise 6 power switch devices SW1, SW2, SW3, SW4, SW5 and SW6. The power switch devices may have different current capacities. The additional diodes D1 and D2 are arranged across positive and negative poles of the input power supply. The configurator comprises a plurality of contactors K1, K2, K3, K4, K5, K6, K7, K8, K9 and K10. Under proper control, the configurator serves to re-configure connections of various components, in particular the connections among the windings Coils A-E and/or the power switch devices SW1-6, so as to switch the system between different operation modes. The set of contactors K1 and K2 may be used to connect and disconnect the positive and negative terminals of the rechargeable battery. The contactors K1 and K2 are open under the charging mode and closed under the traction mode. The set of contactors K3 and K4 may be used to connect and disconnect from the input AC power. The contactors K3 and K4 are closed under the charging mode and open under the traction mode.

In addition, the systems shown in FIGS. 11A and 11B may further comprise an input filter and/or an output filter, which may be used to reduce noise and voltage or current ripple. A capacitor C1 may be linked to the input side of the inverter. Although here the capacitor C1 is shown as a single one, it also can be multiple capacitors or a module with multiple capacitors packaged together. The output filter may include, but not limited to, inductors and/or capacitors. As an example, a capacitor C2 and an inductor L1 are shown in FIGS. 11A and 11B, which serve to smooth the pulsating voltage on the rectifier output to feed the battery. Although the output capacitor C2 is shown as a single one, it also can be multiple capacitors or a module with multiple capacitors packaged together. Alternatively, if the battery is capable to tolerate the ripple current at the output side of the output bridge rectifier, the capacitor C2 can be omitted.

Although not shown in FIGS. 11A and 11B, other circuit protection components may be included in the system, including but not limited to pre-charge circuits, discharge circuits, inrush current protection circuits, etc.

Similar to the first to fourth embodiments, at least one of the windings wound on the motor stator teeth may have a split structure. The split windings have separate terminals that can be reconfigured into different connections to adapt to the charging mode and the traction mode. For example, the winding for Phase A is split into Coil A and Coil D, and the winding for Phase C is split into Coil C and Coil E.

Figure 12A:
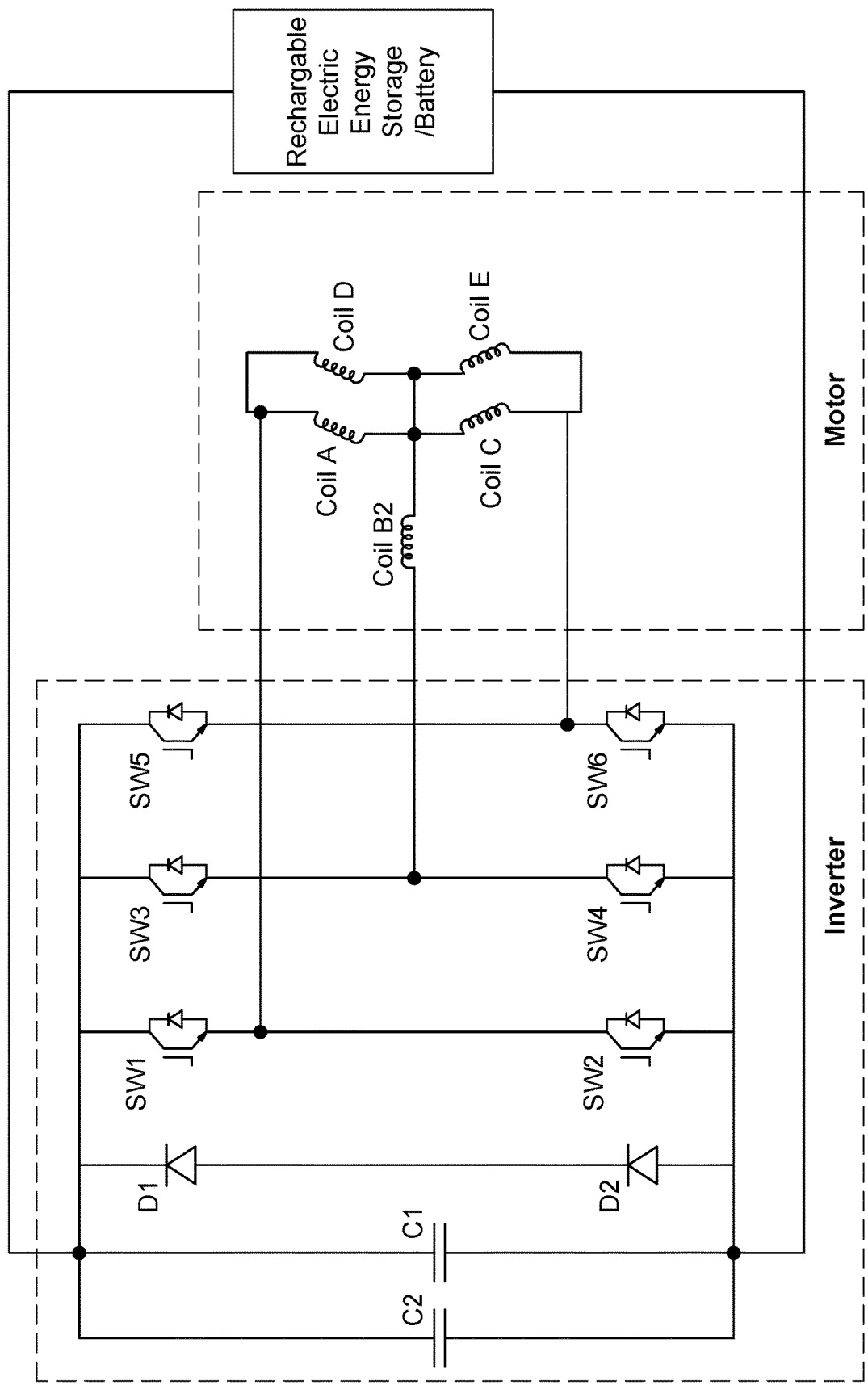
FIG. 12A shows an exemplary simplified circuit diagram related to an onboard charging-traction system, in accordance with an exemplary embodiment of the present teaching.

To configure the onboard charging-traction system as shown in FIG. 11A into the traction mode, the contactors K1, K2, K6, K7 and K8 are closed, and K3, K4, K9 and K10 are open. Accordingly, a traction power path is constructed as shown in FIG. 12A. In the working mode shown in FIG. 12A, all the coils that sit on the same tooth are connected in parallel: Coil A and Coil D together form Phase A, Coil C and Coil E together form Phase C; and Coil B forms Phase B itself.

Figure 12B:
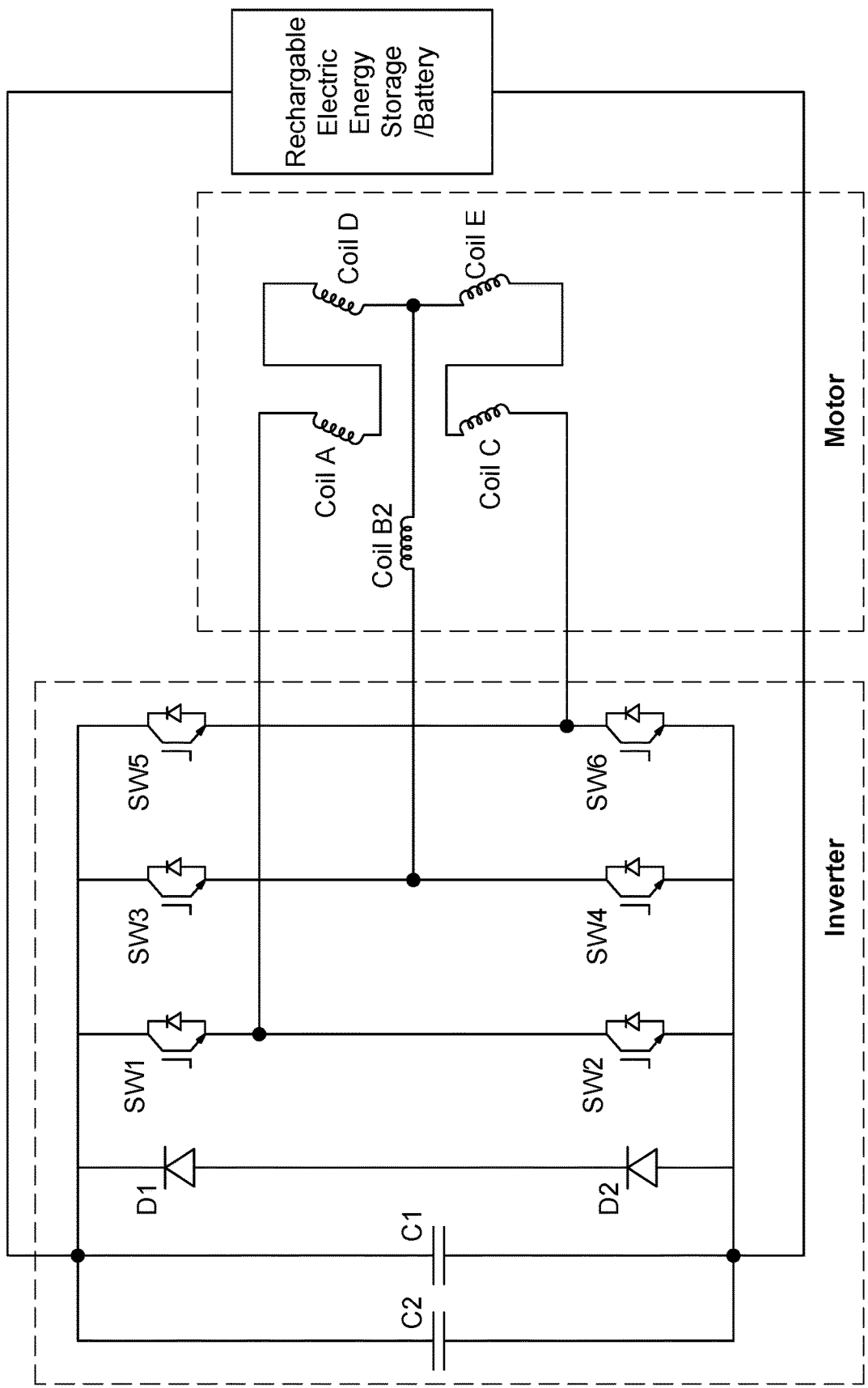
FIG. 12B shows an exemplary simplified circuit diagram related to an onboard charging-traction system, in accordance with an exemplary embodiment of the present teaching.

Similarly, to configure the system as shown in FIG. 11B into the traction mode, the contactors K1, K2, K6, and K8 are closed, and K3, K4, K7, K9 and K10 are open. Accordingly, a traction power path is constructed as shown in FIG. 12B. In the working mode shown in FIG. 12B, all the coils that sit on the same tooth are connected in series: Coil A and Coil D together form Phase A; Coil C and Coil E together form Phase C; and Coil B forms Phase B itself.

When the onboard charging-traction system is operating under the traction mode, the rechargeable battery may supply DC power to the multiphase inverter. Then, the inverter may convert the DC power into AC power and thus drives the polyphase motor to operate.

Figure 12C:
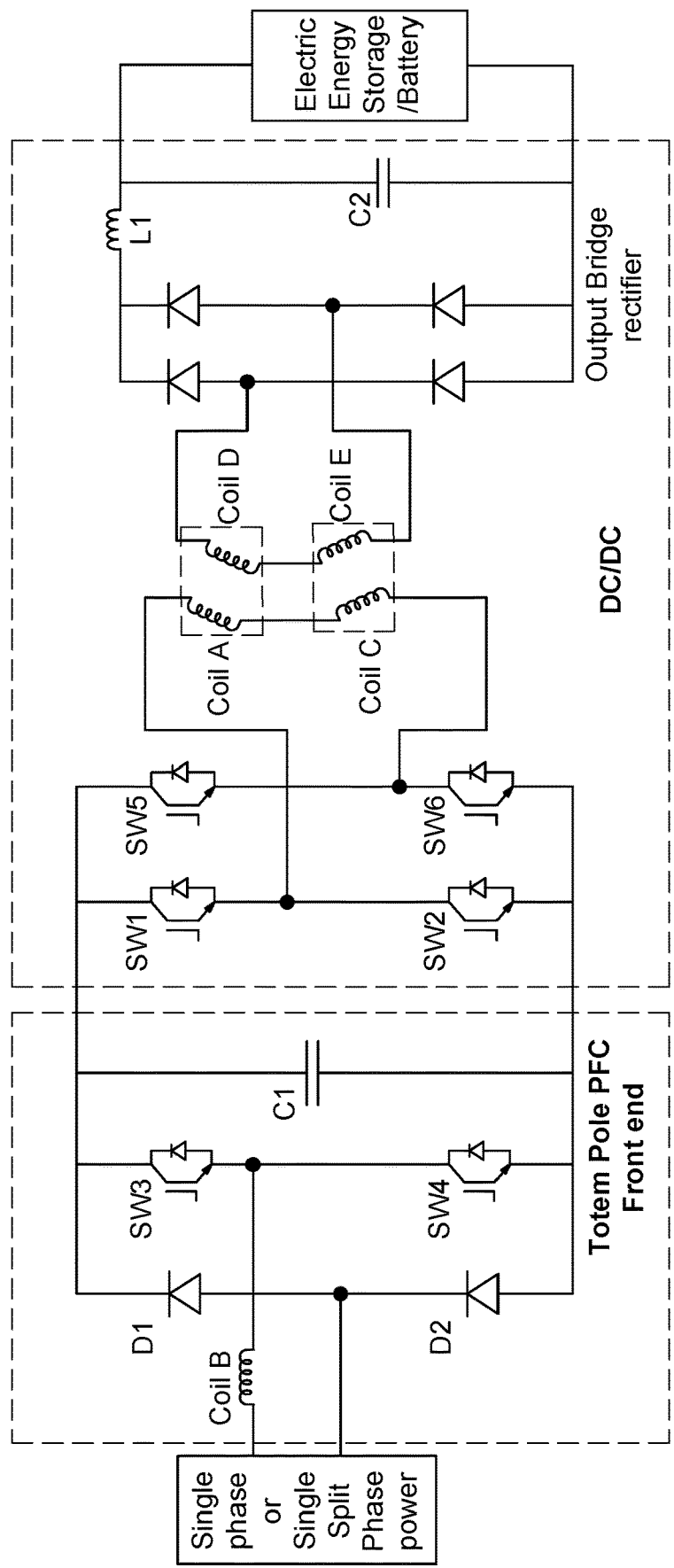
FIG. 12C shows an exemplary simplified circuit diagram related to an onboard charging-traction system, in accordance with an exemplary embodiment of the present teaching.

To configure the onboard charging-traction system as shown in FIG. 11A into the charging mode, the contactors K3, K4, K9 and K10 are closed, and K1, K2, K6, K7, and K8 are open. To configure the onboard charging-traction system as shown in FIG. 11B into the charging mode, the contactors K3, K4, K7, K9 and K10 are closed, and K1, K2, K6 and K8 are open. FIG. 12C shows a charging power path as constructed, which is applied to both onboard charging-traction systems shown in FIGS. 11A and 11B.

When the onboard charging-traction system is configured into the charging mode, a fully isolated two stage charger is provided, which comprises a single or split phase Totem-Pole PFC front end stage with additional diodes, and a fully isolated DC/DC rear end. In the Totem-Pole PFC front end stage, Coil B may operate a Boost inductor, and the power switch devices SW3 and SW4 as Boost PFC switches. The diode D1 conducts during positive half cycles of the input voltage, and the power switch device SW3 is PWM controlled, so as to shape the input current into a sinusoidal waveform. During the negative half cycle of the input voltage, the diode D2 conducts and the power switch device SW4 is PWM controlled, so as to shape the input current into a sinusoidal waveform. In the DC/DC rear end stage, the power switch devices SW1, SW2, SW5 and SW6 construct an H bridge drive. In addition, Coil A and Coil C act as the transformer's primary winding, and Coil D and Coil E as the transformer's secondary winding. The output bridge rectifier converts the AC power outputted from the transformer secondary side to DC power. The inductor L1 and the output capacitor C2 are coupled at the output side of the output bridge rectifier to remove ripple components of the DC power.

In this charging mode, the PFC Boost front end stage may convert the grid AC single phase power to DC power, while performing Power Factor correction to achieve a sinusoidal input current. Then, the second stage H bridge may take the first stage DC power as input, invert it into AC power, and pass the inverted AC power through the transformer formed by the windings of the motor, such that full isolation is achieved. The AC power outputted by the transformer is applied to the output bridge rectifier and then to the output filter, so as to generate DC power that charges the rechargeable battery.

Figure 13:
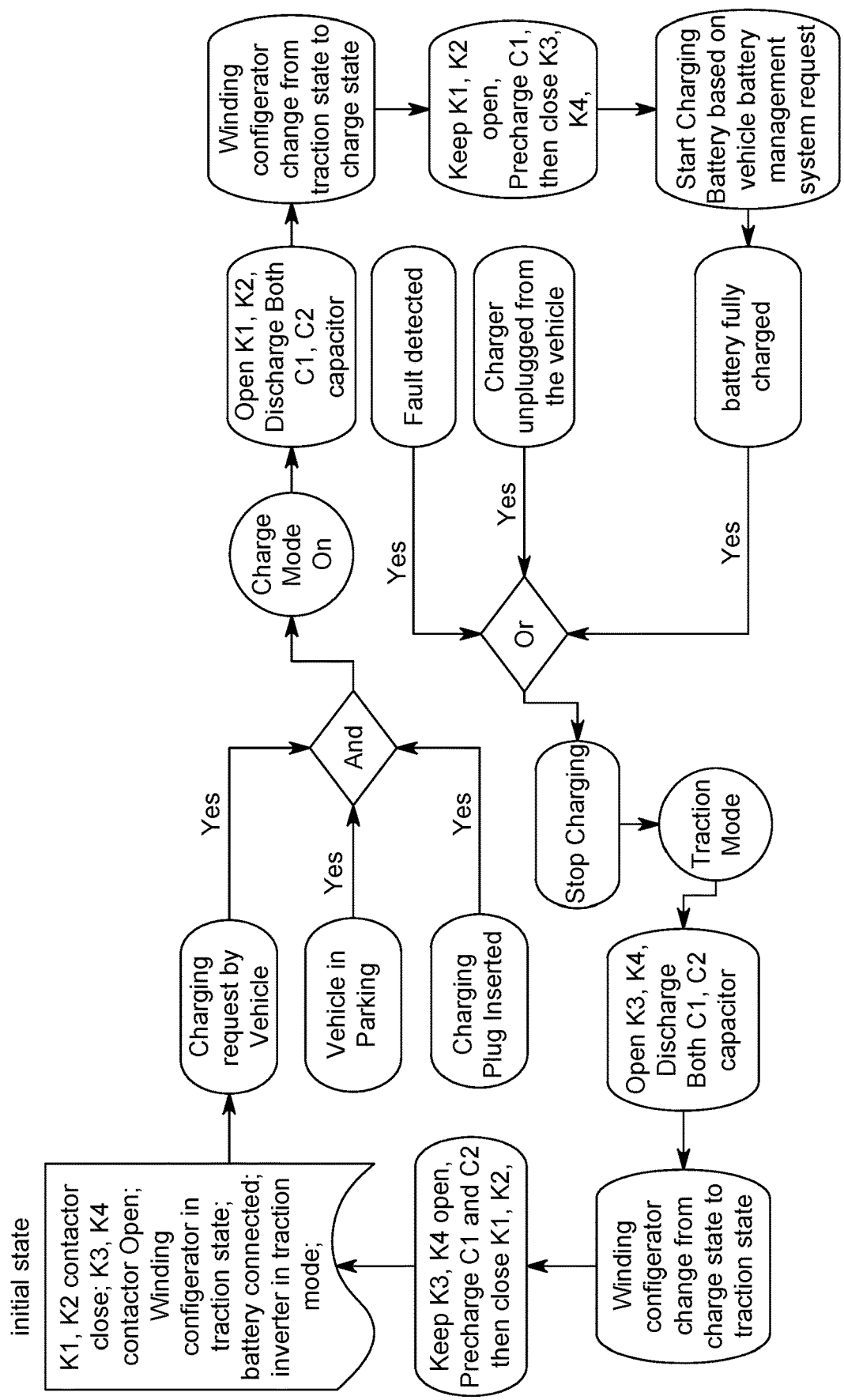
FIG. 13 shows an exemplary flowchart related to the operation of an onboard charging-traction system, in accordance with an exemplary embodiment of the present teaching.

FIG. 13 shows a flowchart related to the operation of an onboard charging-traction system in accordance with an example of the present teaching. Normally, the system operates under the traction mode. Under this mode, the contactors K1 and K2 are closed, K3 and K4 are open, and the configurator is in the traction state, such that the battery is outputting power to the motor via the traction power path. When it is determined that a request to charge the battery of the electric vehicle is received, that the vehicle is in the parking state, and that a charging cord capable of coupling the system to an external power supply is plugged in, the system is to be switched into the charging mode. To achieve the switching from the traction mode to the charging mode, the contactors K1 and K2 are open, and the electric energy stored in the capacitors C1 and C2 is discharged. Then, the configurator is switched from the traction state to the charge state. While the contactors K1 and K2 keep open, the capacitor C1 is pre-charged, and then, the contactors K3 and K4 are closed. Based on a request from the management system of the vehicle battery, the battery is started to be charged. The charging mode continues until it is determined that the battery is fully charged, or that the electric coupling to the external power supply is disconnected, or that any fault is detected during the charging process. If any of those conditions is met, charging of the battery is stopped, and the system is switched from the charging mode back to the traction mode by opening the contactors K3 and K4 and discharging the electric energy stored in both capacitor C1 and C2. Then, the configurator is switched from the charging state into the traction state. While the contactors K3 and K4 keep open, the capacitor C1 and C2 are pre-charged, and then the contactors K1 and K2 are closed. The system returns to the normal, traction mode, until a next charging request is received.

Figure 14:
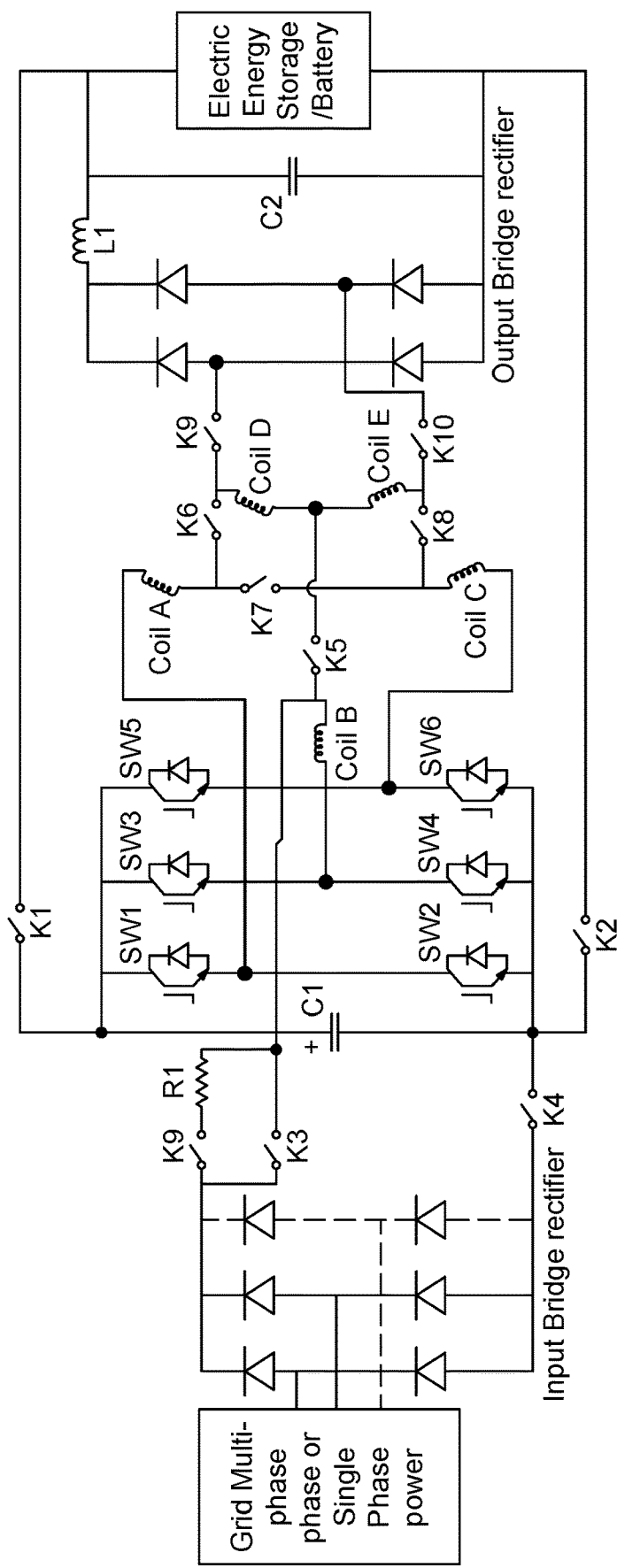
FIG. 14 shows an exemplary schematic drawing related to pre-charging of a capacitor C1, in accordance with an exemplary embodiment of the present teaching.

FIG. 14 shows a schematic drawing related to pre-charging of the capacitor C1 in accordance with an example of the present teaching. As discussed in the above, the input capacitor C1 is to be charged up before the contactors K3 and K4 are closed. For an instance, in the onboard charging-traction system shown in FIG. 2B, the pre-charging can be accomplished by a branch including an additional contactor K9 and a resistor R1. The resistor R1 is connected with the contactor K9 in series, serving to limit the pre-charging current.

In the charging mode, the charging power may be applied following the below sequence. First, the contactors K1, K2, K5, K6, K7, K8, K9 and K10 are switched to the charging positions. With the contactors K3, K4 and K9 open, the input AC power is applied. This usually involves a handshakes process with an interface of the external power supply. Then, the contactors K4 and K9 are closed to allow the capacitor C1 to be pre-charged. The charging time may be at least about 5 time as much as the time constants of R1 and C1, such that the capacitor C1 is fully charged. Once the pre-charging of the capacitor C1 is completed, the contactor K3 can be closed, and K9 can be open, so as to save coil power dissipation.

In the example shown in FIG. 14, the charging path is from the input power supply, through the top diodes in the input bridge rectifier, the contactor K9, the resistor R1, Coil B, the antiparallel diode of the power switch device SW3, to the anode side of the capacitor C1. The return path is from the cathode side of the capacitor C1, through the contactor K4 and the bottom diodes of the input bridge rectifier, back to the input power supply.

The output filter capacitor C2 can also be pre-charged before the rechargeable battery is connected. As the capacitor C2 is connected across the rechargeable battery, the pre-charging of the capacitor C2 can be carried out via the management system of the rechargeable battery, which is not shown in FIG. 14.

Figure 15A:
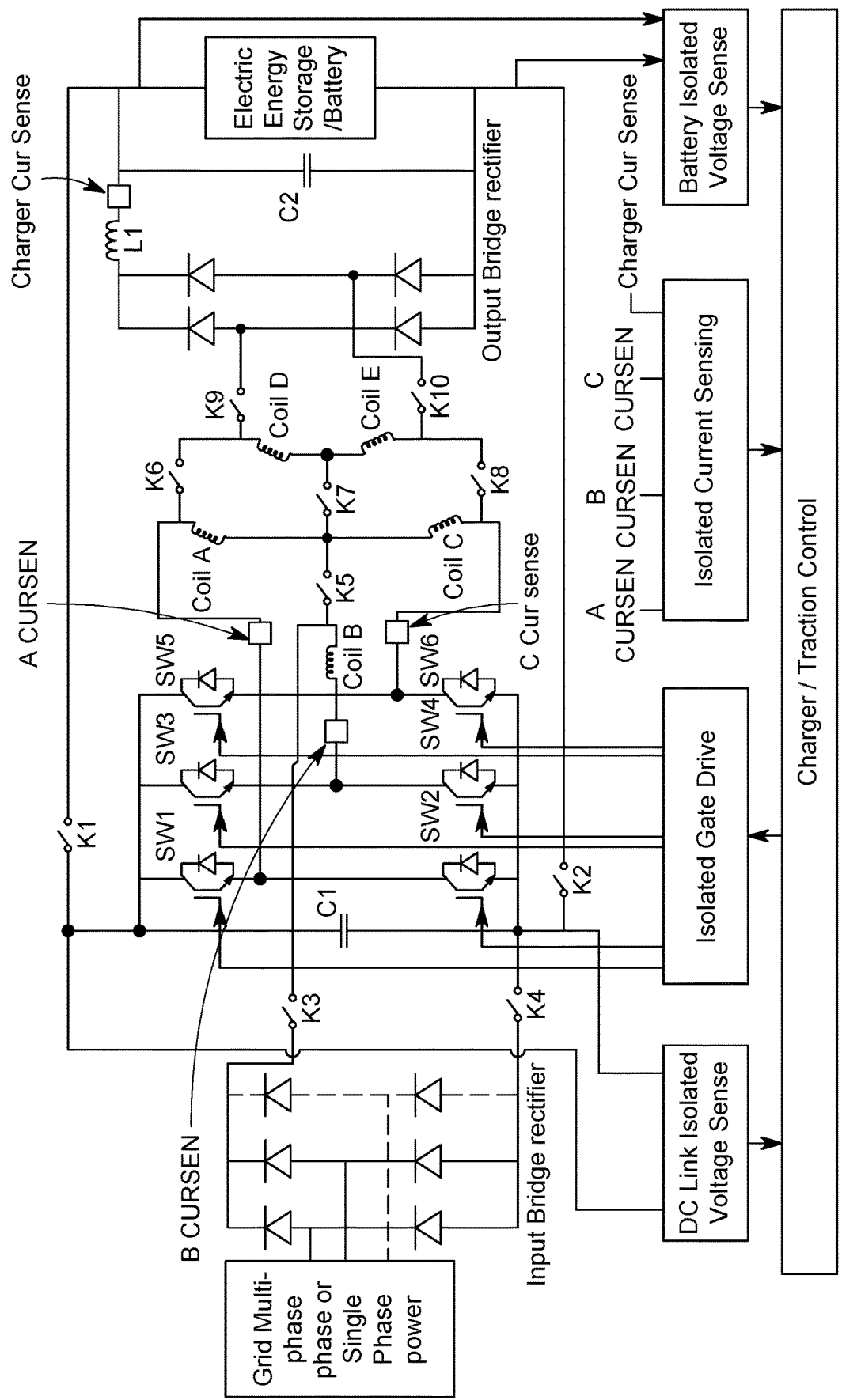
FIG. 15A shows an exemplary schematic drawing related to hardware components of an onboard charging-traction system, in accordance with an exemplary embodiment of the present teaching.

Taking the first embodiment as an example, FIG. 15A shows a high-level diagrammatic diagram related to the hardware components of the onboard charging-traction system in accordance with the present teaching. Besides the components previously described with reference to FIG. 2A, various additional components are comprised in the system, including but not limited to current sensors, voltage sensors, temperature sensors (not illustrated in FIG. 15A), a resolver or any other sensor (not illustrated in FIG. 15A) capable of providing the necessary degree of identification of motor rotor angular position, and a central charging/traction control, etc.

As shown in FIG. 15A, isolated voltage sensing is provided to measure the DC link bus voltage and the battery voltage, respectively. The sensed voltage signals are transmitted into the charging/traction control. In the traction mode, the DC link bus voltage and the battery voltage become the same signal. They are separate signals under the charging mode. The voltage sensing function can be performed via isolated sensors available in the market, such as integrated-circuit based sensors. This type of isolated sensors require isolated power and divider resistors on the high voltage side. In the situation that full galvanic isolation is not necessary, sensing approaches based on high impedance differential amplifiers are feasible as well.

Isolated current sensing is also shown in FIG. 15A. More specifically, an isolated current sensor is provided for detecting the current in the half bridge comprising the power switch devices SW1 and SW2 (corresponding to Phase A). Similarly, there are current sensors for the other two half bridges, one used for the half bridge composed of the power switch devices SW3 and SW4, the other for the half bridge composed of the power switch devices SW5 and SW6. The current sensors may be implemented by Hall current Sensors. Alternatively, shunts with isolation amplifiers may be utilized. For the sake of saving costs, two current sensors can meet the control requirements of the motor and the charging system. However, in order to obtain improved protection, three or more current sensors can be utilized. For example, if less accuracy is acceptable, the charging current can be estimated from the primary current sensed via the Phase A and Phase C sensors. As another example, in order to obtain a high accuracy control of the charging current, besides the three current sensors for Phases A-C, a fourth current sensor is provided to measure the charging current. Similar to the three phase current sensors, the fourth current sensor can be a Hall current sensor, a shunt, etc.

The charger/traction control takes signals from various sensors as input, and generates commands for controlling the power switch devices and the contactors. The controller can be a DSP, FPGA, MCU or any other proper programmable controller. Isolated gate drivers are connected between the charger/traction control and the power switch devices to couple the drive signals across the isolation boundary and provide high pulsed currents to allow the power switch devices to be turned ON/OFF rapidly for the sake of lower losses. Various isolated gate drivers available in the market can be utilized, including but not limited to optical coupled drivers, capacitive coupled drivers, etc.

Figure 15B:
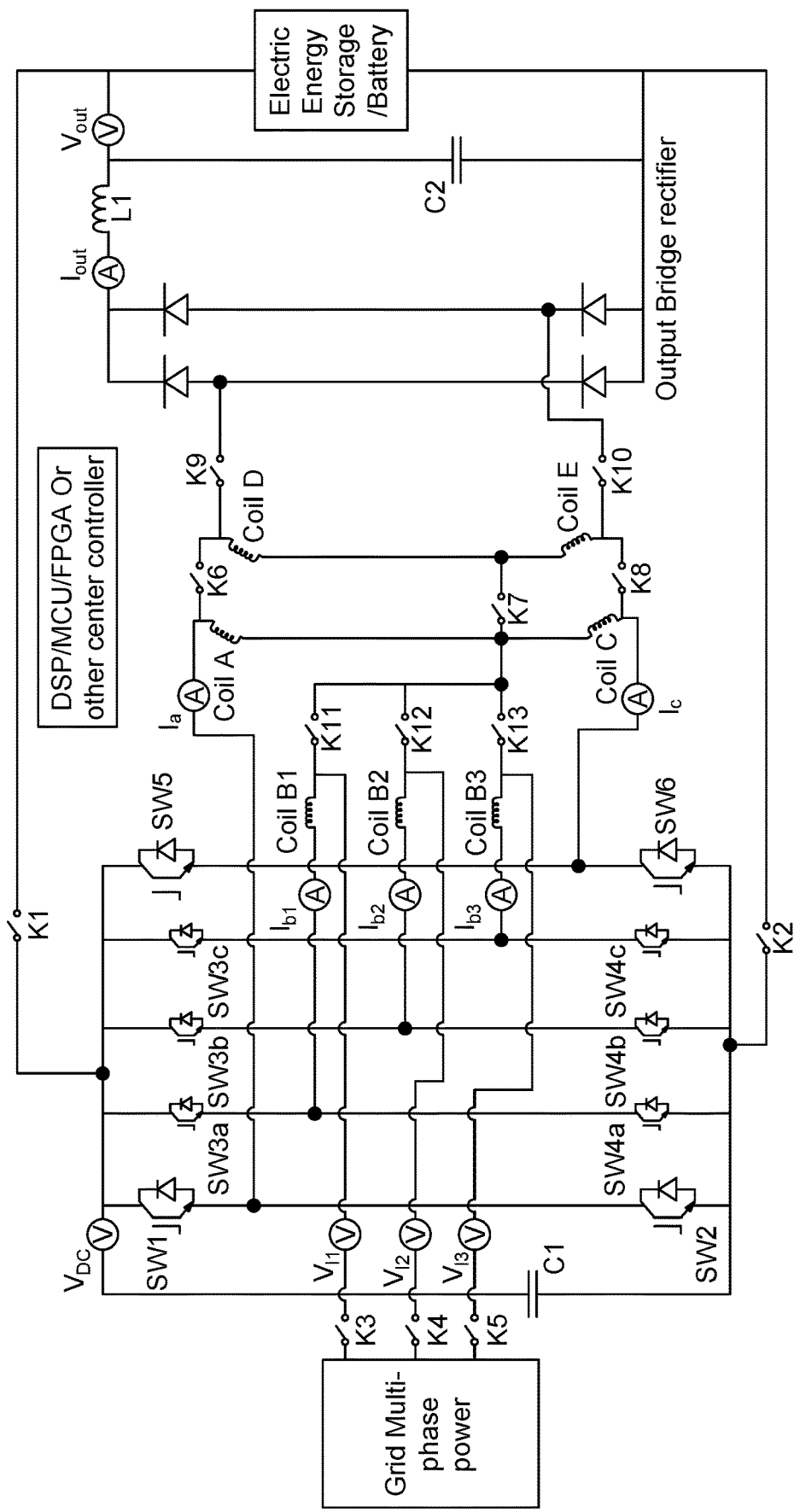
FIG. 15B shows an exemplary schematic drawing related to hardware components of an onboard charging-traction system, in accordance with an exemplary embodiment of the present teaching.

Taking the third embodiment as an example, FIG. 15B shows a high-level diagrammatic diagram related to the hardware components of the onboard charging-traction system in accordance with another example. Besides the components previously described with reference to FIG. 7A, various additional components are comprised in the system, including but not limited to current sensors Ia, Ib1, Ib2, Ib3, Ic and Iout, voltage sensors VI1, VI2, VI3, Vdc and Vout, temperature sensors (not illustrated in FIG. 15B) a center charging/traction controller, and a resolver or any rotor position sensor (not illustrated in FIG. 15B) for reading the position of the rotor, etc.

Figure 16:
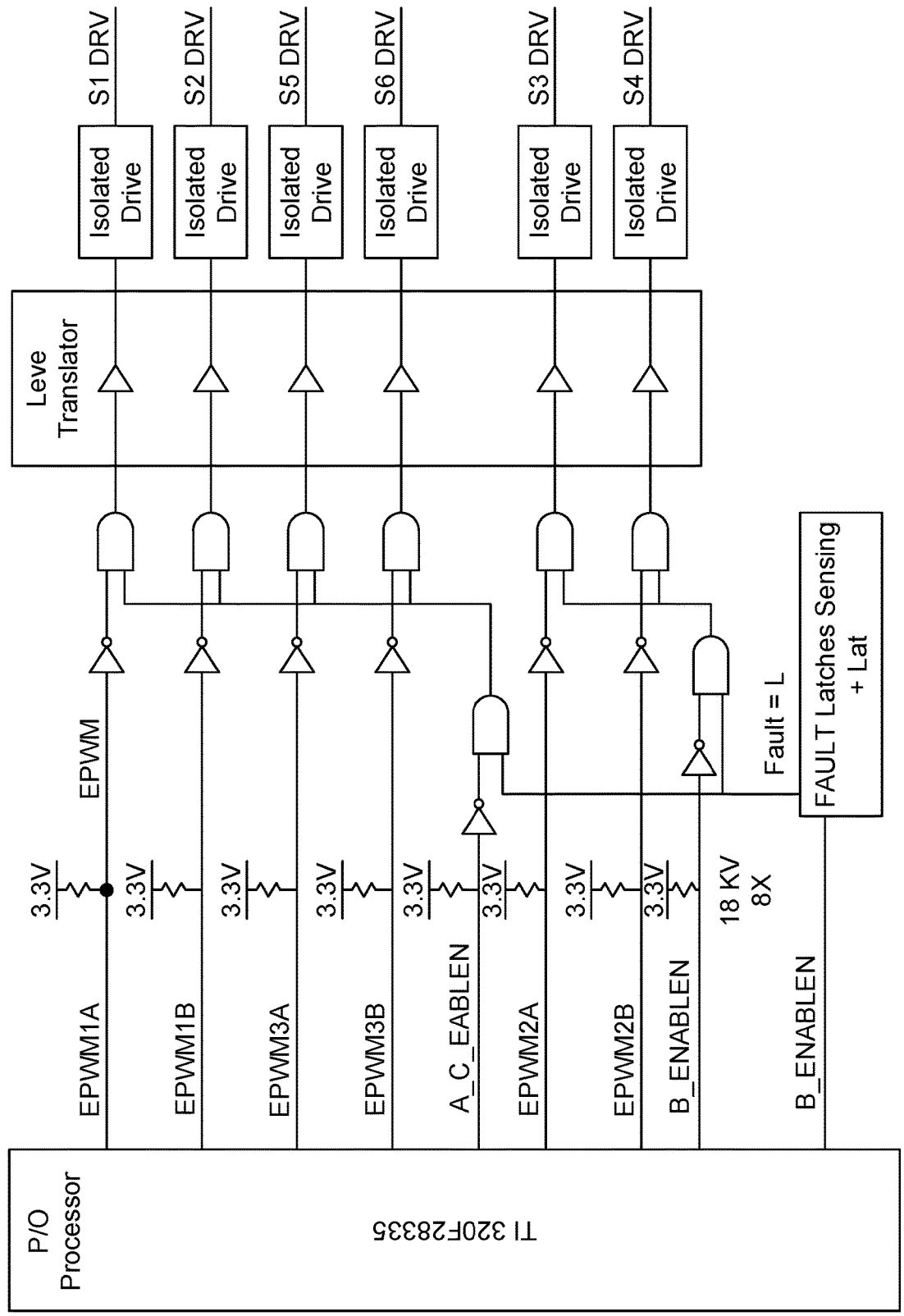
FIG. 16 shows an exemplary schematic drawing related to connection between a charging/traction controller and power switch devices, in accordance with an exemplary embodiment of the present teaching.

FIG. 16 shows more details of the connection from the charging/traction control to the isolated gate drive control, which has Enhanced PWM outputs (EPWM) to drive the power switch devices SW1-SW6 included in the onboard charging-traction system in accordance with the first embodiment of the present teaching. Driven by the signals EPWM1A and EPWM1B, the power switch devices SW1 and SW2 form the Phase A drive under the traction mode, and operate as a part of a PWM drive of the transformer under the charging mode. Driven by the signals EPWM3A and EPWM3B, the power switch devices SW5 and SW6 form the Phase C drive under the traction mode, and operate as a part of a PWM drive of the transformer under the charging mode. Driven by the signals EPWM2A and EPWM2B, the power switch devices SW3 and SW4 form the Phase B drive under the traction mode, and operate as the Boost converter under the charging mode. Separate enable outputs are provided for Phases A and C and for Phase B. This is because they play different roles under the charging mode. Assignments of the pins of the processor may vary depending on the type of processor used, rather than being limited to those illustrated in FIG. 16.

In the example shown in FIG. 16, the power switch devices SW1-SW6 are turned ON by corresponding PWM outputs at a low level, OFF by corresponding PWM outputs at a high level. As such, inverters are arranged at the outputs, and pull-up resistors are provided to make sure the power switch devices are turned OFF while the processor is reset. If the control logic is designed such that a high-level PWM output turns the corresponding power switch device ON, then, the inverters are not needed, and pull down resistors are provided instead of pull-up resistors shown in FIG. 16.

As an example of fault protection functions deployed in the onboard charging-traction system of the present teaching, FIG. 16 shows a fault detection and latching module which is separate from the processor. This approach costs more hardware resources, but provides more robust protection, especially when the processor locks up, when there are code problems (which commonly occurs during the period of development), etc.

Figure 17:
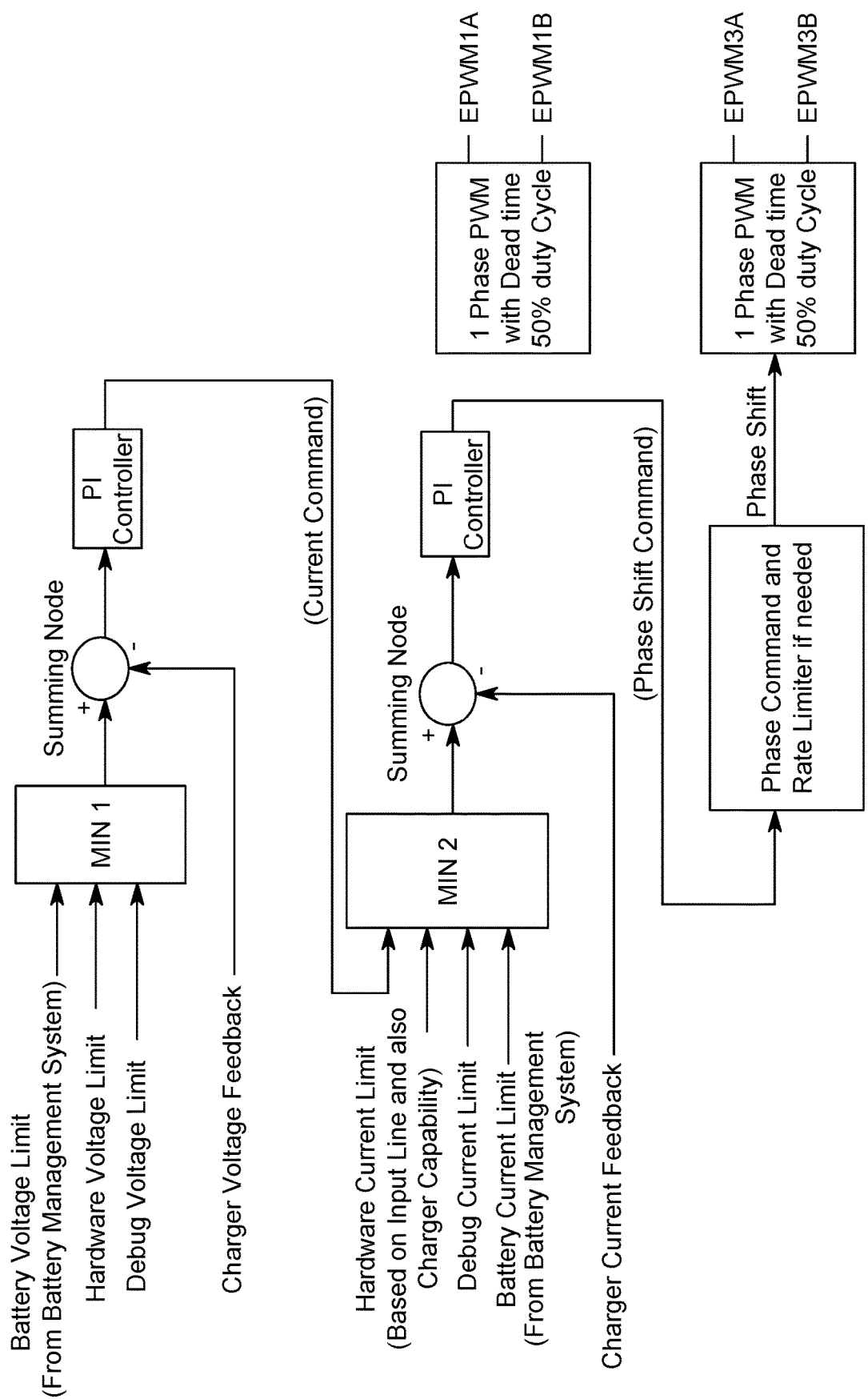
FIG. 17 shows an exemplary control scheme performed under a charging mode of an onboard charging-traction system, in accordance with an exemplary embodiment of the present teaching.
Figure 18A:
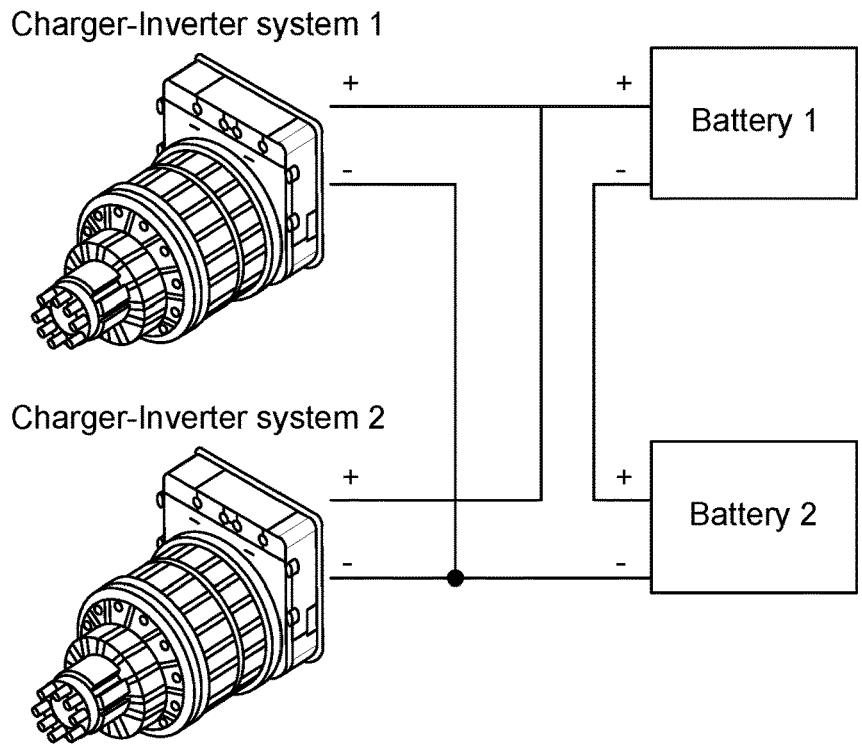
FIGS. 18A-18G show exemplary schematic drawings related to various connections of more than one motor and/or more than one battery of an onboard charging-traction system, in accordance with exemplary embodiments of the present teaching.
Figure 18B:
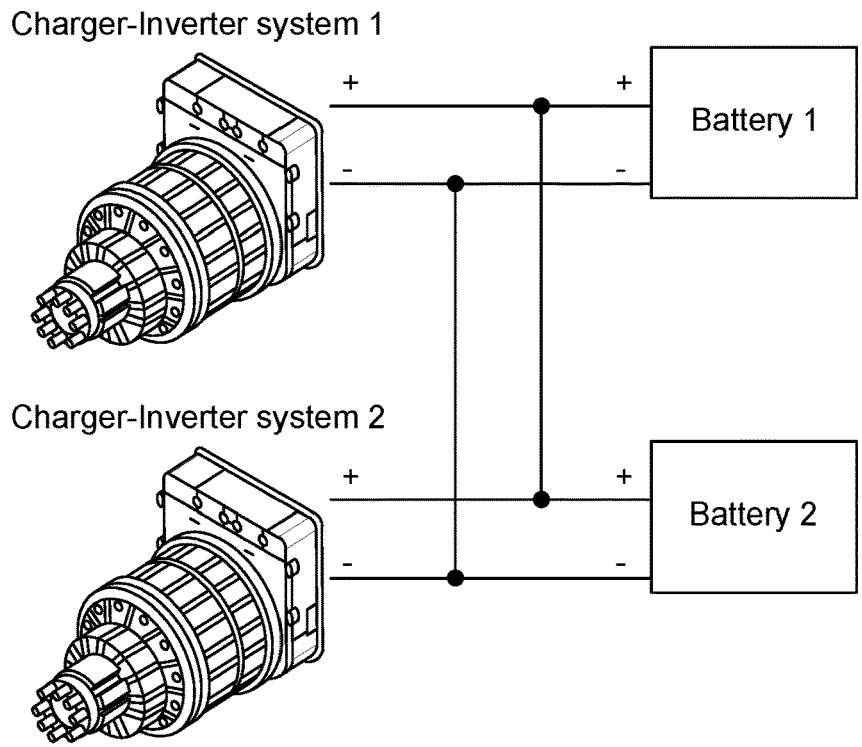
Figure 18C:
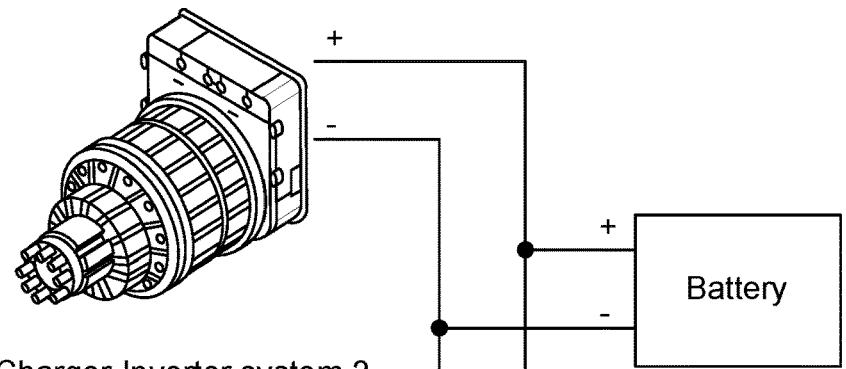
Figure 18C:
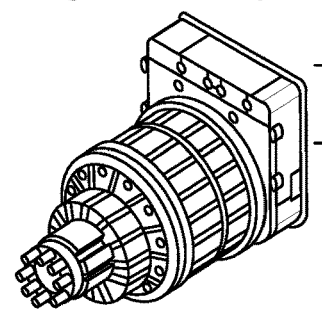
Figure 18D:
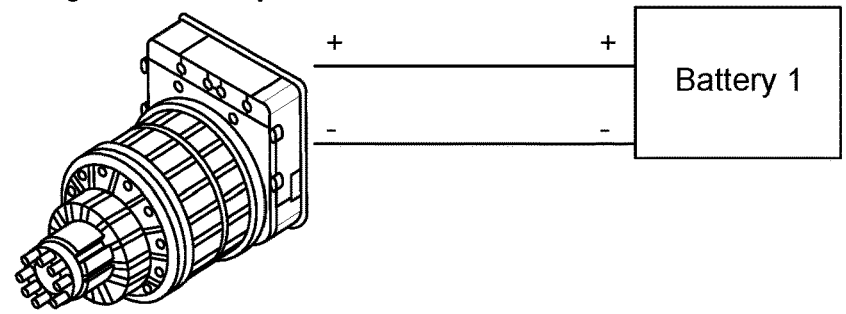
Figure 18D:
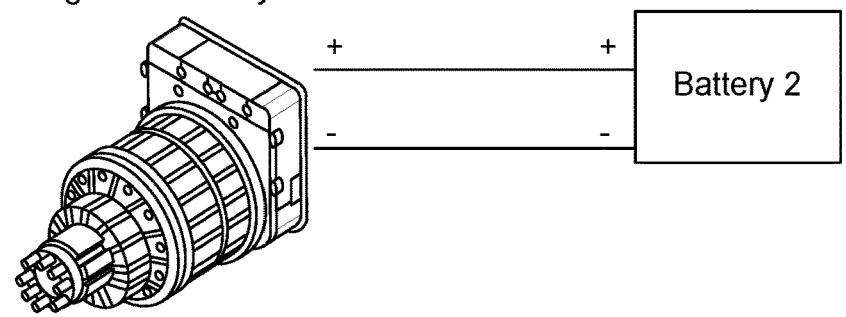
Figure 18E:
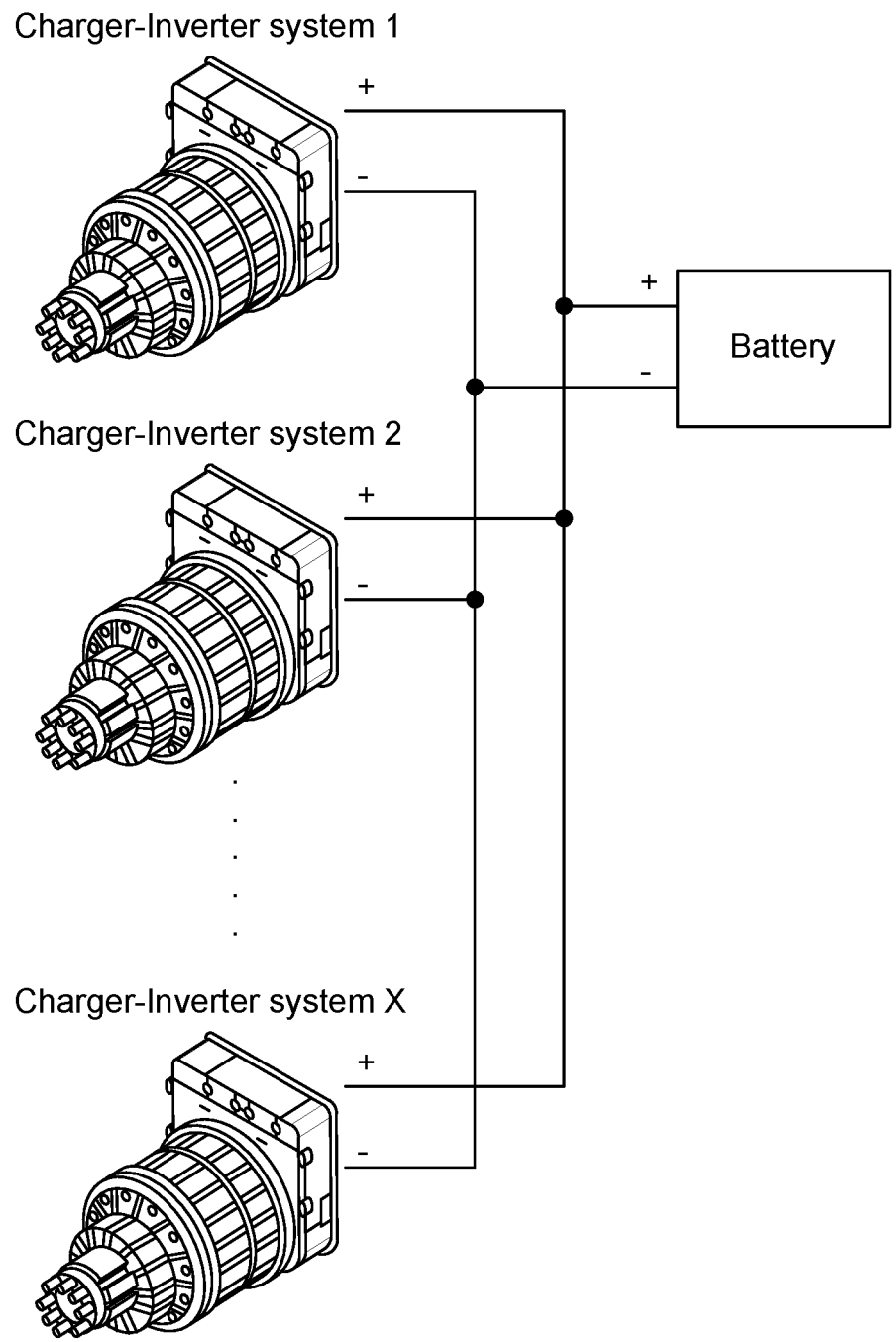
Figure 18F:
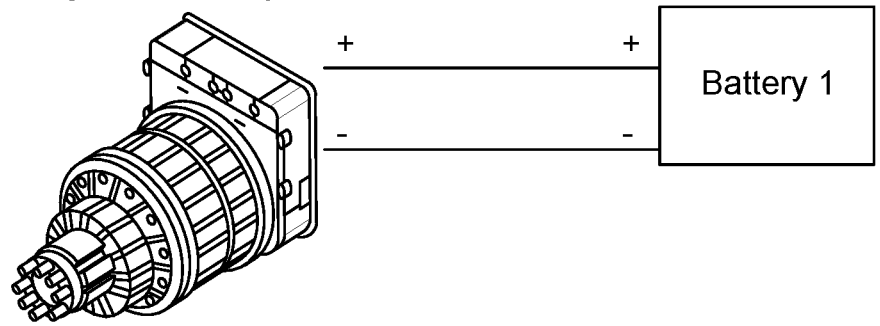
Figure 18F:
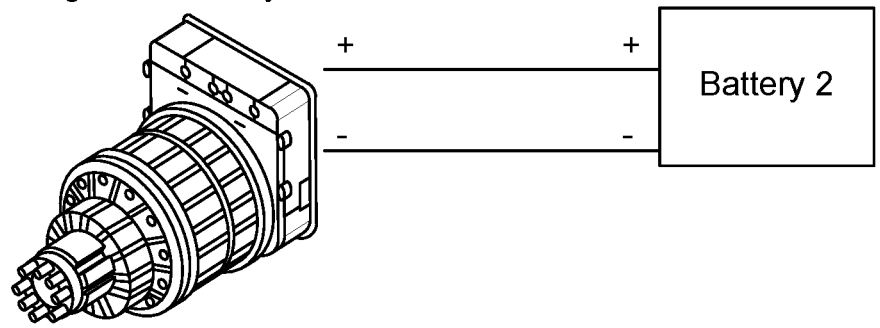
Figure 18F:
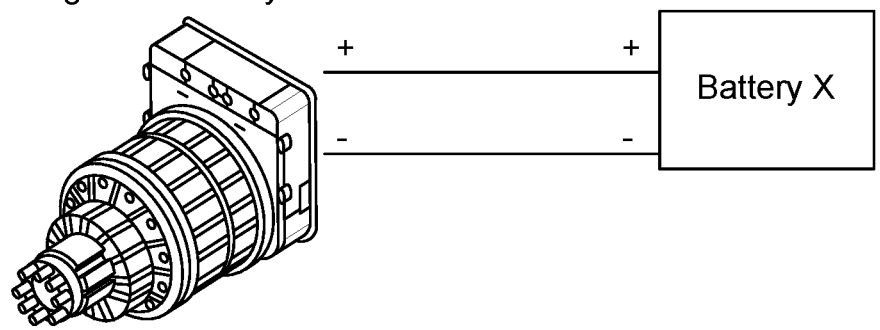
Figure 18G:
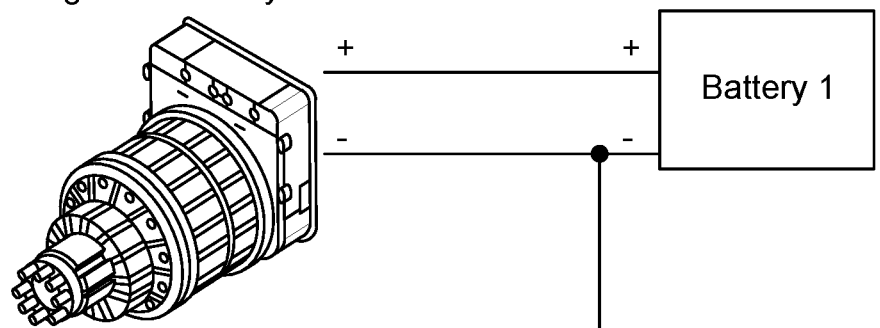
Figure 18G:
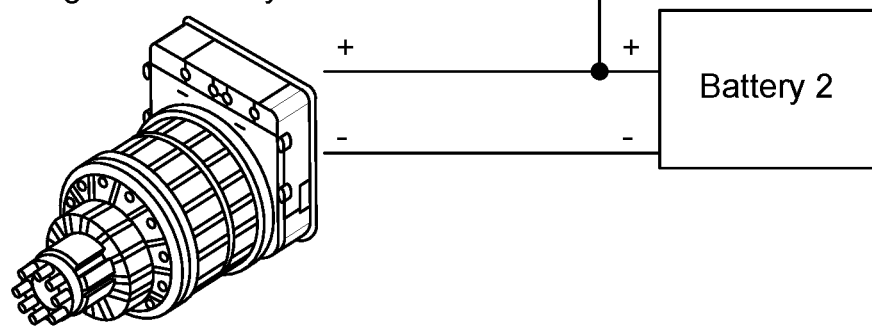

FIG. 17 shows an exemplary control scheme performed under the charging mode of the onboard charging-traction system in accordance with the present teaching. The charging control scheme as shown can be implemented with an implanted DSP processor or discrete control electronics.

Charging of the battery can be carried out in either a constant current mode or a constant voltage mode. Typically, in order to facilitate cell equalization in the rechargeable battery, charging is performed in the constant current mode at the beginning of the charging process and then transitions to the constant voltage mode. Compared with the situation with the constant current mode, a lower charging power is used under the constant voltage mode.

As can be seen from FIG. 17, a voltage control loop included in the charging/traction control has a plurality of voltage limit inputs. Typically, the management system of the rechargeable battery can provide the voltage control loop with information associated with a maximum voltage that the rechargeable battery can accommodate at the moment. Such a battery voltage limit can be sent from the battery management system to the charging/traction control via any appropriate data link, such as a CAN data bus. Also inputted into the voltage control loop is a hardware voltage limit, which represents how high a voltage that the charging power path can safely produce. The hardware voltage limit is not a maximum voltage that the charging power path is capable to produce, but a maximum voltage limit determined based on component stress limits. Optionally, via a debug data link, for example, a debug voltage limit is also communicated to the voltage control loop. The debug voltage limit is useful in debugging and development of the onboard charging-traction system.

Based on the battery voltage limit, the hardware voltage limit, and the optional debug voltage limit as inputted, Block MIN 1 generates and outputs a voltage command to Summing Node 1. The generated voltage command represents the minimum of the inputted various voltage limits. At Summing Node 1, the voltage command is compared against a sensed actual voltage so as to obtain a voltage error. This voltage error is inputted into PI Controller 1 to generate a current command. Alternatively, various controllers including but not limited to integral controllers may be used in place of the PI Controller 1. The generated current command is sent, as an input, into Block MIN 2 of a current control loop of the charging/traction control.

As can be seen from FIG. 17, besides the current command outputted from the PI Controller 1 of the voltage control loop, Block MIN 2 of the current control loop included in the charging/traction control receives a plurality of current limits as inputs. Similarly, the management system of the rechargeable battery can provide the current control loop with information associated with the maximum current that the rechargeable battery can accommodate at the moment. Such a battery current limit can be sent from the battery management system to the charging/traction control via a CAN data bus, for example. Also inputted into the current control loop is a hardware current limit. In one aspect, the hardware current limit reflects current capability of the charging power path. For example, the charging power path may have a limited current capacity around 200 amps. In another aspect, the hardware current limit reflects a limited input power due to a maximum input current that can be drawn from the input line. This maximum input current may be estimated based on the battery voltage. Alternatively, an input current sensor can be used to provide more accurate input current information. The more accurate current information is available, the closer to the input current limitation the onboard charging-traction system is allowed to operate. Again, via a debug data link, an optional debug current limit is communicated to the current control loop.

Based on the current command from the PI Controller 1 of the voltage control loop, the hardware current limit, the battery current limit, and the optional debug current limit as inputted, Block MIN 2 generates and outputs a current command to Summing Node 2. The generated current command represents the minimum of the various inputs. Because the current command from the voltage control loop is used as an input command of the current control loop, the charging/traction control is able to limit the voltage on the rechargeable battery. If the current command from the voltage control loop is lower than other current limits inputted to Block MIN 2, it is the one that is controlling, and thus the charger operates in a voltage control mode. If any of the current limits inputted to Block MIN 2 is lower than the current command from the voltage control loop, then the charger operates in a current control mode with the lowest current limit being a current reference command. At Summing Node 2, the current reference command is compared against a sensed actual current so as to obtain a current error. This current error is inputted to PI Controller 2 to generate a phase shift command. Alternatively, various controllers including but not limited to integral controllers may be used in place of PI Controller 2. The output of PI Controller 2 is a phase shift command which is used to vary the phase shift between the PWM signals EPWM3 and EPWM1. The phase shift command needs to be limited to keep within a required range to prevent a reversal of the gain. For example, the range is from 1 to 180 degrees.

The vehicle normally operates under the traction mode. When the charging/traction control is switched from a charging state to a traction state, configuration of EPWM outputs from the processor of the charging/traction control is switched accordingly. In the traction state, the processor is configured to produce a three-phase PWM output, with a dead time between the top power switch devices and the bottom power switch devices in each bridge leg of the inverter to avoid shoot-through. As the present teaching does not change the way the motor is driven under the traction mode, conventional techniques are applicable for the traction control. For example, the traction control can be implemented by standard field-oriented control (FOC), with a sensor providing a feedback signal associated with shaft position of the output shaft of the motor rotor. Typically, a resolver is attached to the motor to measure the shaft position.

Although only one motor, one rechargeable battery, one inverter, one input bridge rectifier and one output bridge rectifier are illustrated in the drawings accompanying the description of the first to fifth embodiments, one skilled in the art can anticipate that multiples motors, rechargeable batteries, inverters, input bridge rectifiers and/or output bridge rectifiers can be provided in the onboard charging-traction system. For example, two motors may drive the front and rear wheels in an electric vehicle separately, or similarly, four motors may drive each wheel separately. In the following, two approaches for practicing the present teaching with multiple motors will be discussed with reference to FIGS. 18A-20B.

FIGS. 18A-18G show schematic drawings related to various connections of more than one motor and/or more than one battery of an onboard charging-traction system in accordance with examples of the present teaching. One motor and its accompanying charger-inverter system or multiple motors and their corresponding charger-inverter systems may be connected to a same battery or to different batteries. Each of the combination of a charger-inverter system and a motor works independently to charge the battery or batteries. The battery can be separate without electric connection among one another. Alternatively, at least some of the batteries can be connected in series or in parallel.

Figure 19:
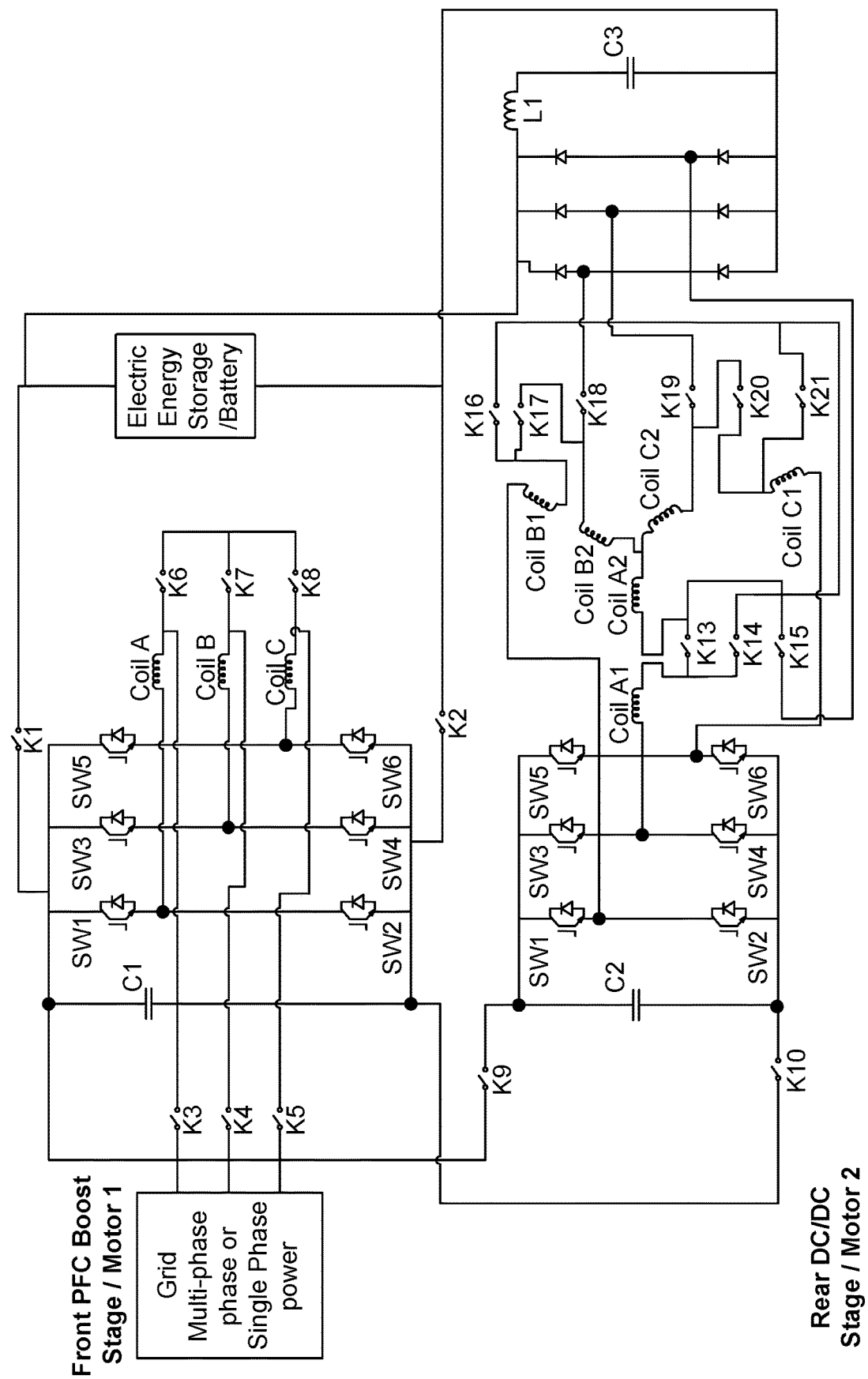
FIG. 19 shows an exemplary schematic drawing related to connections of two or more charger-inverters and a battery, in accordance with an exemplary embodiment of the present teaching.

FIG. 19 shows a schematic drawing related to connections of two or more charger-inverters and a battery in accordance with another exemplary example. In this scenario, two or more charger-inverters may be used as different stages of the charging power path under the charging mode. More especially, one or more charger-inverter out of the multiple charger-inverters in the system may work as a first stage, while the other one or more charger-inverter out of the multiple charger-inverters may work as a second DC/DC stage. The first stage can be a PFC Boost, or Boost converter front end for single or multiple phases. The second stage can be connected in parallel or in series. Under the traction mode, the two or more charger-inverters can be working independently or together.

Figure 20A:
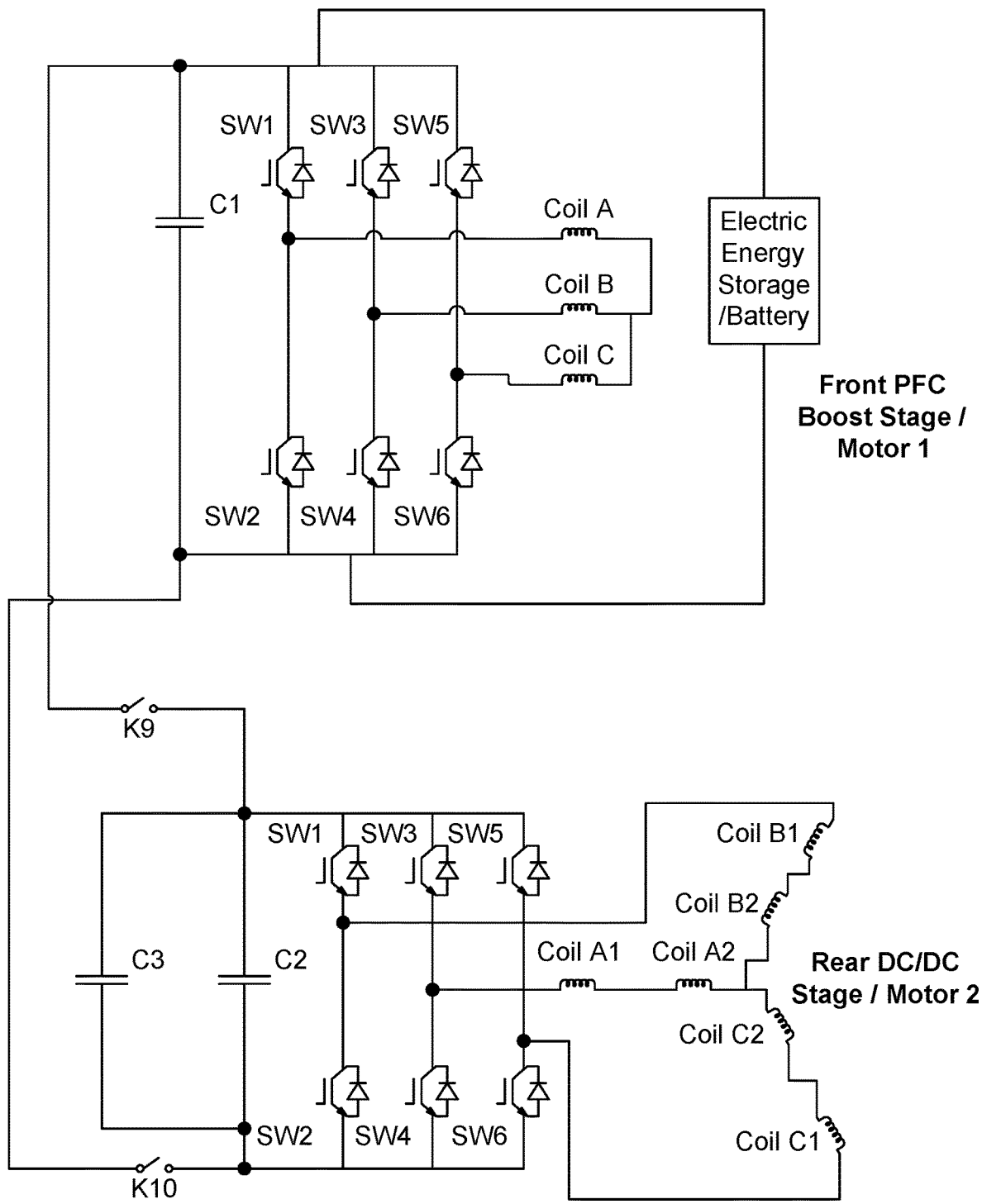
FIG. 20A shows an exemplary simplified circuit diagram related to an onboard charging-traction system, in accordance with an exemplary embodiment of the present teaching.

To configure the system shown in FIG. 19 to the traction mode, the contactors K1, K2, K6, K7, K8, K13, K17 and K20 are closed, while K3, K4, K5, K9, K10, K14, K15, K16, K18, K19 and K21 are open. As a result, a traction power path as shown in the simplified circuit diagram of FIG. 20A is formed. In FIG. 20A, a same rechargeable battery is connected to drive both motors.

Figure 20B:
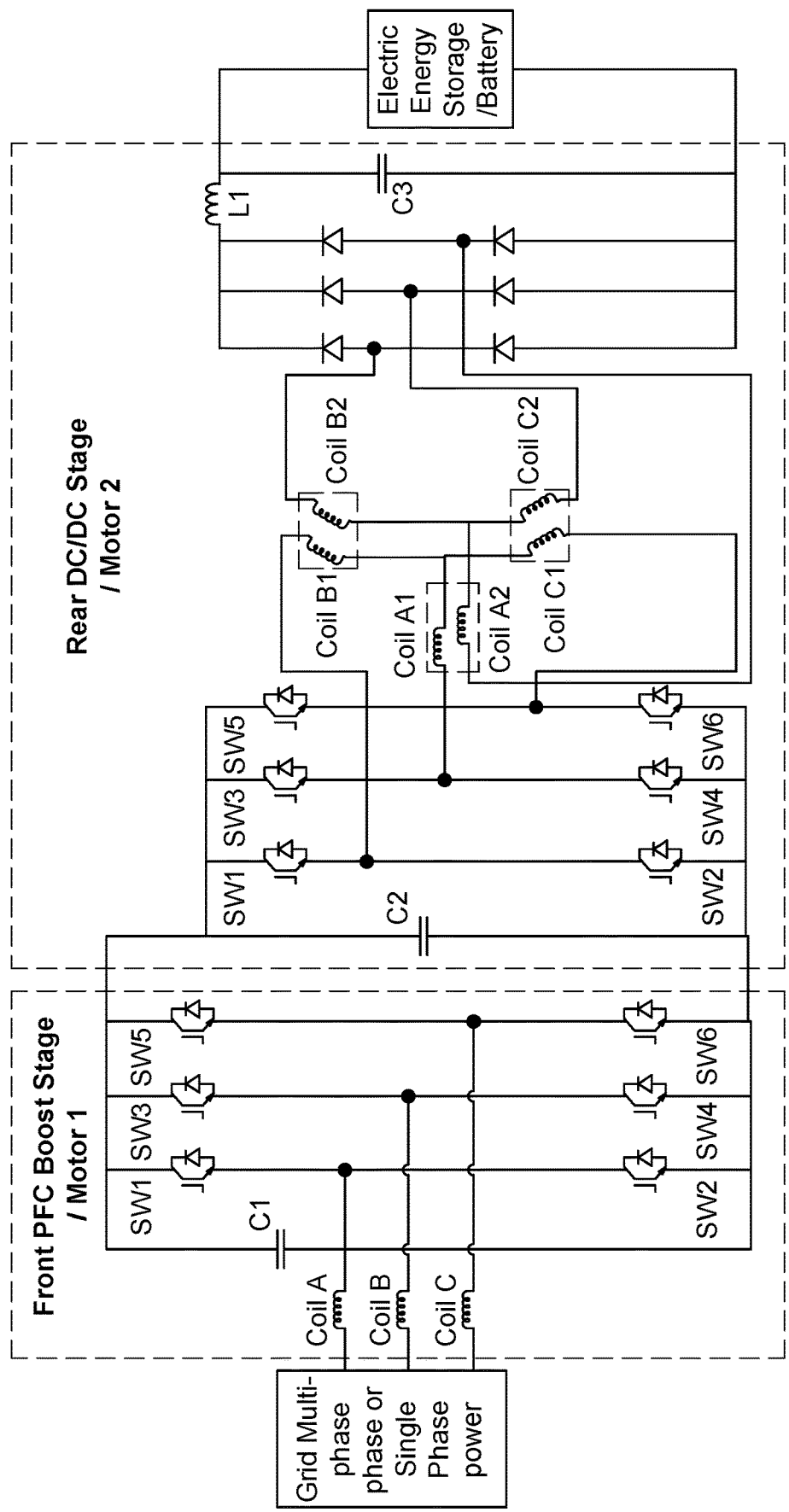
FIG. 20B shows an exemplary simplified circuit diagram related to an onboard charging-traction system, in accordance with an exemplary embodiment of the present teaching.

To configure the system shown in FIG. 19 to the charging mode, the contactors K1, K2, K6, K7, K8, K13, K17 and K20 are open, while K3, K4, K5, K9, K10, K14, K15, K16, K18, K19 and K21 are closed. As a result, a charging power path as shown in the simplified circuit diagram of FIG. 20B is formed. When the system is configured into the charging mode, a fully isolated two stage charger is provided, which comprises a full three phase Boost PFC front end stage and a fully isolated DC/DC rear end. In the front end stage, the windings Coil A, Coil B and Coil C act as Boost inductors, and the power switch devices SW1, SW2, SW3, SW4, SW5 and SW6 in the inverter 1 as boost PFC switches. In the rear DC/DC stage, the power switch devices SW1, SW2, SW3, SW4, SW5 and SW6 in inverter 2 constitute a three phase H bridge drive, the windings Coil A1, Coil B1 and Coil C1 act as the transformer's primary winding, and Coil A2, Coil B2 and Coil C2 as the transformer's secondary winding.

Under the charging mode, the PFC Boost front end stage may convert the grid multi-phase voltage to DC voltage, while perform Power Factor correction with respect to the grid. Then, the H bridge in the rear end stage may take DC power from the first stage as input, invert it into AC power, and pass the inverted AC power through the transformer formed by the motor windings, such that full isolation is achieved. The AC power outputted from the transformer is applied to an output bridge rectifier and then the output filter, so as to generate DC power for charging the rechargeable battery.

While the present teaching is primarily described in the context of electric vehicles, the inventive concepts and ideas disclosed herein are applicable to any electric apparatus that contains one or more electric motors and one or more electric energy storage devices (such as rechargeable batteries). Examples of such an electric apparatus include, but not limited to plug-in electric hybrid vehicles, electric ships, electric airplanes, electric trains, electric motorcycles, electric bikes, electric skateboards, electric tools, electric drones, electric submarines, and electric machinery such as: electric bulldozers, electric tractors, electric forklifts, electric excavators, etc. The inventive concepts and ideas can also find application in electric equipment of special purposes, such as explosion proof electric vehicle, explosion proof electric tools, explosion proof track vehicle, etc.

It will be apparent to those skilled in the art that, the configurator which is used to reconfigure the connections between the traction mode and the charging mode can be constituted with mechanical switches, electrical magnetic contactors, solid state switches or any type of switching mechanism that can disconnect or connect electric couplings.

It will be apparent to those skilled in the art that, the inverter can be any multiphase inverter. The power switch devices in the inverter may be Silicon IGBT power modules, MOSFETS or any other power switching devices suitable for switching the power levels involved. The power switch devices may be based on Silicon, GaN, SiC or any other technology.

It will be apparent to those skilled in the art that, the motor adopted to realize the present teaching can be any type of motor that consists at least two phases of windings, including but not limited to asynchronous induction motor, PMSM motor, BLDC motor, BLAC motor, reluctance motor.

As the present teaching takes advantage of components that pre-exist in the invertor(s) and the motor(s) of an electric vehicle, the maximum charge power is limited. It should be appreciated by those skilled in the art that motor(s) and invertor(s) having higher power capacities may be used to increase the charging power upper limit. In addition, upon a request from the vehicle, the charging system is able to charge the battery at a power lower than the maximum charging level.

With the design disclosed herein, the windings in motor(s) and the power switch devices in inverter(s) may be used to form a two stage Boost and Buck fully isolated switching power supply.

With the design disclosed herein, two or more sets of windings may be provided on at least one stator tooth. At least one stator tooth may operate as a transformer core to transfer power from the primary winding to the secondary winding without rotation of the motor rotor.

With the design disclosed herein, one or more motor stator winding of which one end is originally connected to the motor star point is able to be disconnected from the motor star point through a set of contactors and form components of a two stage fully isolated switched power supply.

With the design disclosed herein, through a set of contactors, the originally electrically connected winding in the traction mode may be used to form two sets of fully isolated winding in the charging mode.

While the foregoing has described what are considered to constitute the present teachings and/or other examples, it is understood that various modifications may be made thereto and that the subject matter disclosed herein may be implemented in various forms and examples, and that the teachings may be applied in numerous applications, only some of which have been described herein. It is intended by the following claims to claim any and all applications, modifications and variations that fall within the true scope of the present teaching.

I claim:

1. A reconfigurable traction-charging system residing in an electric apparatus having a rechargeable battery, comprising:
 a motor comprising a stator having a plurality of stator teeth and a plurality of stator windings wounded on the plurality of stator teeth, wherein a stator winding on at least one stator tooth of the motor is split into two or more coils;

an inverter comprising a plurality of power switch devices;
an output rectifier;
a configurator comprising a plurality of contactors coupled with the plurality of stator windings and the plurality of power switch devices; and
a controller for controlling the plurality of power switch devices and the plurality of contactors, so as to configure the reconfigurable traction-charging system to operate in one of a traction mode and a charging mode, wherein:
under the traction mode, the rechargeable battery supplies electric energy to the motor via the inverter; and
under the charging mode, connections associated with the plurality of power switch devices and the stator windings are configured by the configurator to form a charger that draws electric energy from an external power supply to charge the rechargeable battery, and wherein
a stator winding on at least one stator tooth of the motor is split into two or more coils;
under the charging mode, the two or more coils and the corresponding at least one stator tooth form a transformer in the charger; and
under the traction mode, the two or more coils are connected in parallel or in series to form a phase winding.

2. The reconfigurable traction-charging system of claim 1, wherein
the external power supply is a multiple phase power supply;
the system further comprises an input bridge rectifier; and
the input bridge rectifier, the charger, and the output rectifier form a charging power path having two stages, including a first stage being a bridge rectifier front end with a Boost converter and a second stage being an isolated DC/DC rear end.

3. The reconfigurable traction-charging system of claim 2, wherein at least one stator winding on one or more stator teeth of the motor constitutes at least one Boost inductor of the Boost converter.

4. The reconfigurable traction-charging system of claim 1, wherein
the external power supply is a single or split single phase power supply;
the system further comprises an input bridge rectifier; and
the input bridge rectifier, the charger, and the output rectifier form a charging path having two stages, including a first stage being a bridge PFC rectifier front end with a Boost converter and a second stage being an isolated DC/DC rear end.

5. The reconfigurable traction-charging system of claim 4, wherein at least one stator winding on one or more stator teeth of the motor constitutes at least one Boost inductor of the Boost converter.

6. The reconfigurable traction-charging system of claim 1, wherein
the external power supply is a multiple phase power supply; and
the charger and the output rectifier form a charging path having two stages, including a first stage being a multiple phase Boost PFC front end and a second stage being an isolated DC/DC rear end.

7. The reconfigurable traction-charging system of claim 1, wherein
the external power supply is a single phase or single split phase power supply; and
the charger and the output rectifier form a charging path having two stages, including a first stage being a single phase Boost PFC front end and a second stage being an isolated DC/DC rear end.

8. The reconfigurable traction-charging system of claim 1, wherein
the external power supply is a single phase or single split phase power supply; and
the system further comprises two diodes, wherein the two diodes, the charger, and the output rectifier form a charging path having two stages, including a first stage being a single phase Totem-Pole Boost PFC front end stage and a second stage being an isolated DC/DC rear end stage.

9. A method for implementing a reconfigurable traction-charging system residing in an electric apparatus having a rechargeable battery, the method comprising:
configuring, via a configurator, under control of a controller, the reconfigurable traction-charging system to operate in a traction mode;
upon receiving a request to charge the rechargeable battery, configuring, via the configurator, the reconfigurable traction-charging system to operate in a charging mode; and
upon determining that a criterion associated the rechargeable battery is met, configuring, via the configurator, the reconfigurable traction-charging system to operate in the traction mode,
wherein: the reconfigurable traction-charging system comprises the controller, the configurator, a motor, an inverter and an output rectifier;
the motor comprises a stator having a plurality of stator teeth and a plurality of stator windings wound on the plurality of stator teeth, wherein a stator winding on at least one stator tooth of the motor is split into two or more coils, wherein the two or more coils have distinct connections for the traction mode and the charging mode;
the inverter comprises a plurality of power switch devices, the configurator comprises a plurality of contactors coupled with the plurality of stator windings and the plurality of power switch devices
wherein
under the traction mode, the rechargeable battery supplies electric energy to the motor via the inverter; and
under the charging mode, connections associated with the plurality of power switch devices and the stator windings are configured by the configurator to form a charger that draws electric energy from an external power supply to charge the rechargeable battery, and wherein
a stator winding on at least one stator tooth of the motor is split into two or more coils;
under the charging mode, the two or more coils and the corresponding at least one stator tooth form a transformer in the charger; and
under the traction mode, the two or more coils are connected in parallel or in series to form a phase winding.

10. The method for implementing a reconfigurable traction-charging system of claim 9, wherein
the external power supply is a multiple phase power supply;
the reconfigurable traction-charging system further comprises an input bridge rectifier; and
the input bridge rectifier, the charger, and the output rectifier form a charging power path having two stages, including a first stage being a bridge rectifier front end with a Boost converter and a second stage being an isolated DC/DC rear end.

11. The method for implementing a reconfigurable traction-charging system of claim 10, wherein at least one stator winding on one or more stator teeth of the motor constitutes at least one Boost inductor of the Boost converter.

12. The method for implementing a reconfigurable traction-charging system of claim 9, wherein
the external power supply is a single or split single phase power supply;
the reconfigurable traction-charging system further comprises an input bridge rectifier; and
the input bridge rectifier, the charger, and the output rectifier form a charging path having two stages including a first stage being a bridge PFC rectifier front end with a Boost converter and a second stage being an isolated DC/DC rear end.

13. The method for implementing a reconfigurable traction-charging system of claim 12, wherein at least one stator winding on one or more stator teeth of the motor constitutes at least one Boost inductor of the Boost converter.

14. The method for implementing a reconfigurable traction-charging system of claim 9, wherein
the external power supply is a multiple phase power supply; and
the charger and the output rectifier form a charging path having two stages, including a first stage being a multiple phase Boost PFC front end and a second stage being an isolated DC/DC rear end.

15. The method for implementing a reconfigurable traction-charging system of claim 9, wherein
the external power supply is a single phase or single split phase power supply; and
the charger and the output rectifier form a charging path having two stages, including a first stage being a single phase Boost PFC front end and a second stage being an isolated DC/DC rear end.

16. The method for implementing a reconfigurable traction-charging system of claim 9, wherein
the external power supply is a single phase or single split phase power supply; and
the reconfigurable traction-charging system further comprises two diodes, wherein the two diodes, the charger, and the output rectifier form a charging path having two stages, including a e second stage being an isolated DC/DC rear end stage.

* * * * *